United States Patent
Shin et al.

(10) Patent No.: US 10,015,021 B2
(45) Date of Patent: Jul. 3, 2018

(54) HOME APPLIANCE AND MOBILE TERMINAL

(71) Applicant: LG ELECTRONICS INC., Seoul (KR)

(72) Inventors: Taedong Shin, Seoul (KR); Juwan Lee, Seoul (KR); Lagyoung Kim, Seoul (KR); Seunghoon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 126 days.

(21) Appl. No.: 15/022,077

(22) PCT Filed: Sep. 16, 2014

(86) PCT No.: PCT/KR2014/008592
§ 371 (c)(1),
(2) Date: Mar. 15, 2016

(87) PCT Pub. No.: WO2015/037963
PCT Pub. Date: Mar. 19, 2015

(65) Prior Publication Data
US 2016/0226676 A1    Aug. 4, 2016

(30) Foreign Application Priority Data

Sep. 16, 2013 (KR) .................. 10-2013-0111222
Sep. 16, 2013 (KR) .................. 10-2013-0111223
May 20, 2014 (KR) .................. 10-2014-0060574

(51) Int. Cl.
*H04L 12/28* (2006.01)
*H04B 11/00* (2006.01)
(Continued)

(52) U.S. Cl.
CPC .......... *H04L 12/2827* (2013.01); *H04B 11/00* (2013.01); *H04L 12/2809* (2013.01);
(Continued)

(58) Field of Classification Search
CPC ............ H04L 12/2827; H04L 12/2809; H04L 2012/285
See application file for complete search history.

(56) References Cited

U.S. PATENT DOCUMENTS

2011/0223899 A1    9/2011 Hiraide
2011/0244846 A1    10/2011 Min
(Continued)

FOREIGN PATENT DOCUMENTS

CN    102915004    2/2013
KR    10-2012-0078585 A    7/2012
(Continued)

OTHER PUBLICATIONS

International Search Report and Written Opinion dated Dec. 16, 2014 issued in Application No. PCT/KR2014/008592 (Full English Text).
(Continued)

*Primary Examiner* — Nabil Syed
(74) *Attorney, Agent, or Firm* — KED & Associates, LLP

(57) ABSTRACT

Disclosed are a home appliance and a mobile terminal. The home appliance includes a drive unit, an acoustic output module configured to output sound, a microphone configured to receive sound from an external source, a memory configured to store information related to the home appliance when the home appliance is being operated, an acoustic communication unit configured to output sound containing the information related to the home appliance to the acoustic output module or to extract prescribed information from the sound received via the microphone based on an acoustic
(Continued)

communication mode, and a controller configured to control the drive unit according to the information extracted by the acoustic communication unit. Transmission of information between the home appliance and the mobile terminal is accomplished via acoustic communication.

18 Claims, 50 Drawing Sheets

(51) Int. Cl.
*H04M 1/725* (2006.01)
*G06F 3/16* (2006.01)

(52) U.S. Cl.
CPC ......... *H04M 1/72533* (2013.01); *G06F 3/167* (2013.01); *H04L 2012/285* (2013.01); *H04L 2012/2841* (2013.01)

(56) References Cited

U.S. PATENT DOCUMENTS

| | | |
|---|---|---|
| 2013/0060359 A1 | 3/2013 | Kim et al. |
| 2013/0183944 A1 | 7/2013 | Mozer et al. |

FOREIGN PATENT DOCUMENTS

| | | |
|---|---|---|
| KR | 10-2012-0131279 A | 12/2012 |
| WO | WO 2010/112677 | 10/2010 |

OTHER PUBLICATIONS

European Search Report dated Mar. 15, 2017 issued in Application No. 14844327.8.
Chinese Office Action dated Apr. 18, 2017 issued in Application No. 201480062596.6 (English translation attached).
DROIDLESSONS: "DroidLessons—How to Change the Ringtone on your Android smartphone"; YOUTUBE; https://www.youtube.com/watch?v=_aGGgpggHyk; Jan. 22, 2011; Retrieved from internet Feb. 20, 2017(XP 054977161).
European Search Report dated Jul. 4, 2017 issued in Application No. 14844327.8.

[Fig. 1]
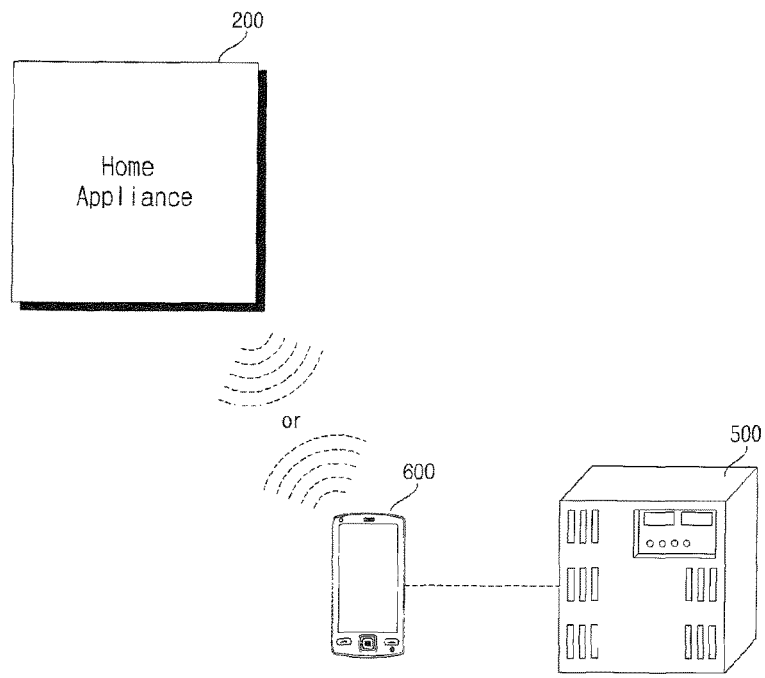
[Fig. 2a]
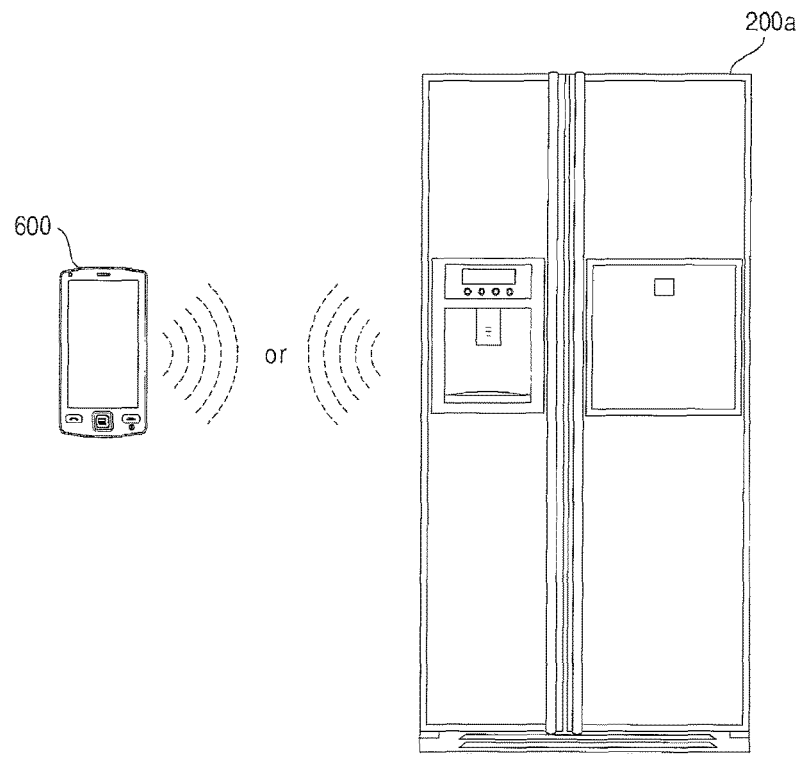

[Fig. 2b]
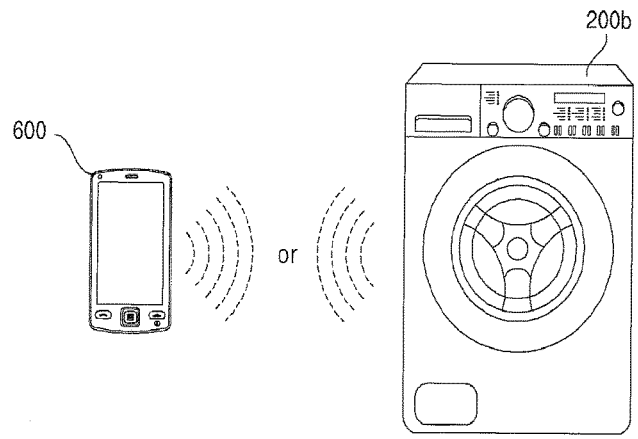
[Fig. 2c]
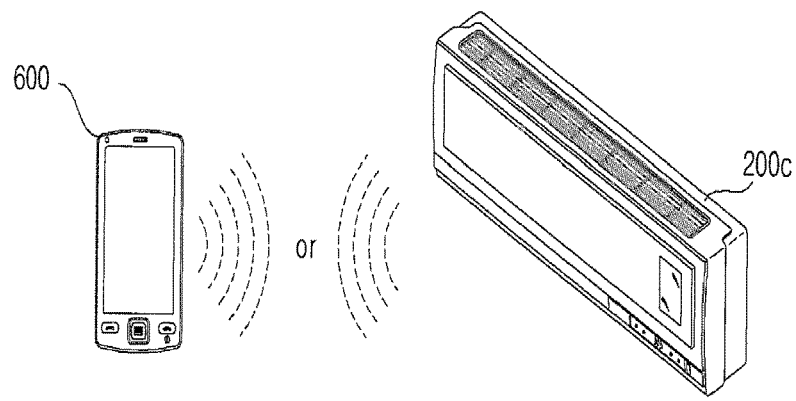
[Fig. 2d]
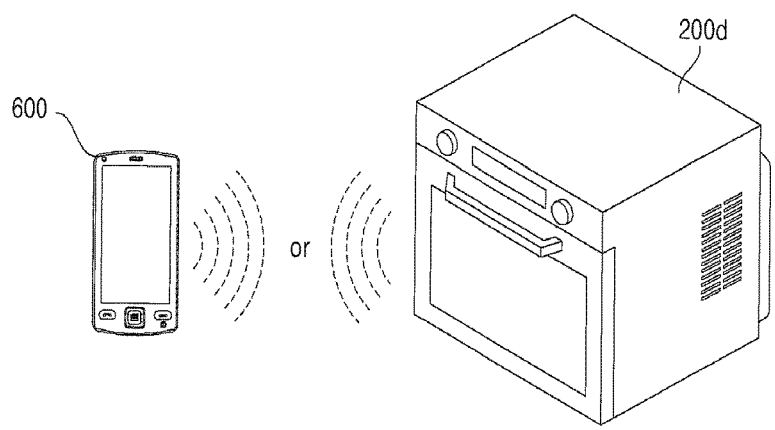

[Fig. 2e]
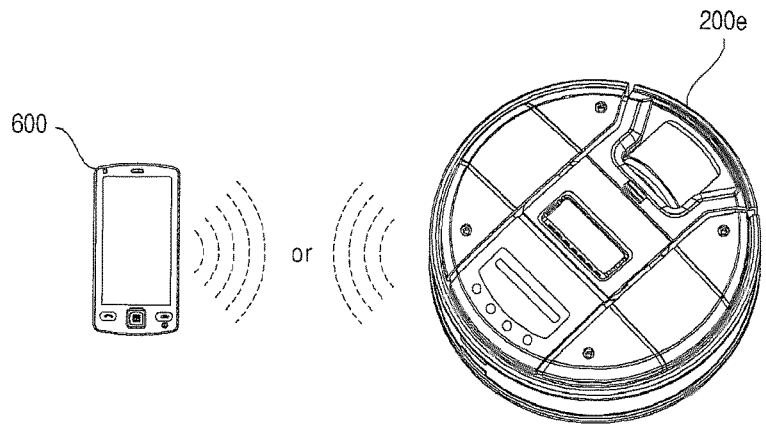
[Fig. 3a]
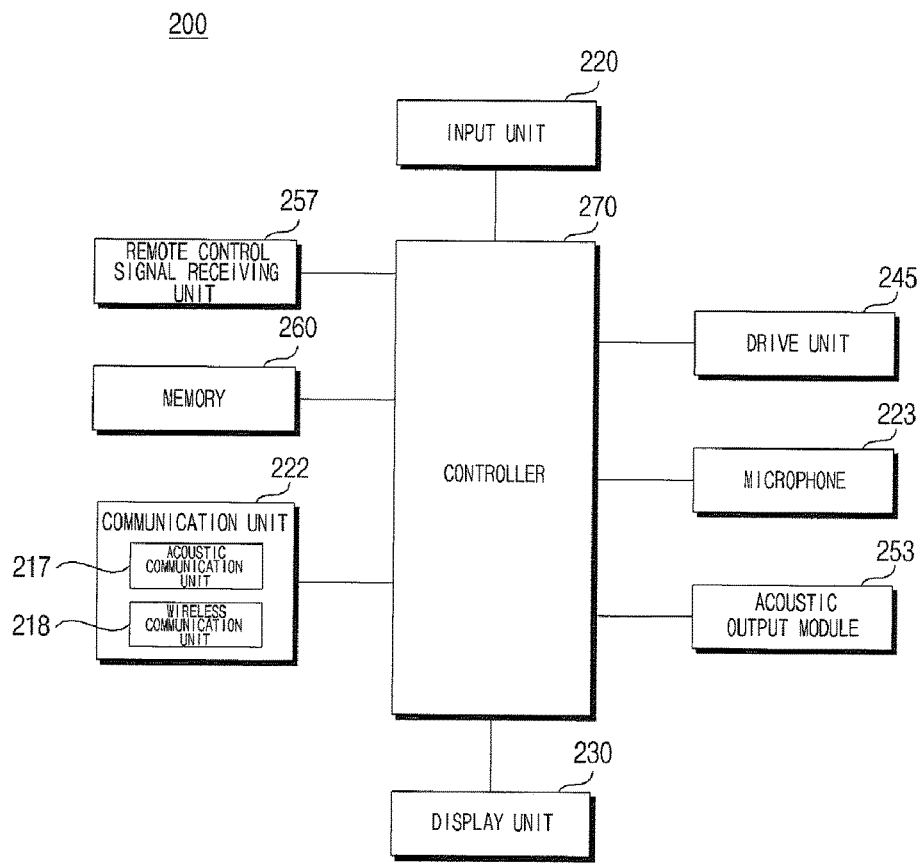

[Fig. 3b]
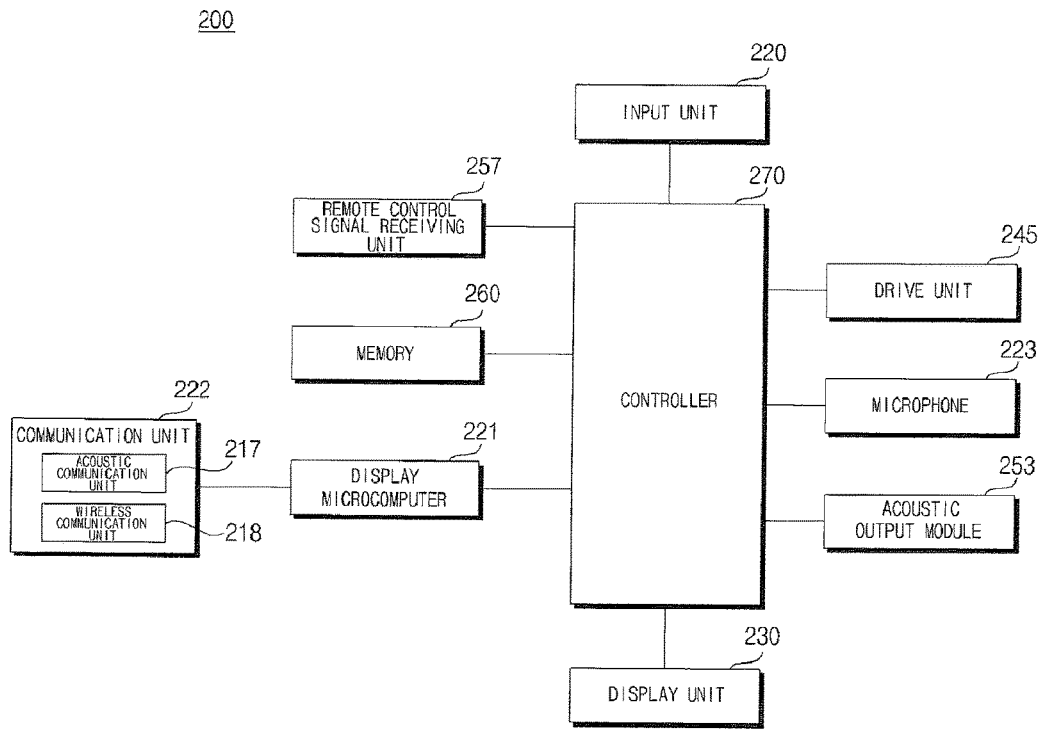
[Fig. 4a]
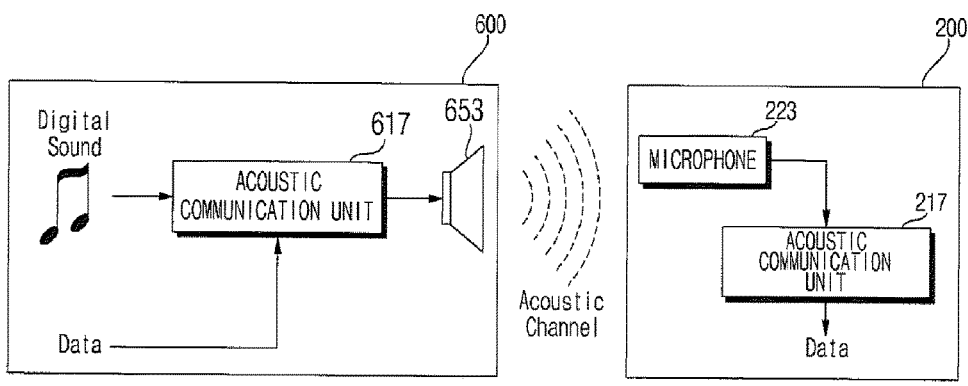

[Fig. 4b]
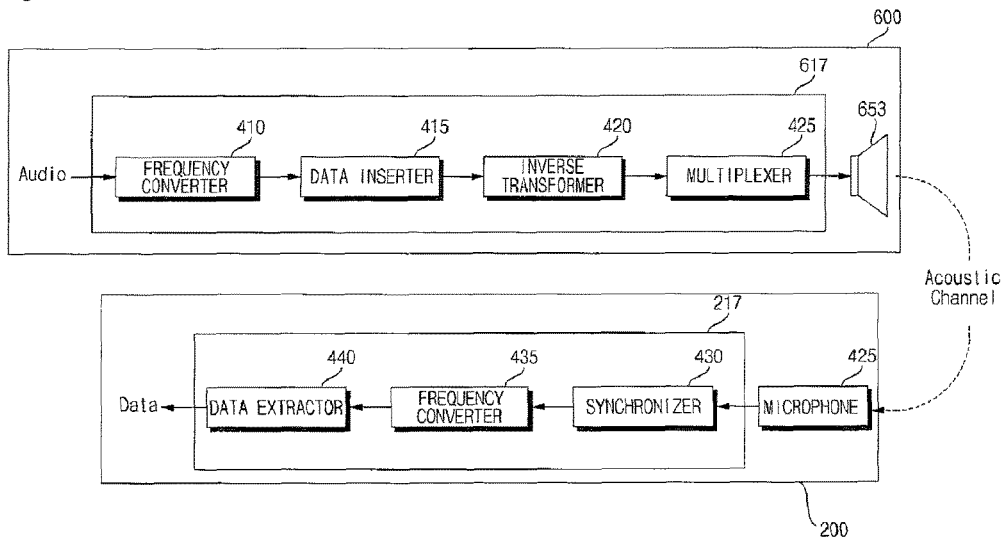
[Fig. 4c]
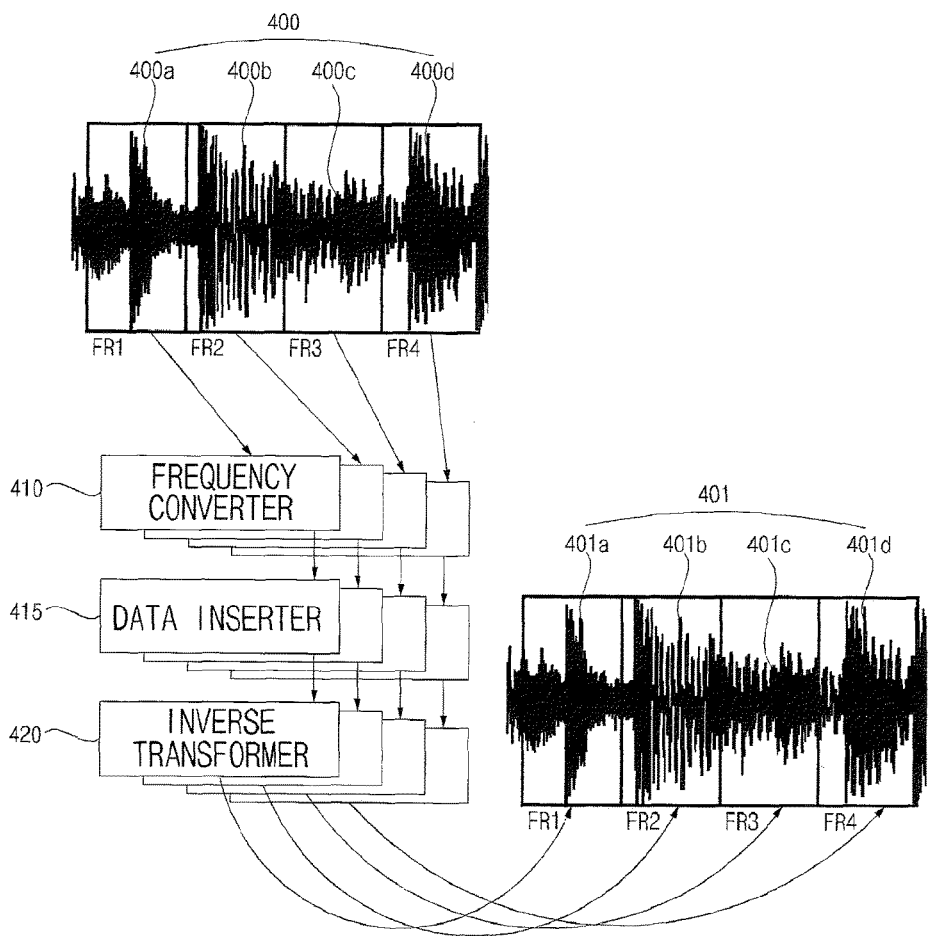

[Fig. 4d]
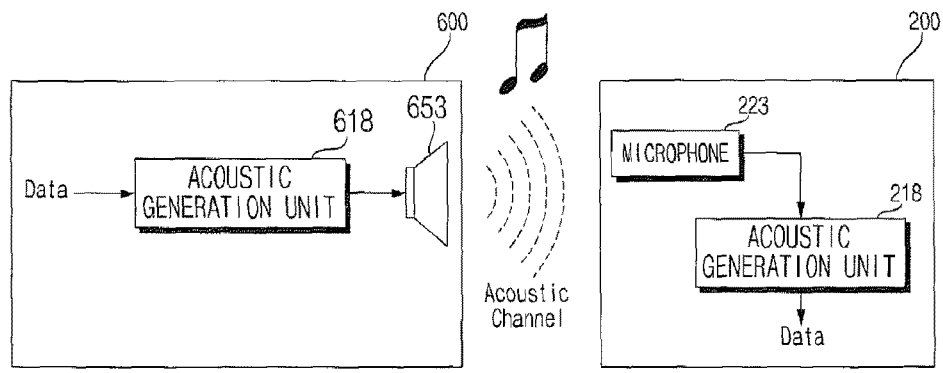
[Fig. 5]
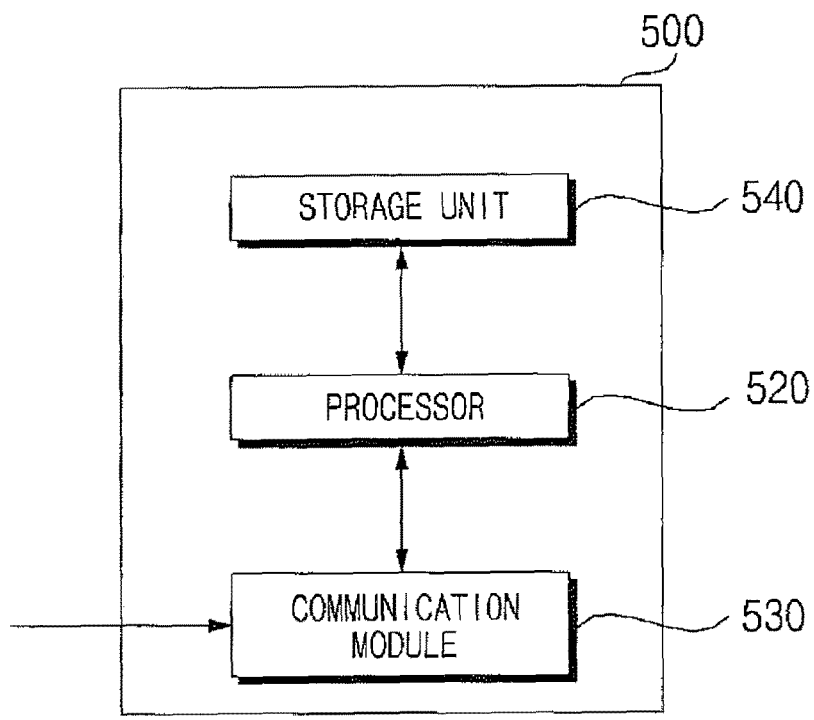

[Fig. 6]
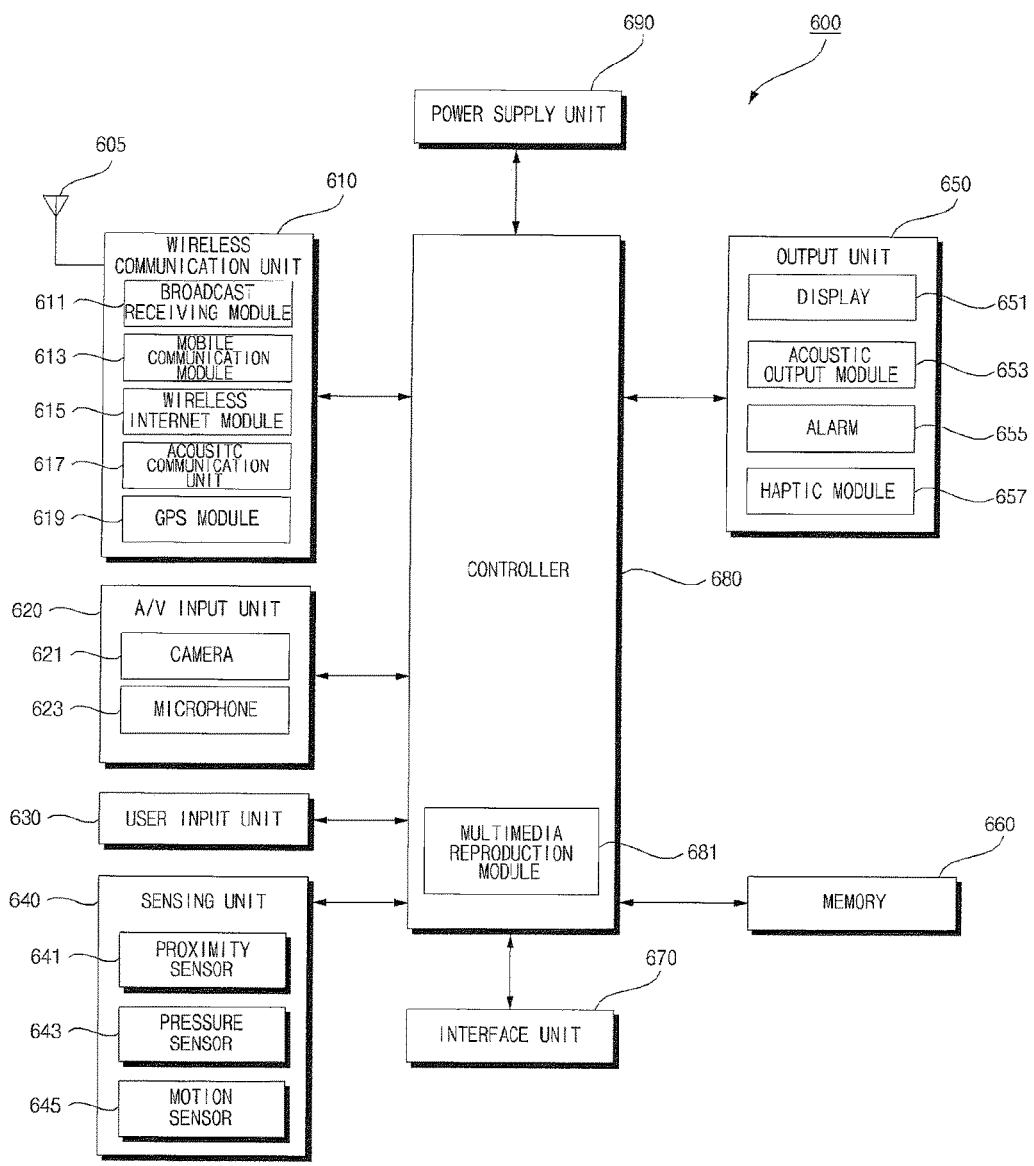

[Fig. 7]
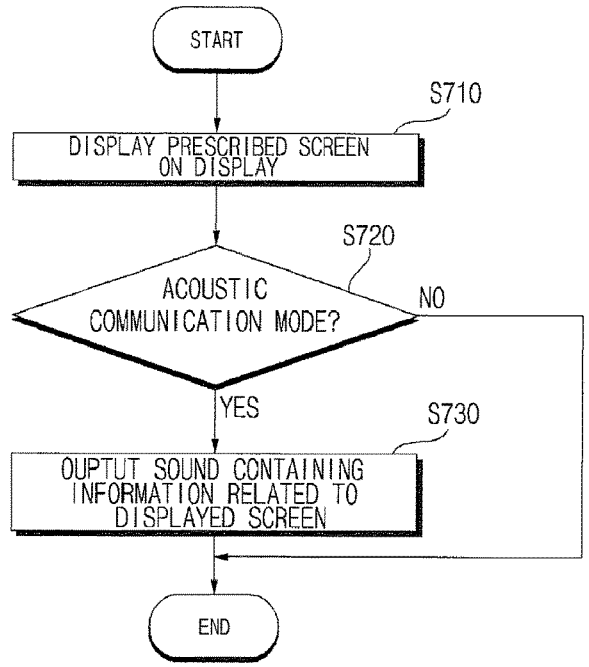
[Fig. 8]
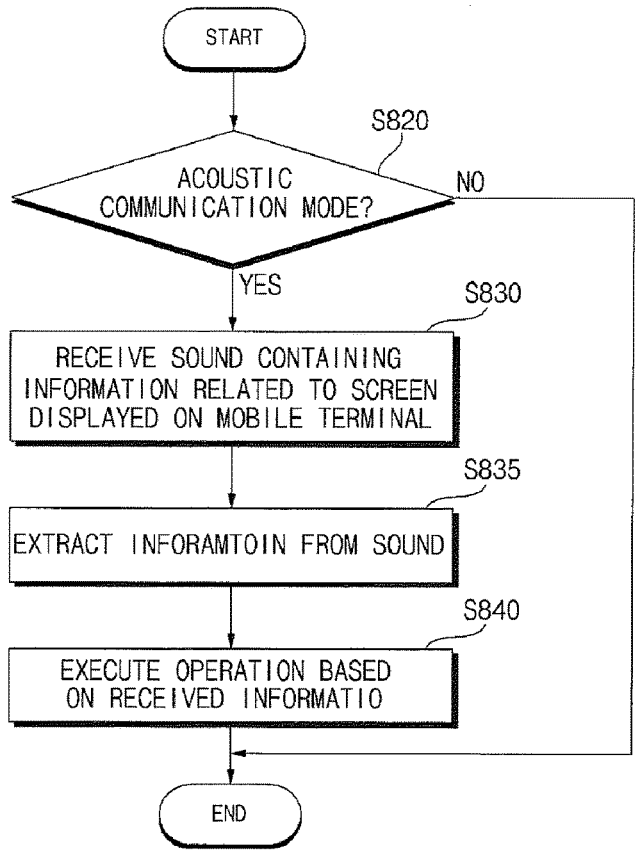

[Fig. 9]
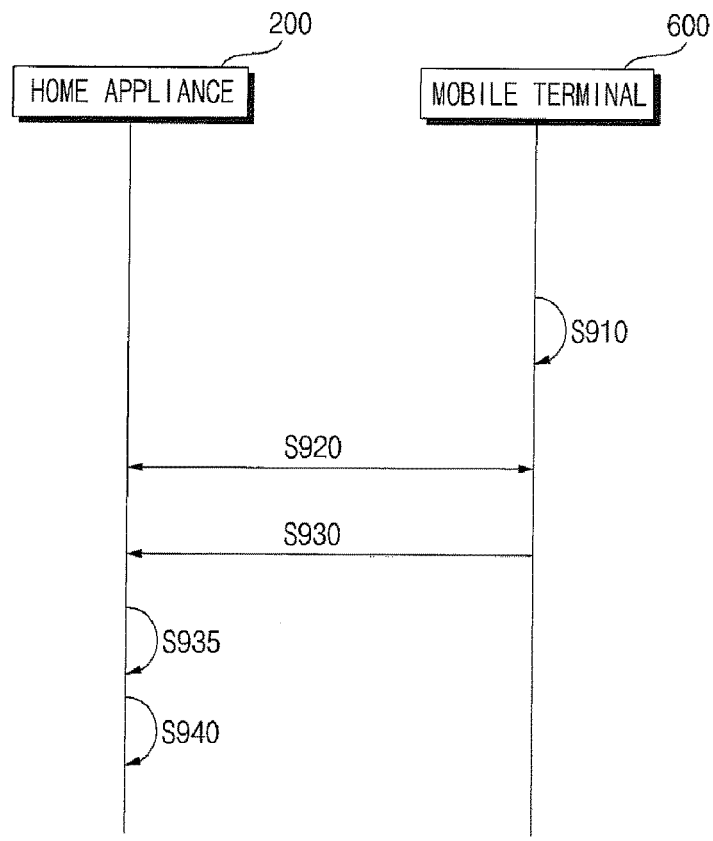
[Fig. 10a]
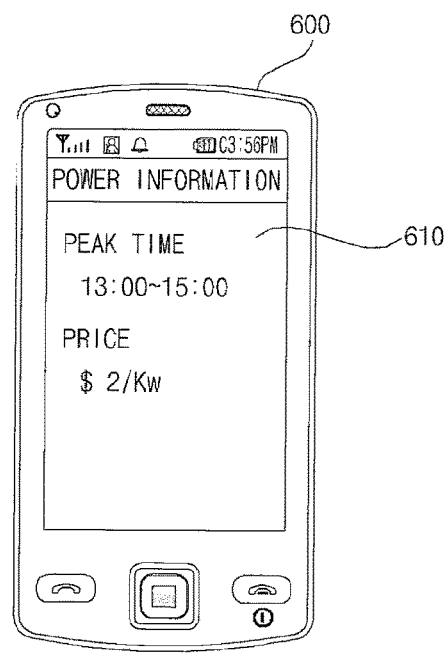

[Fig. 10b]
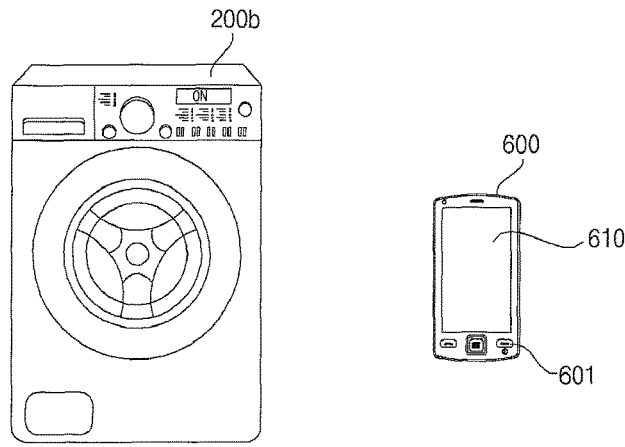
[Fig. 10c]
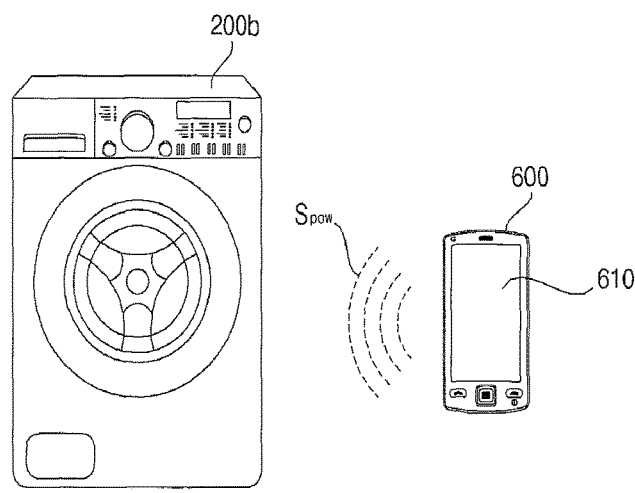
[Fig. 10d]
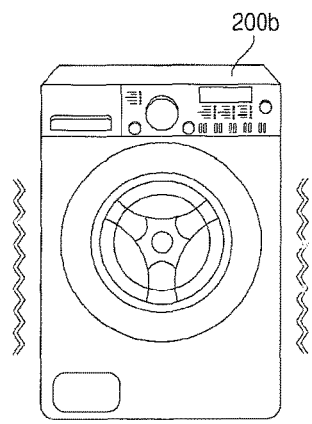

[Fig. 11a]
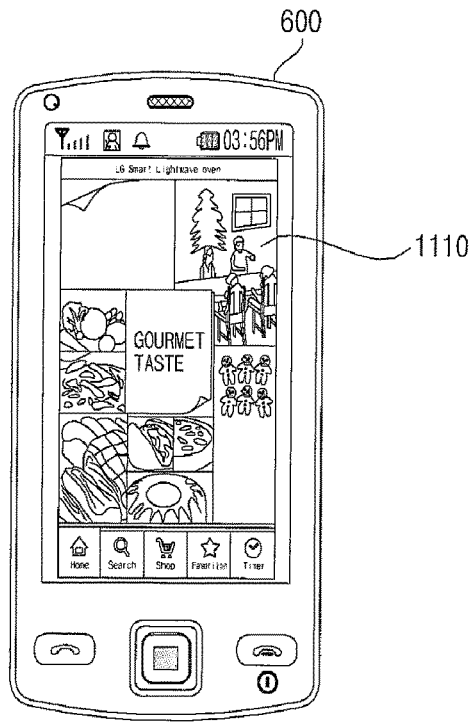
[Fig. 11b]
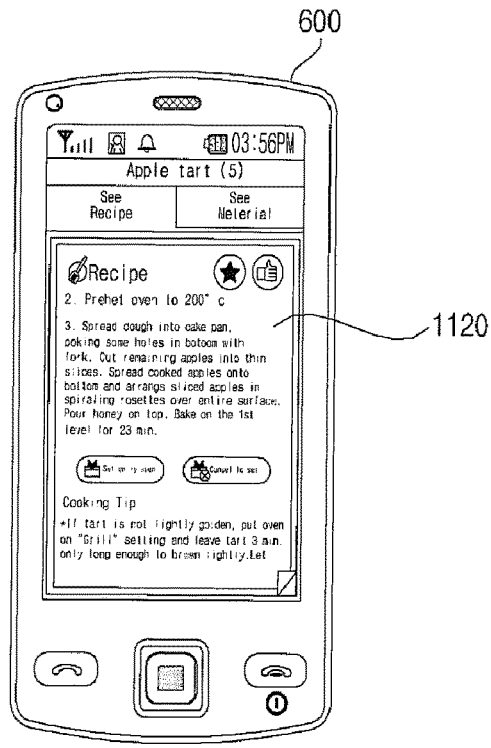

[Fig. 11c]
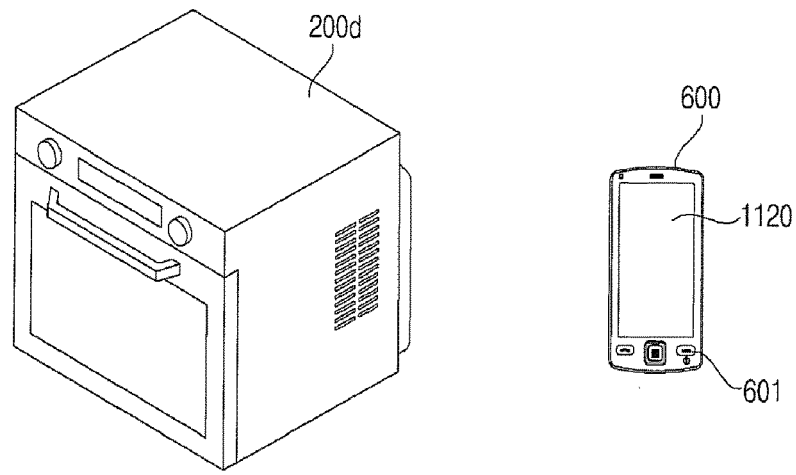
[Fig. 11d]
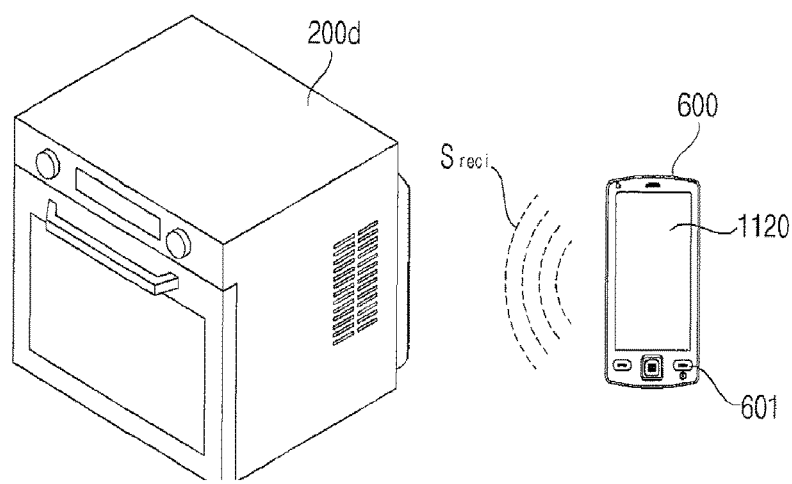
[Fig. 11e]
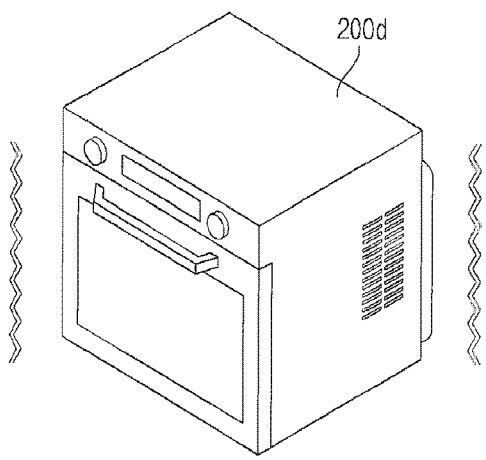

[Fig. 12a]
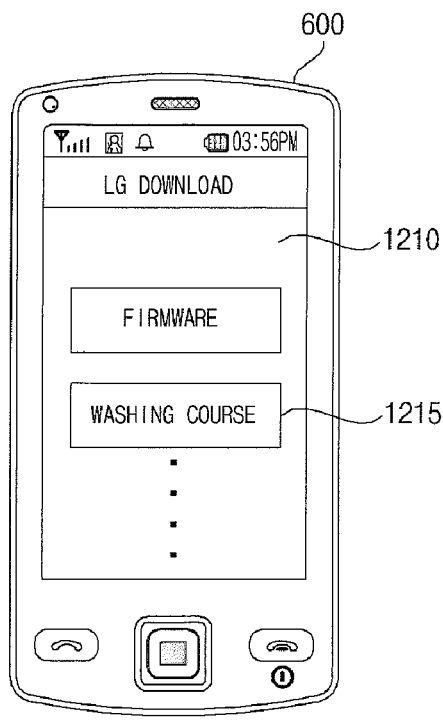
[Fig. 12b]
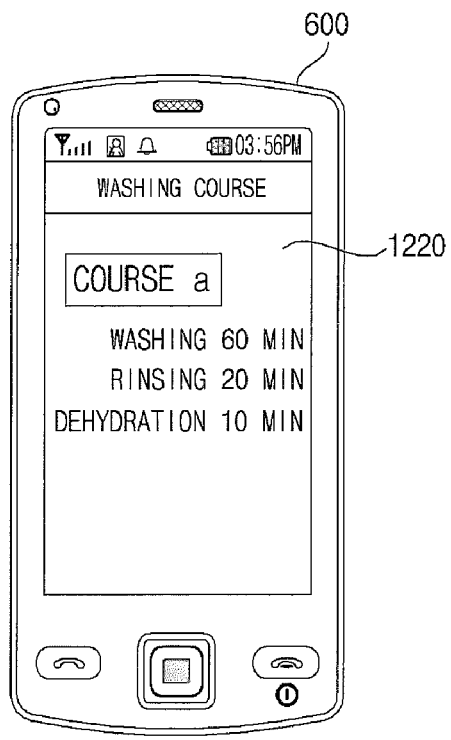

[Fig. 12c]
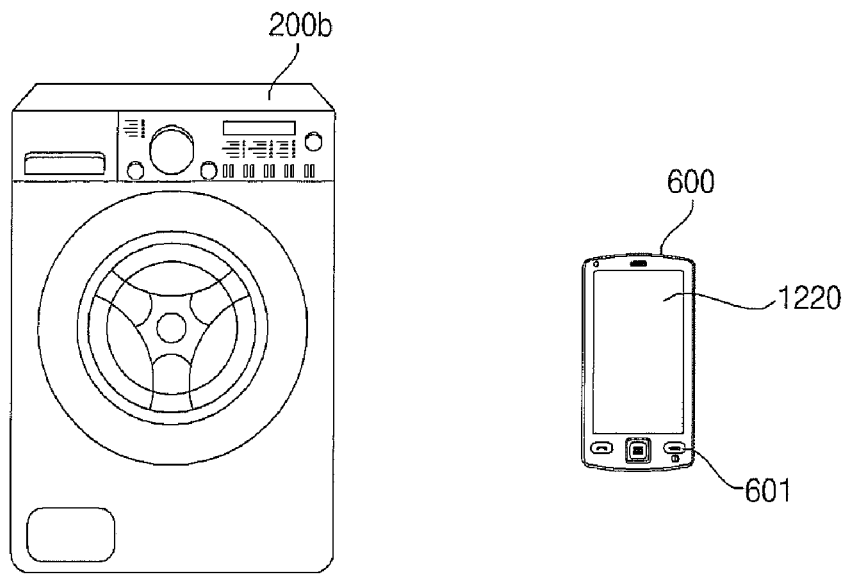
[Fig. 12d]
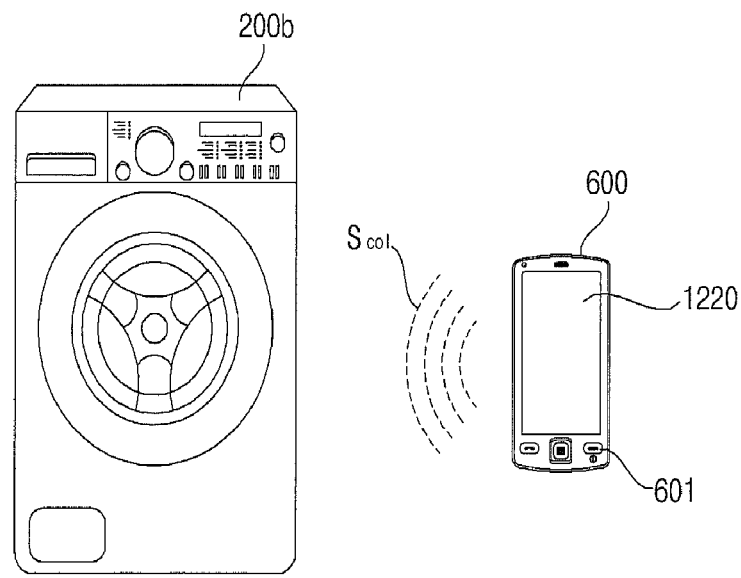

[Fig. 12e]
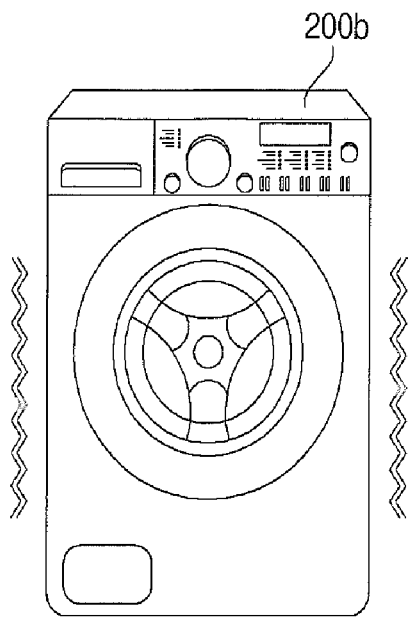
[Fig. 13a]
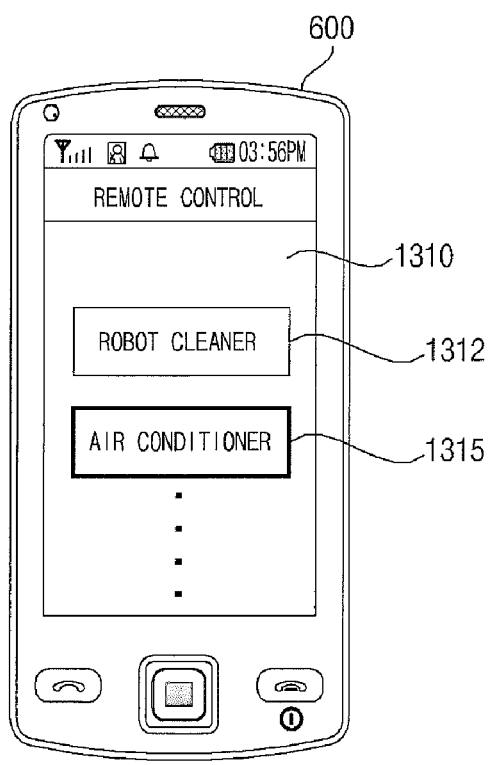

[Fig. 13b]
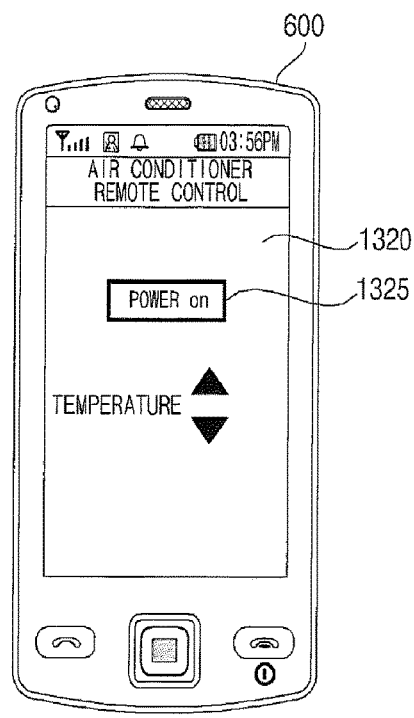
[Fig. 13c]
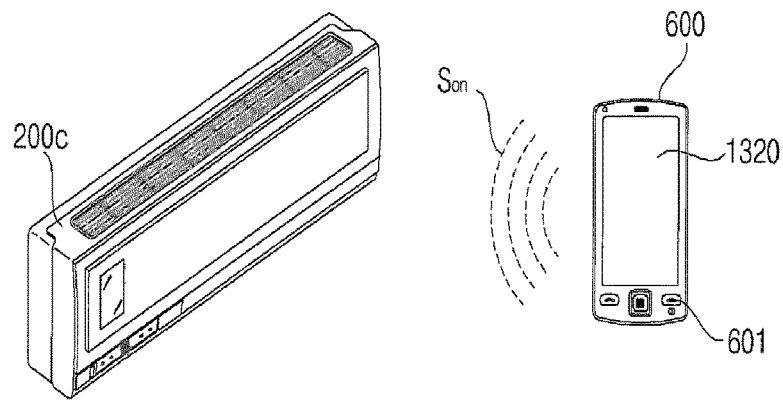

[Fig. 13d]
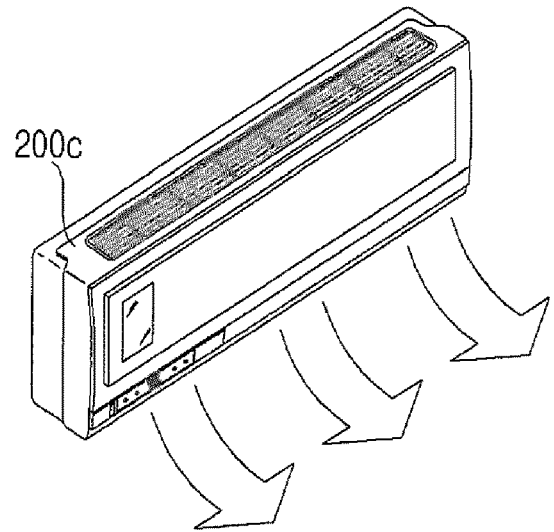
[Fig. 14]
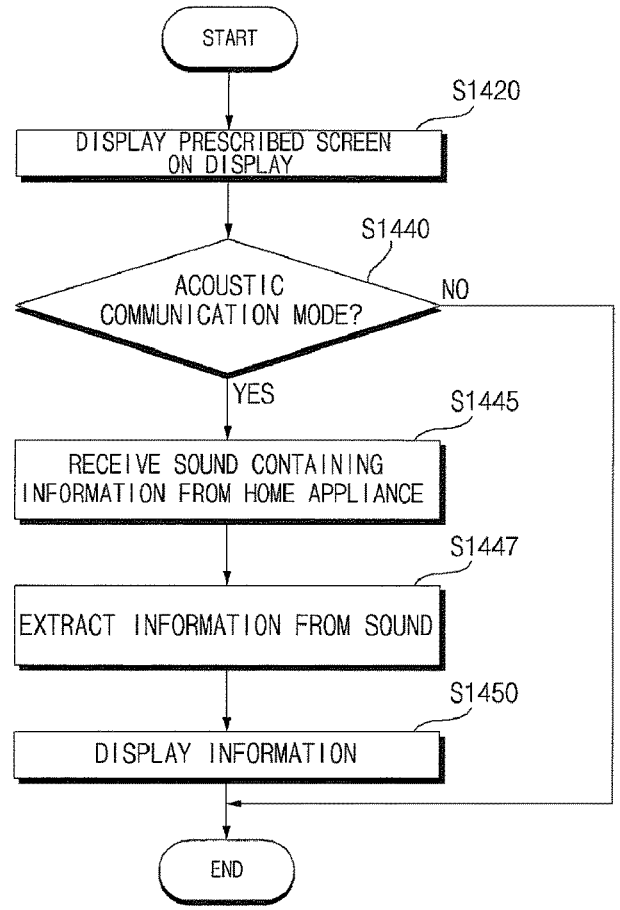

[Fig. 15]
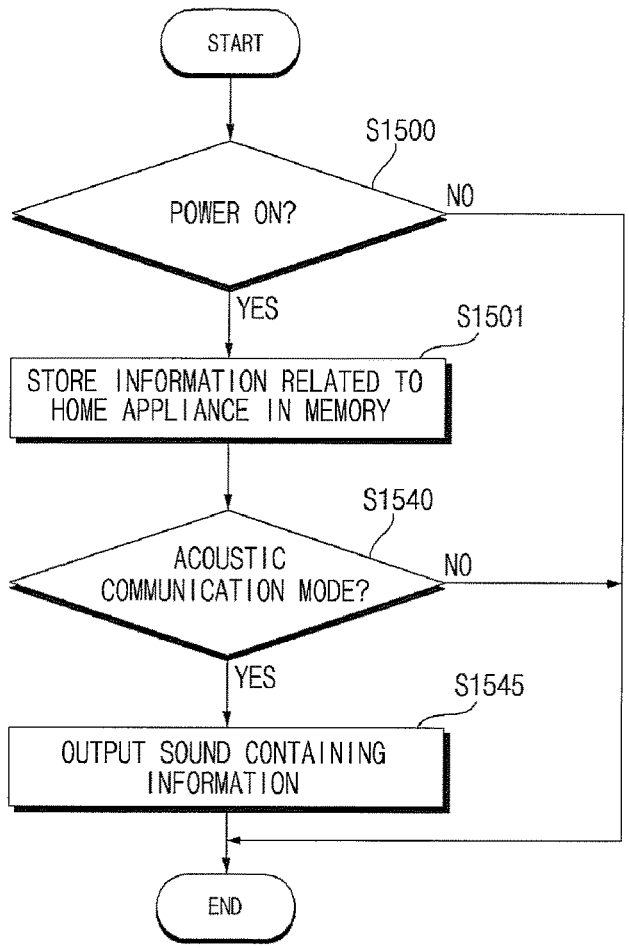
[Fig. 16a]
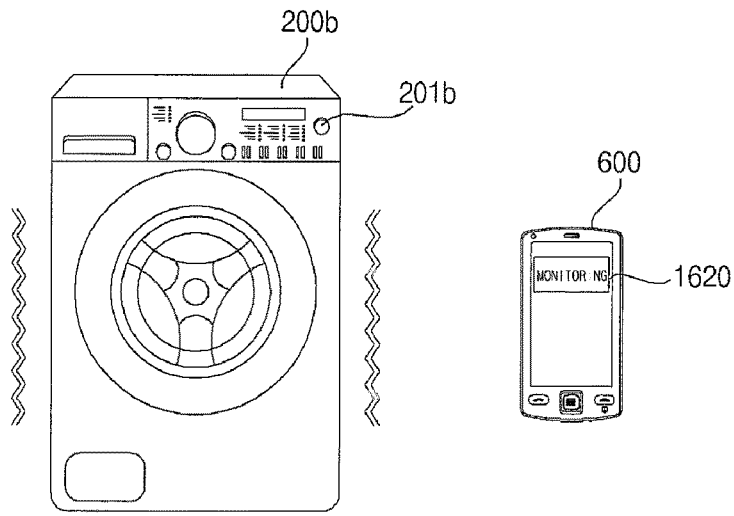

[Fig. 16b]
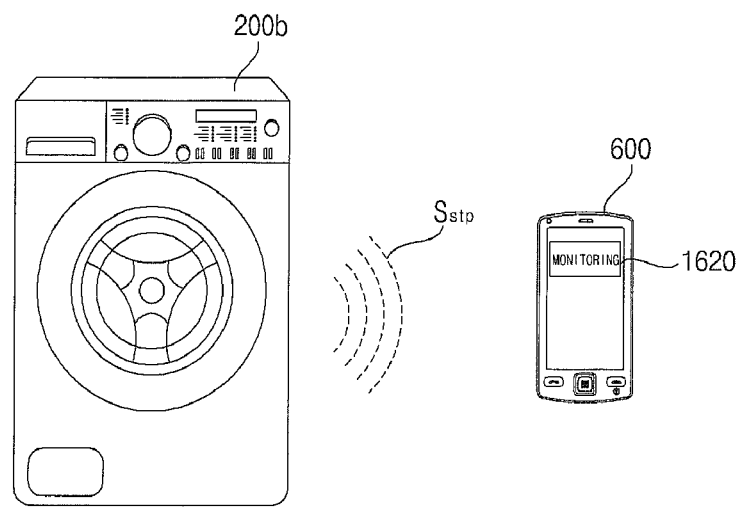
[Fig. 16c]
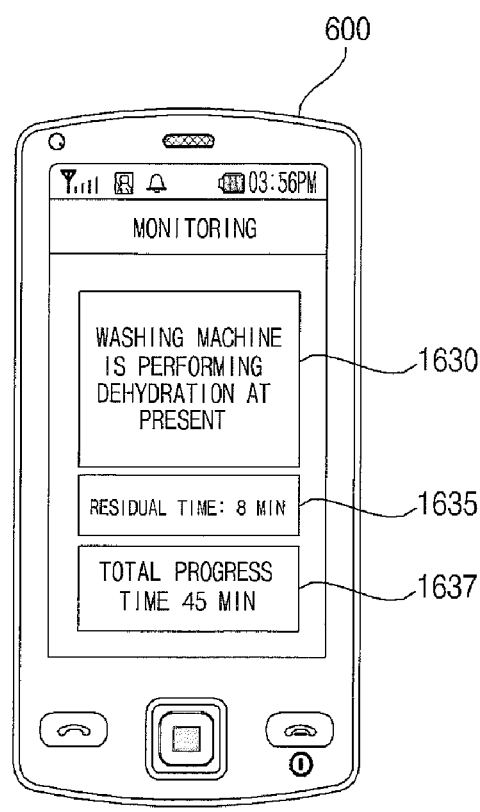

[Fig. 17a]
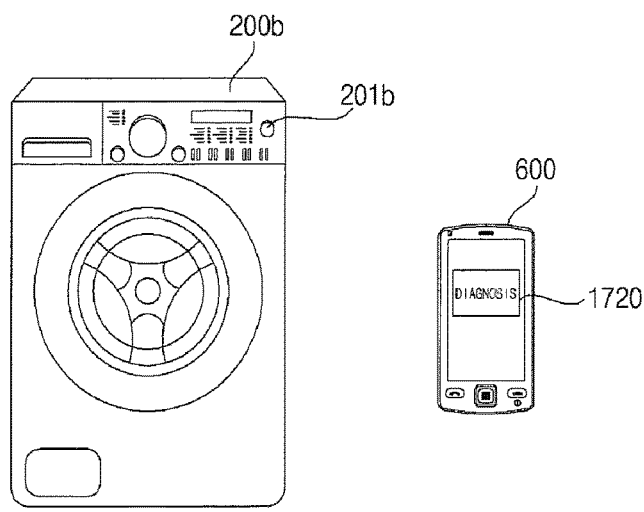
[Fig. 17b]
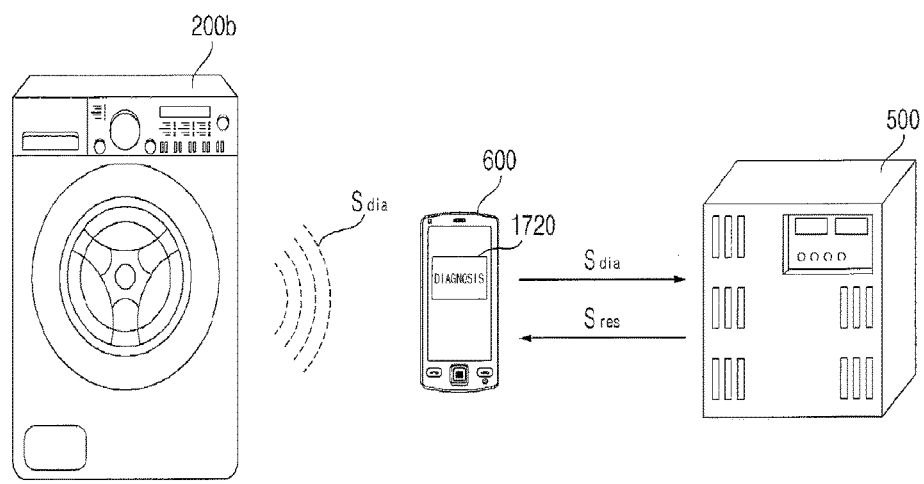

[Fig. 17c]
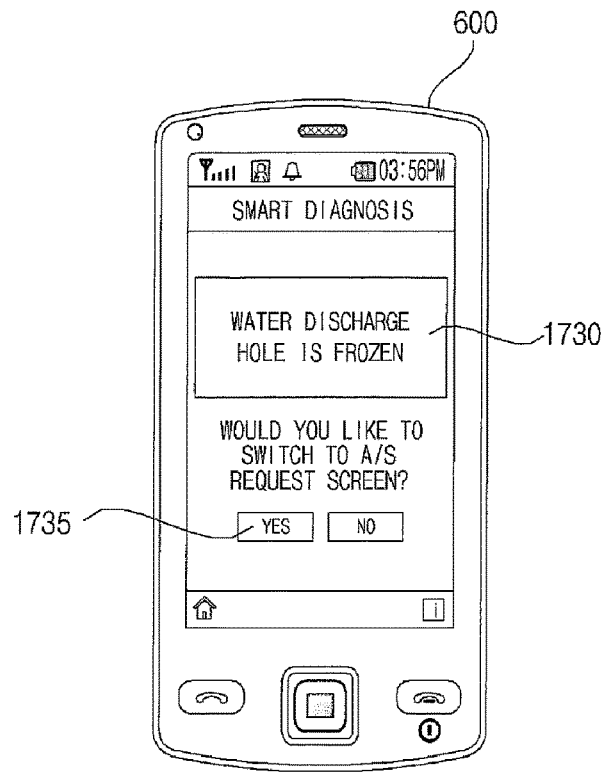
[Fig. 17d]
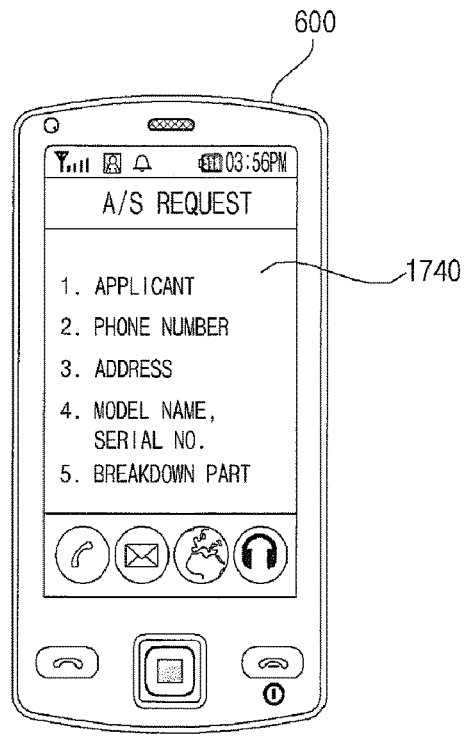

[Fig. 18a]
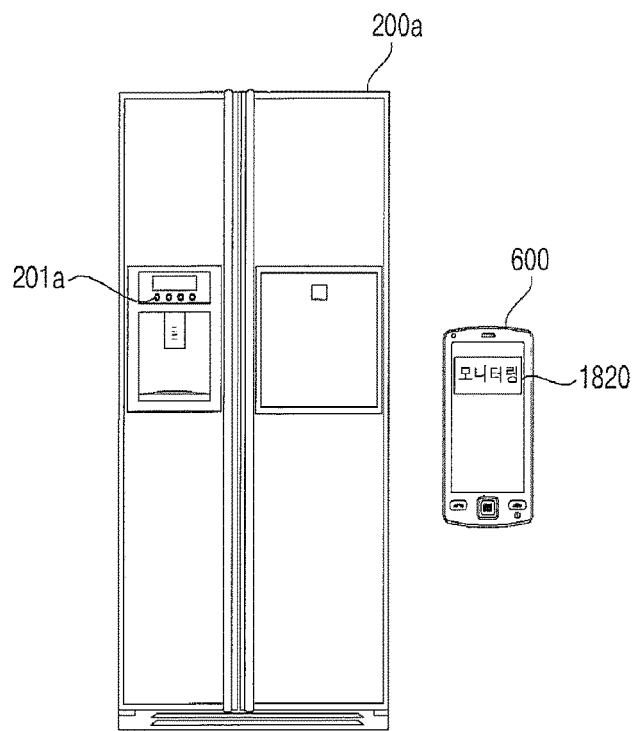
[Fig. 18b]
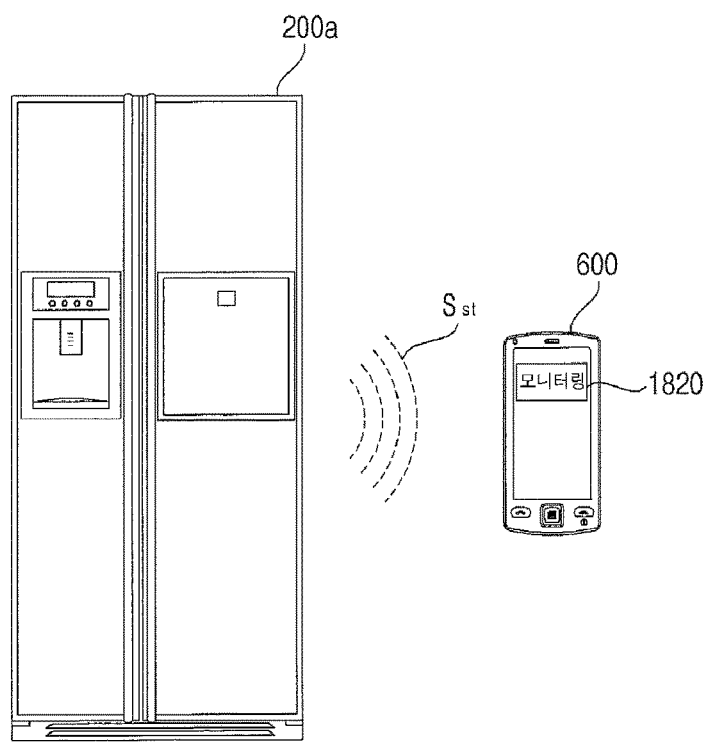

[Fig. 18c]
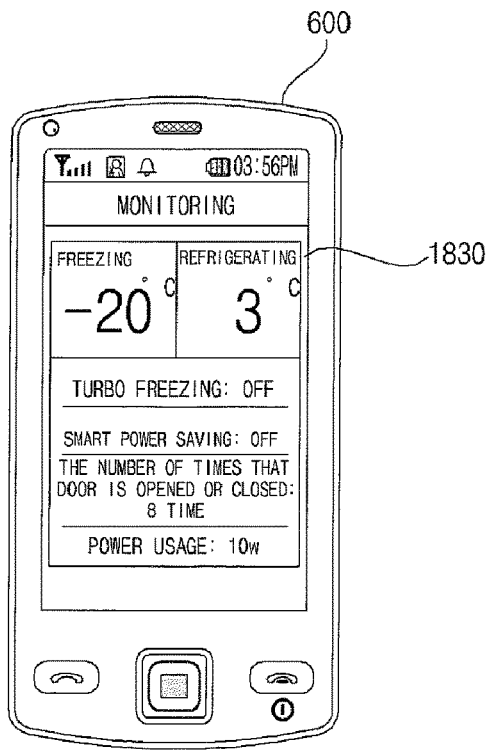
[Fig. 19a]
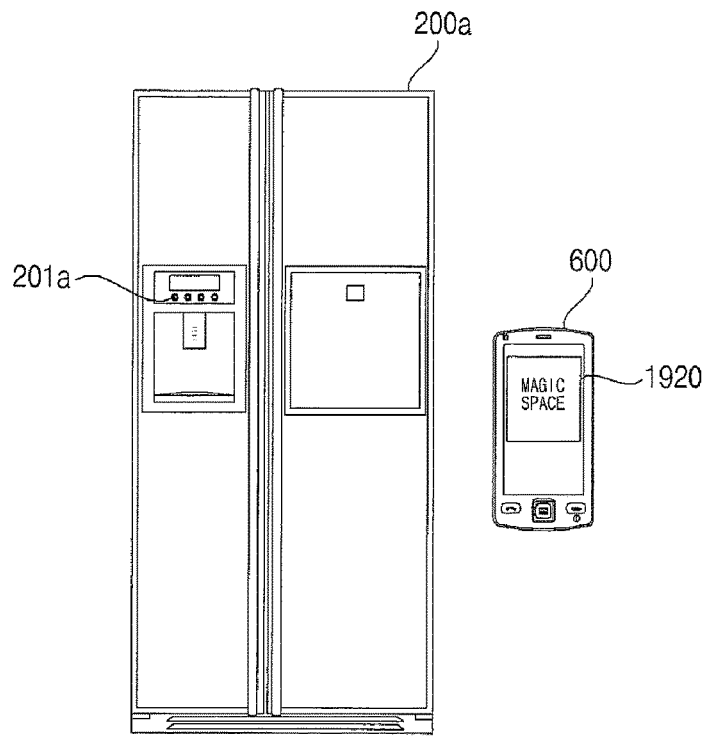

[Fig. 19b]
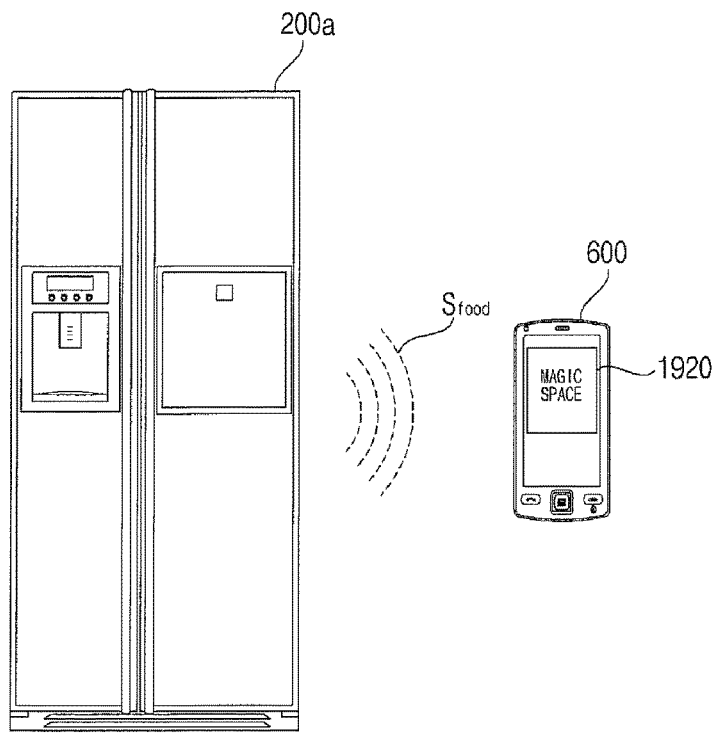
[Fig. 19c]
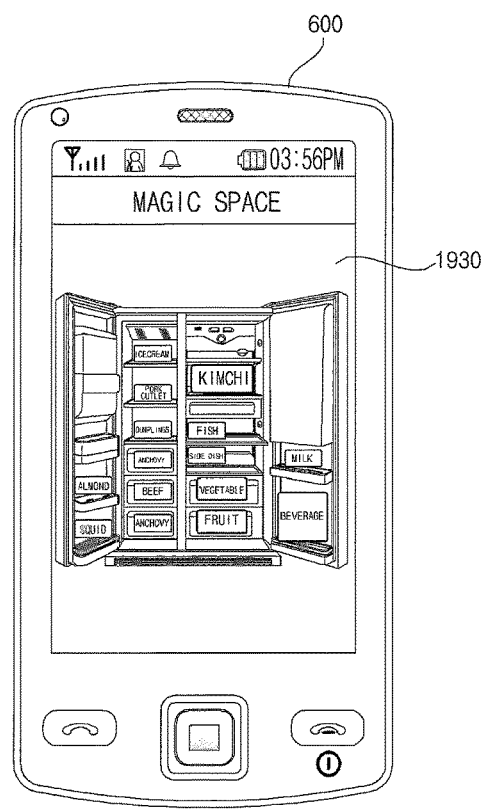

[Fig. 20a]
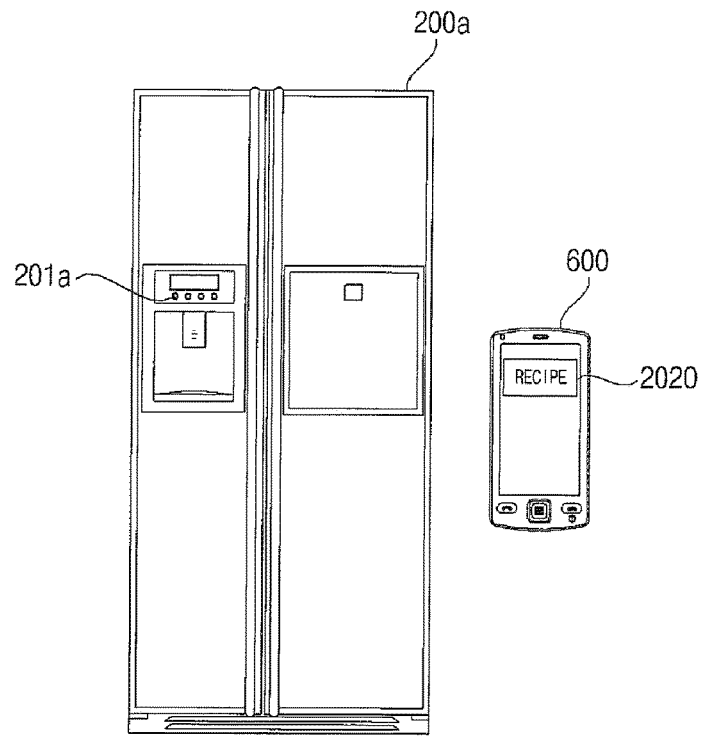
[Fig. 20b]
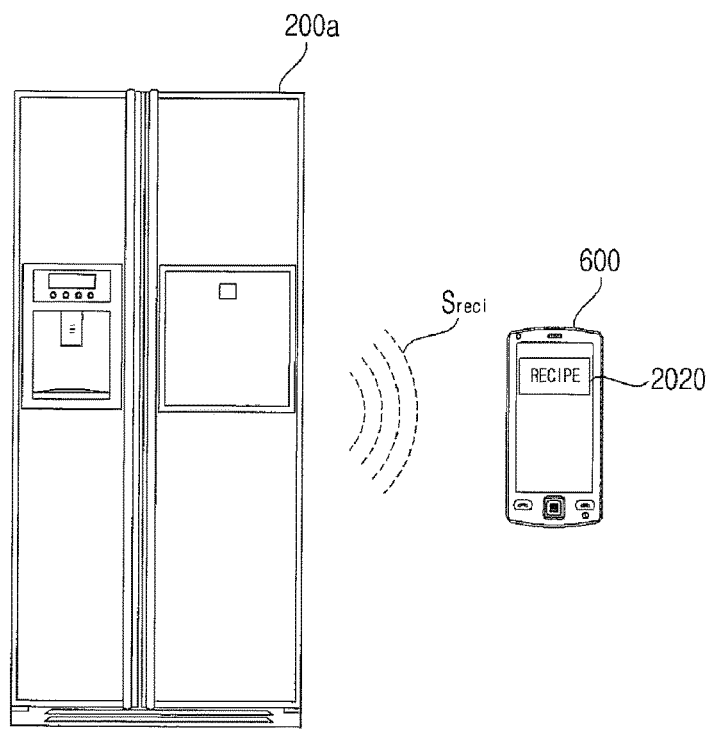

[Fig. 20c]
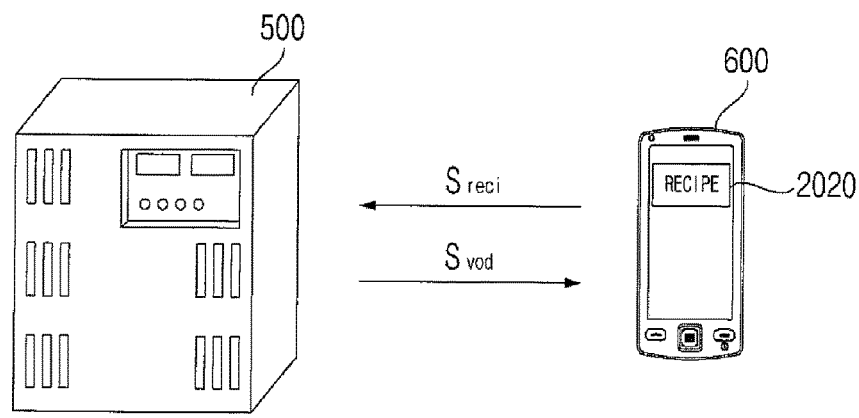
[Fig. 20d]
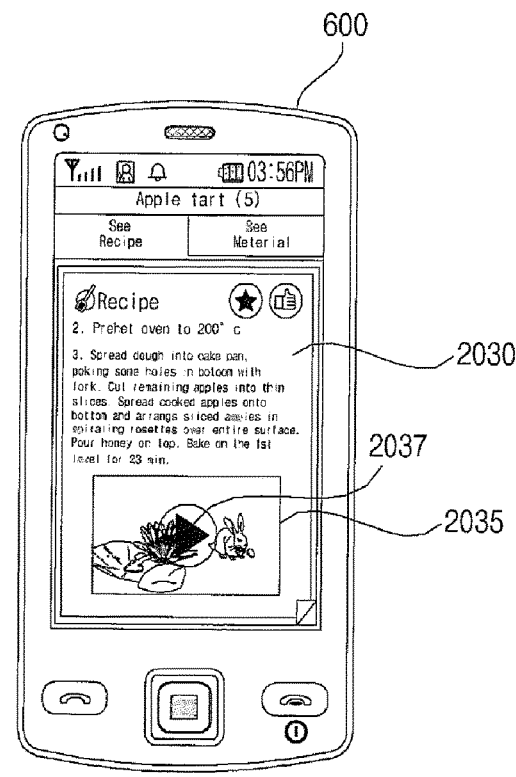

[Fig. 21a]
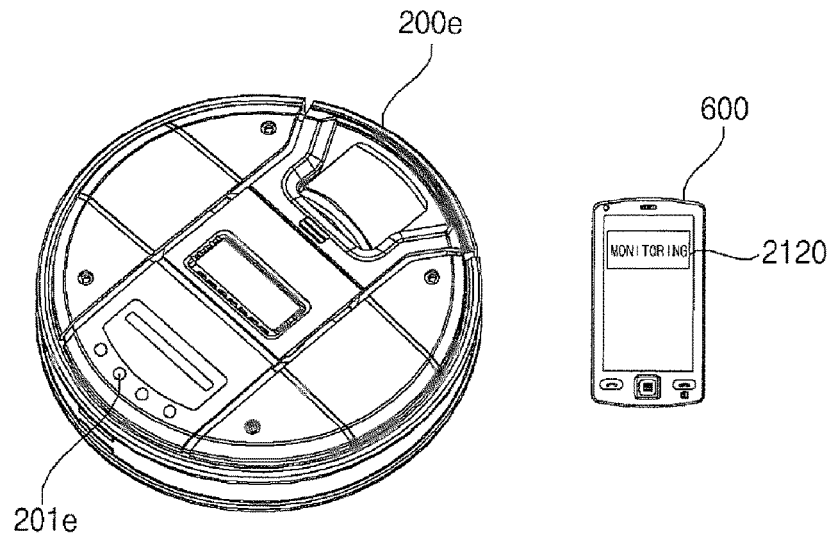
[Fig. 21b]
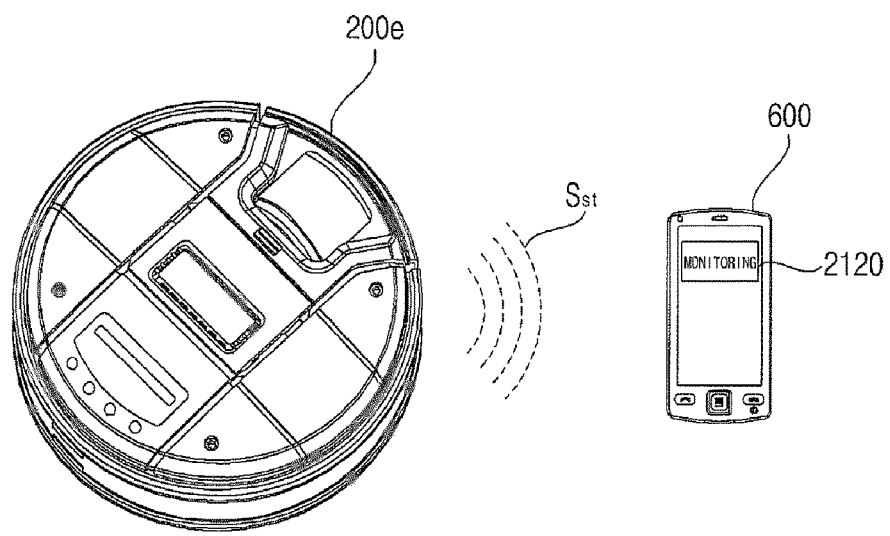

[Fig. 21c]
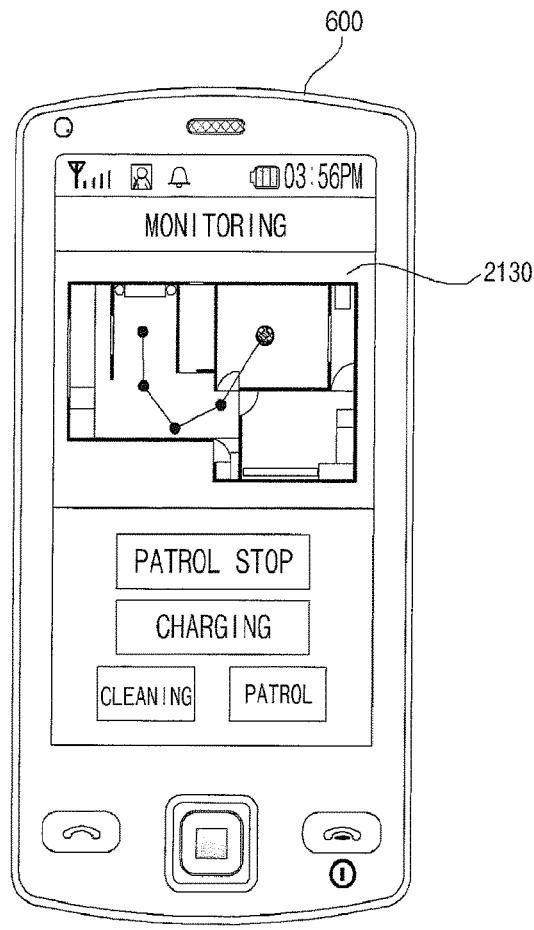
[Fig. 22a]
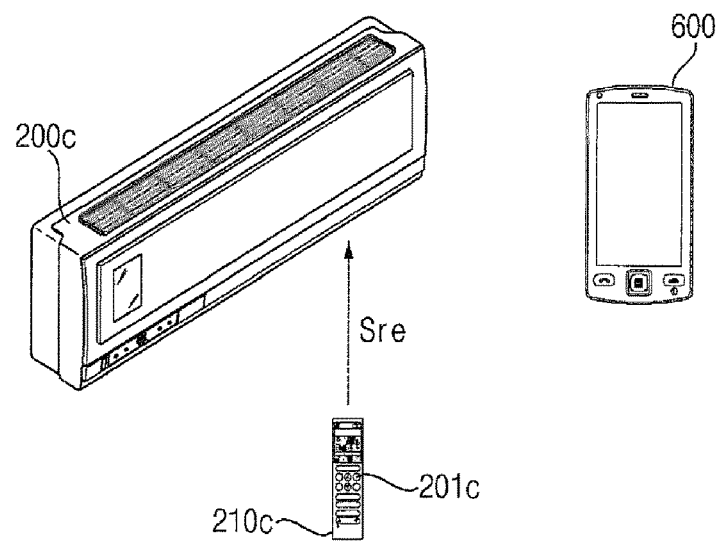

[Fig. 22b]
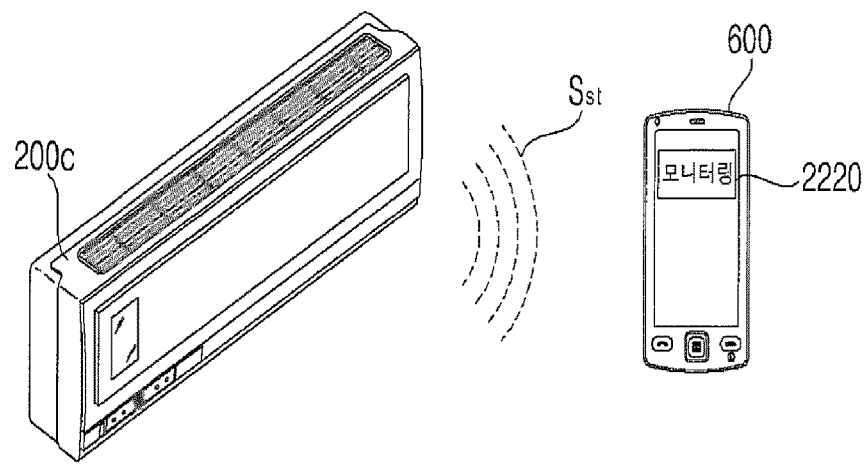
[Fig. 22c]
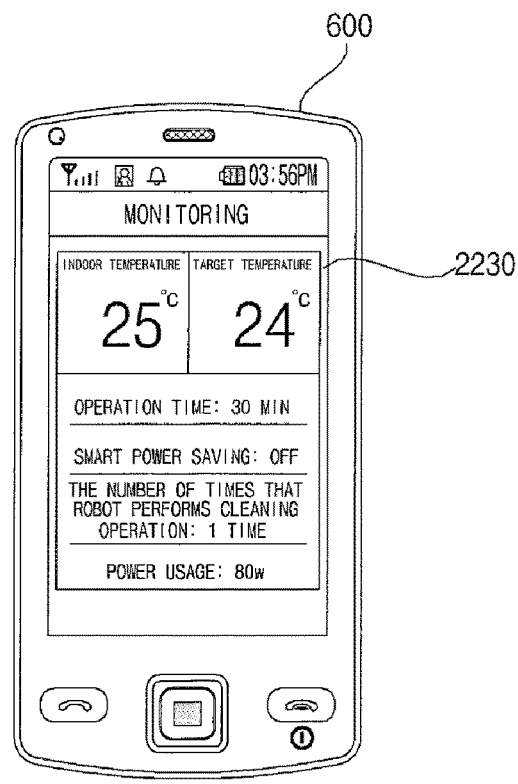

[Fig. 23]
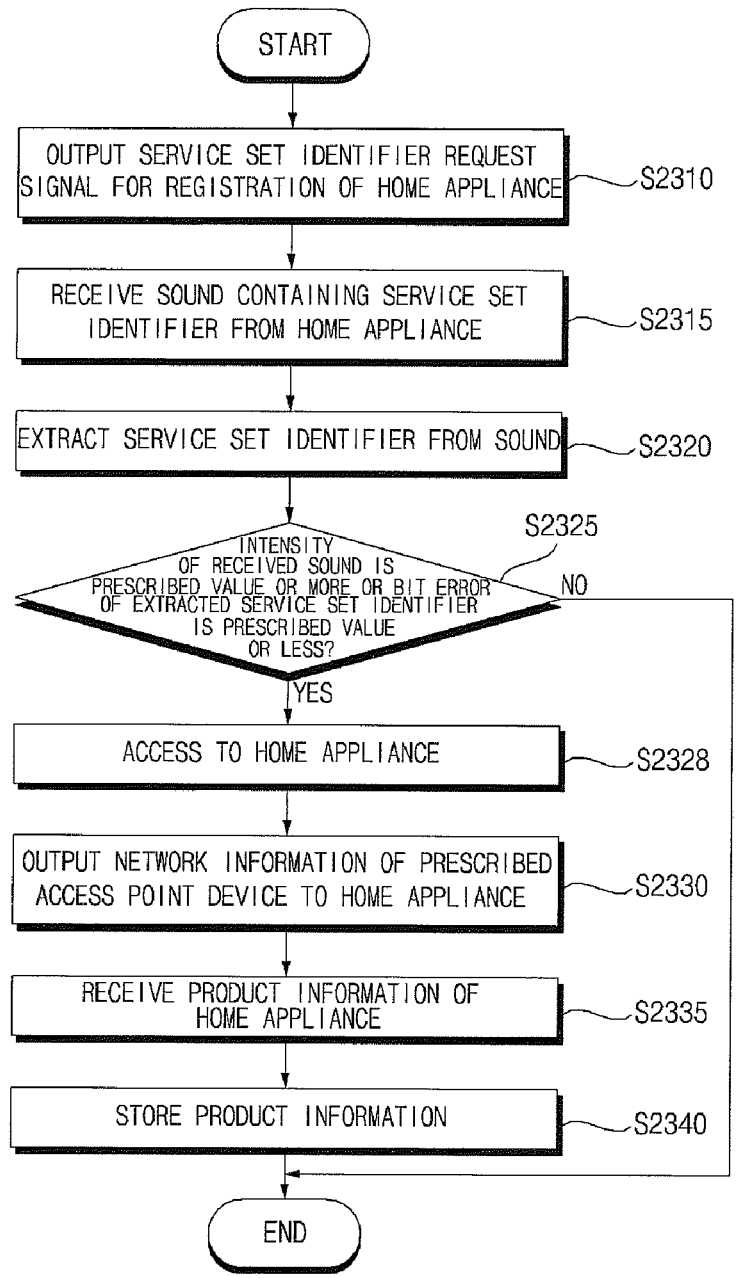

[Fig. 24a]
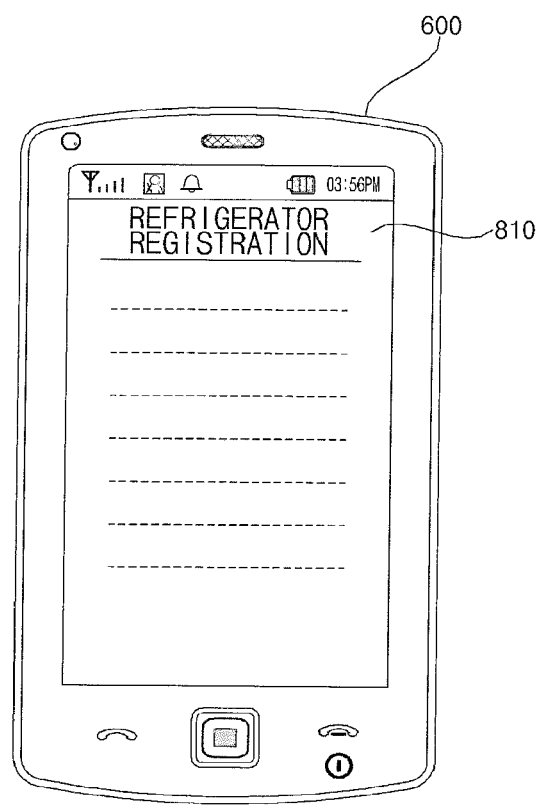

[Fig. 24b]
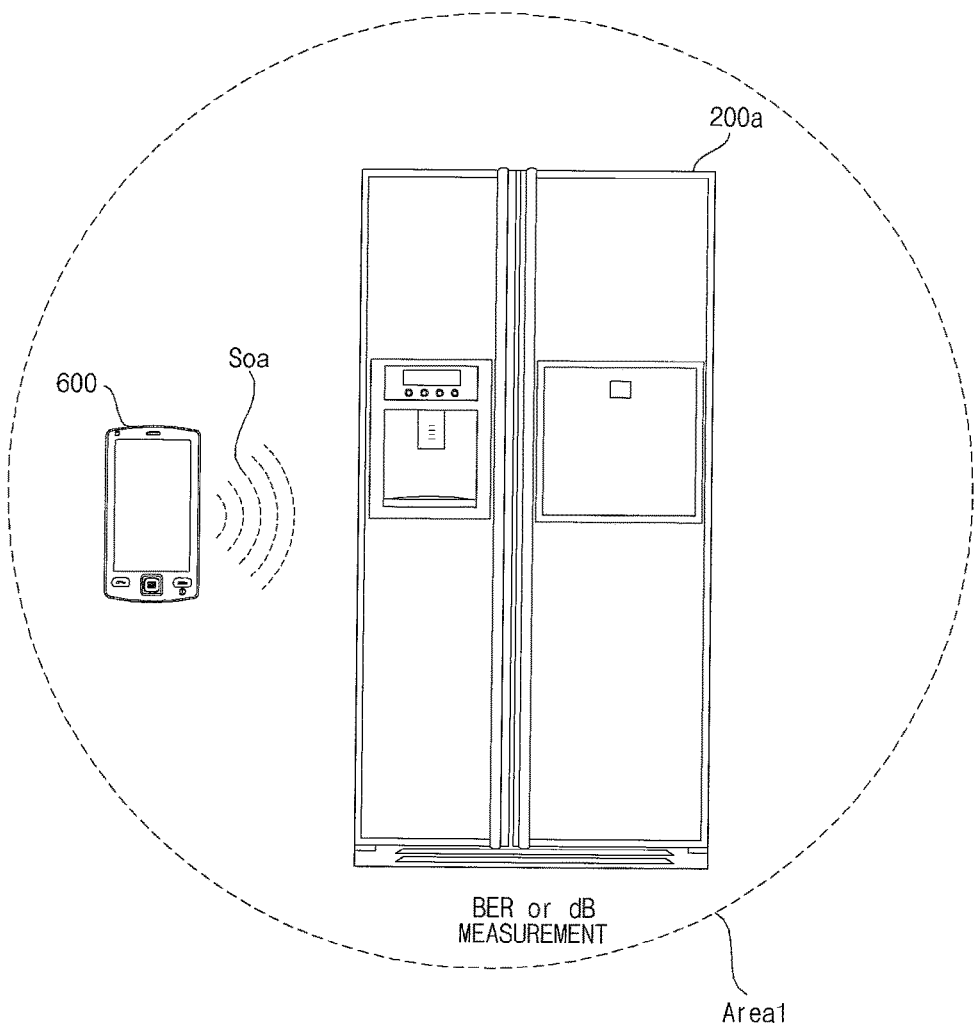

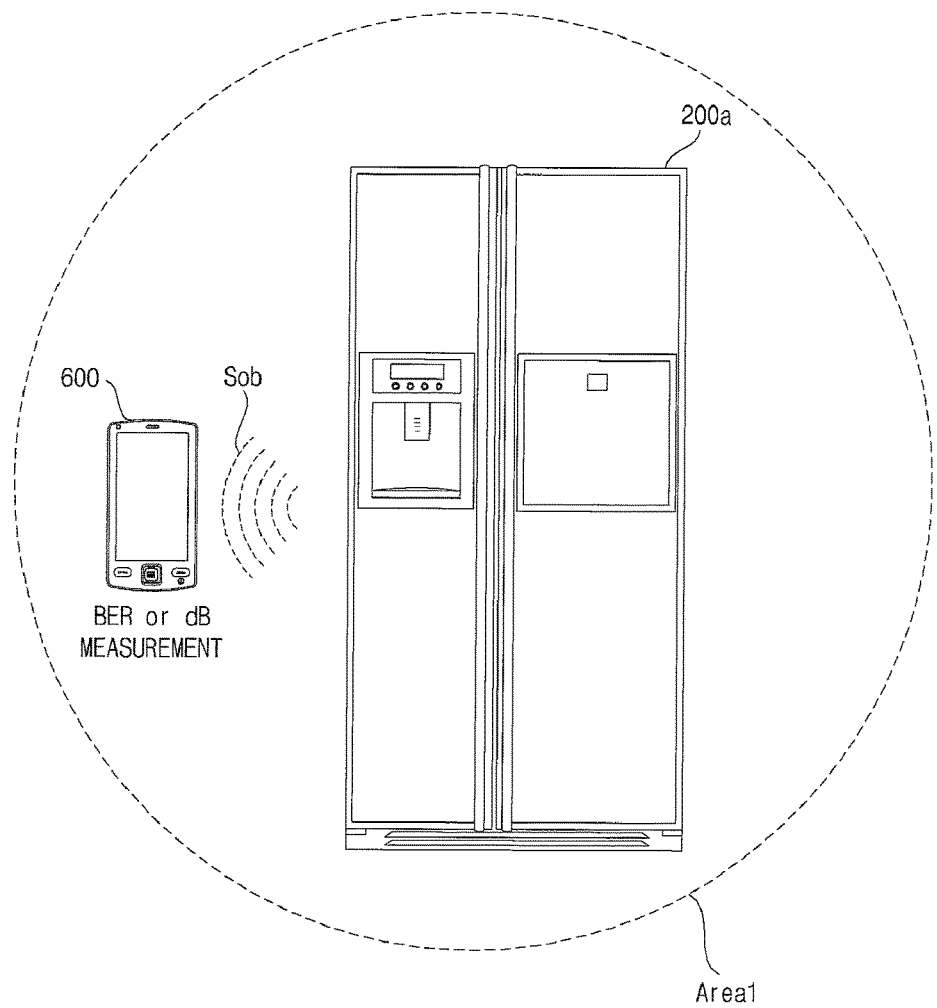
[Fig. 24c]

[Fig. 24d]
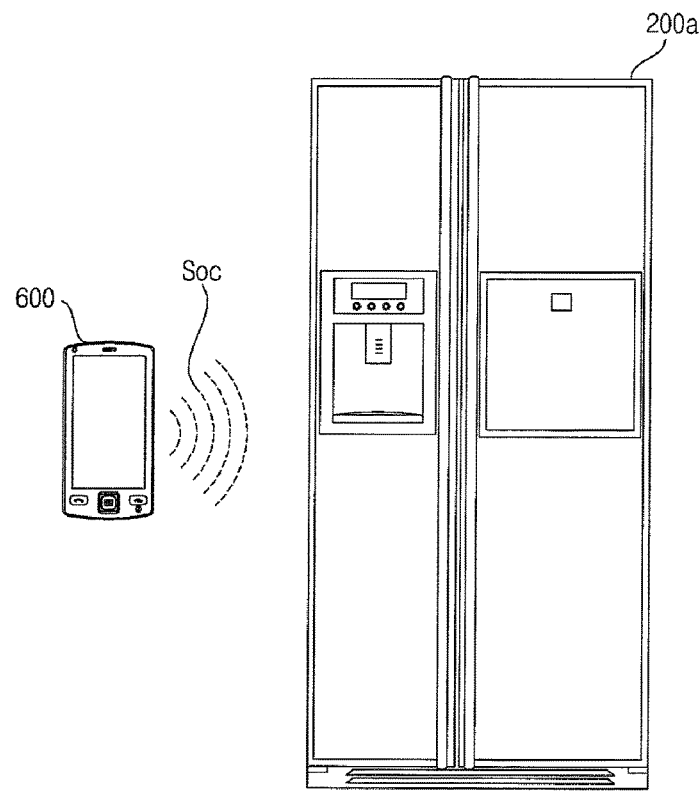
[Fig. 24e]
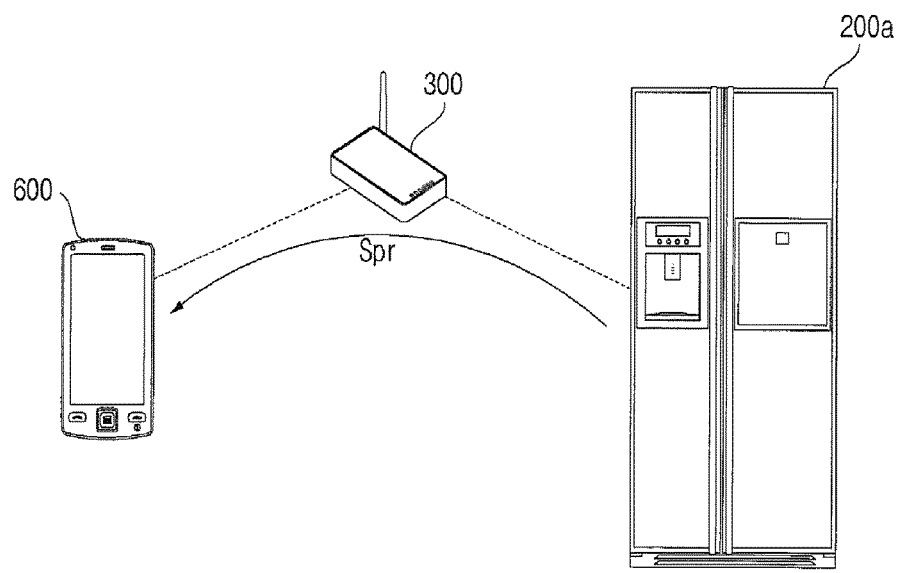

[Fig. 25a]
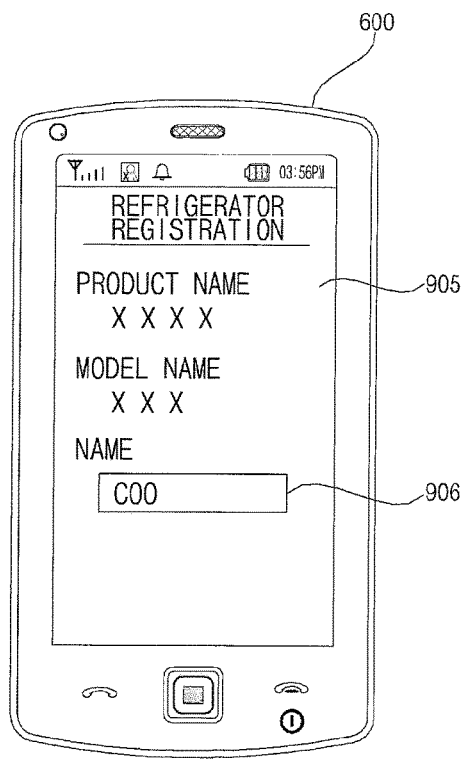
[Fig. 25b]
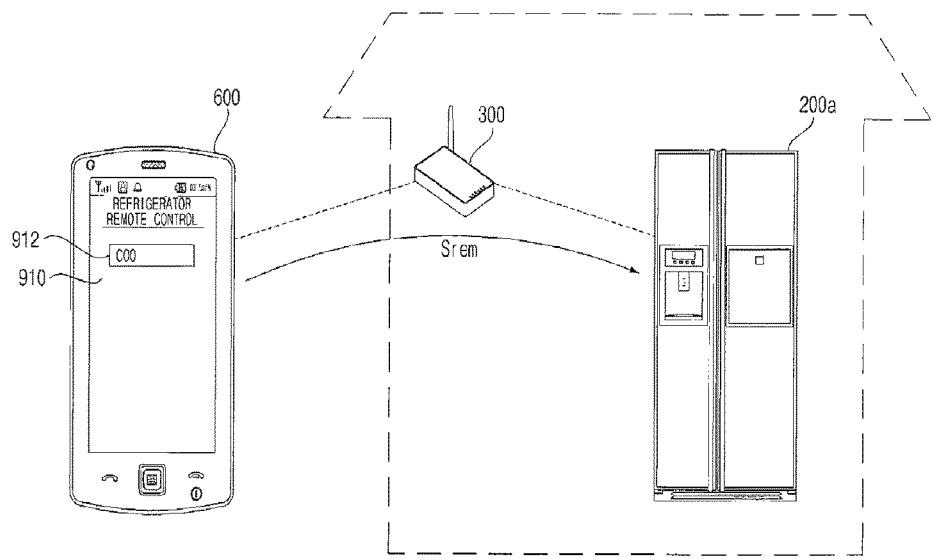

[Fig. 26a]
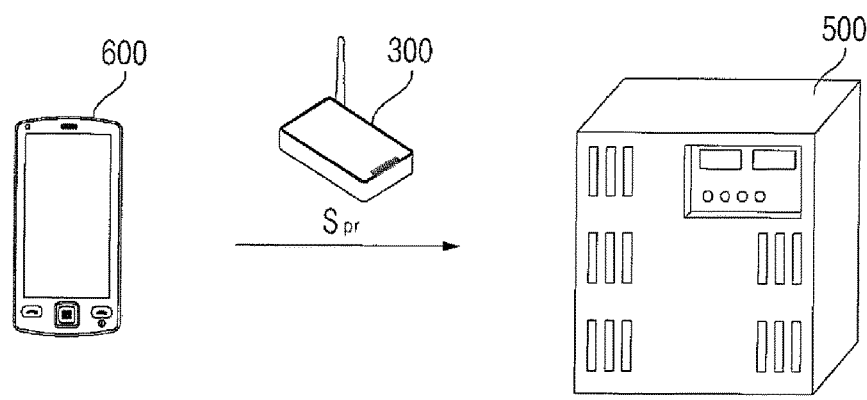
[Fig. 26b]
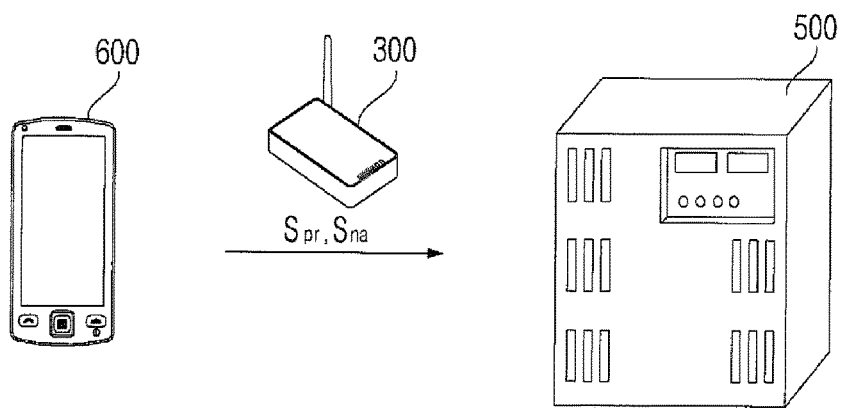

[Fig. 27a]
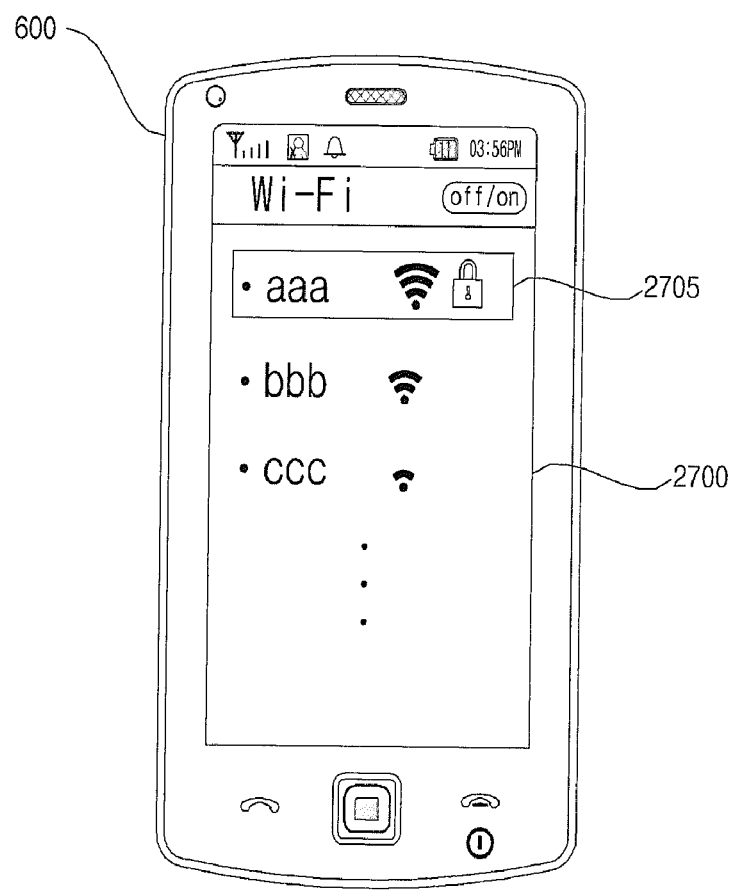

[Fig. 27b]
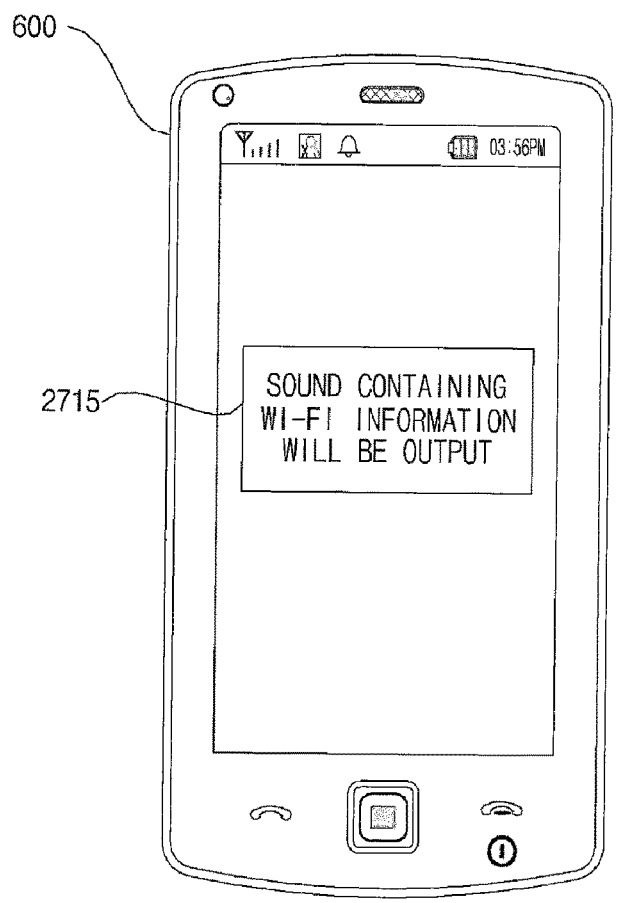
[Fig. 27c]
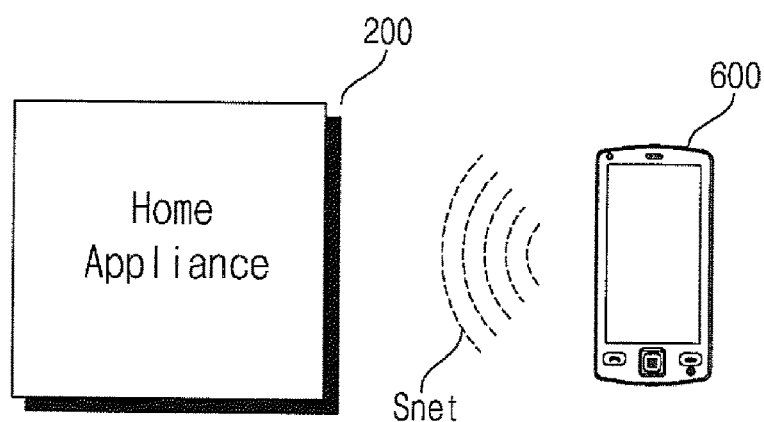

[Fig. 27d]
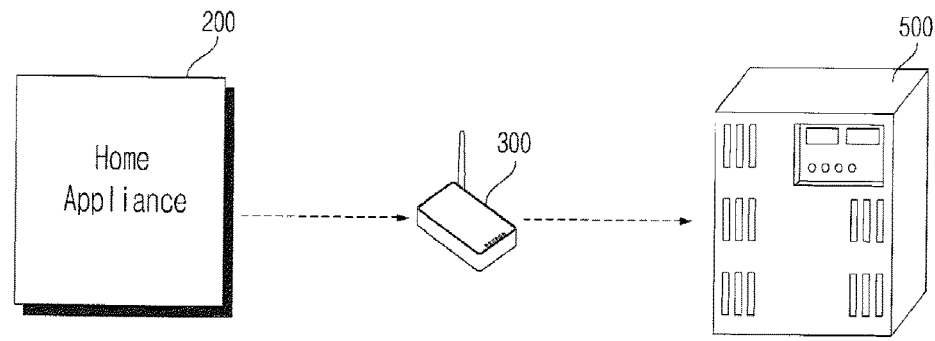
[Fig. 28]
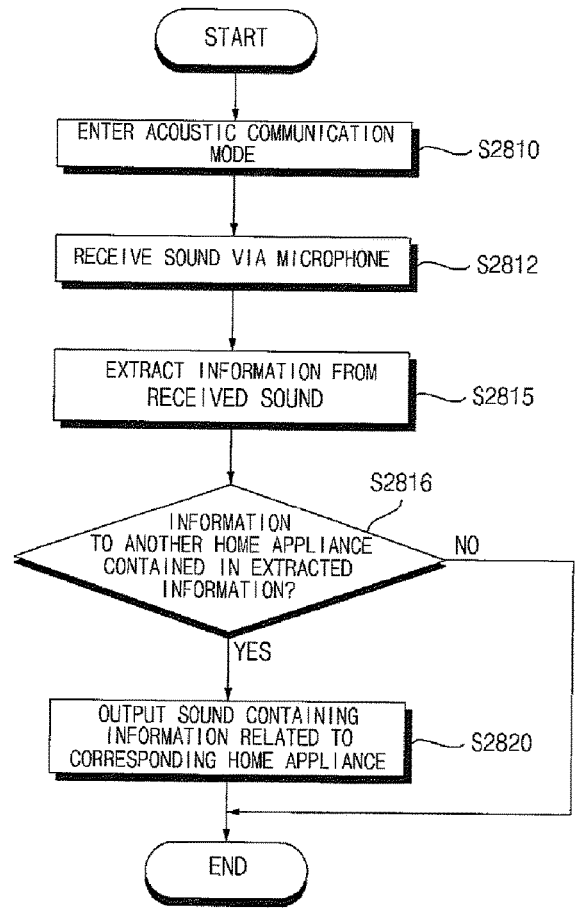

[Fig. 29]
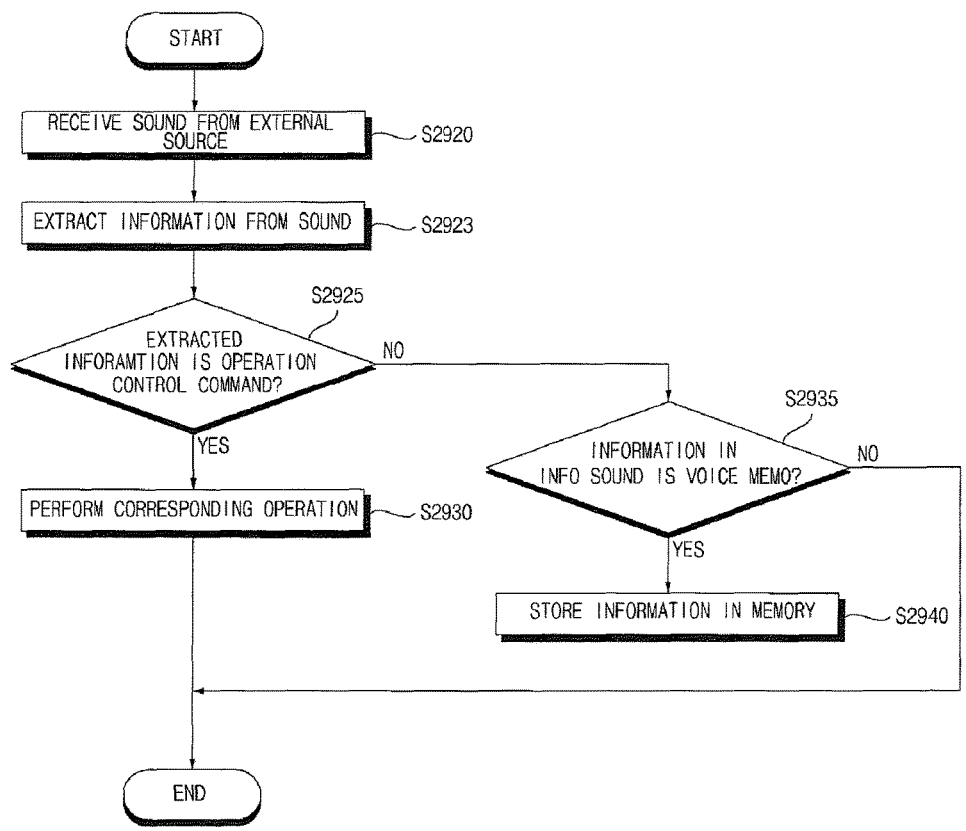

[Fig. 30]
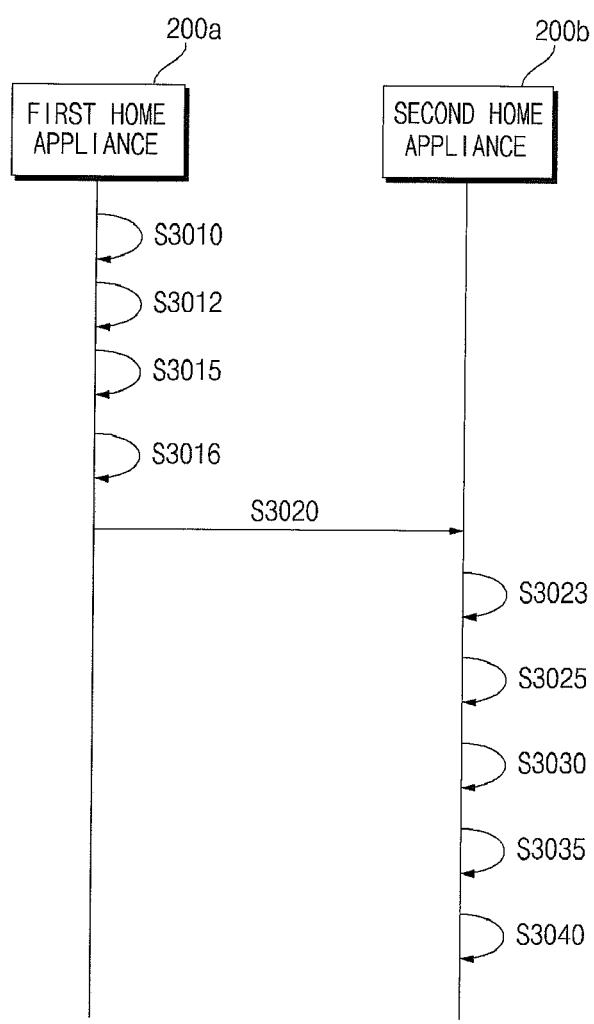

[Fig. 31a]
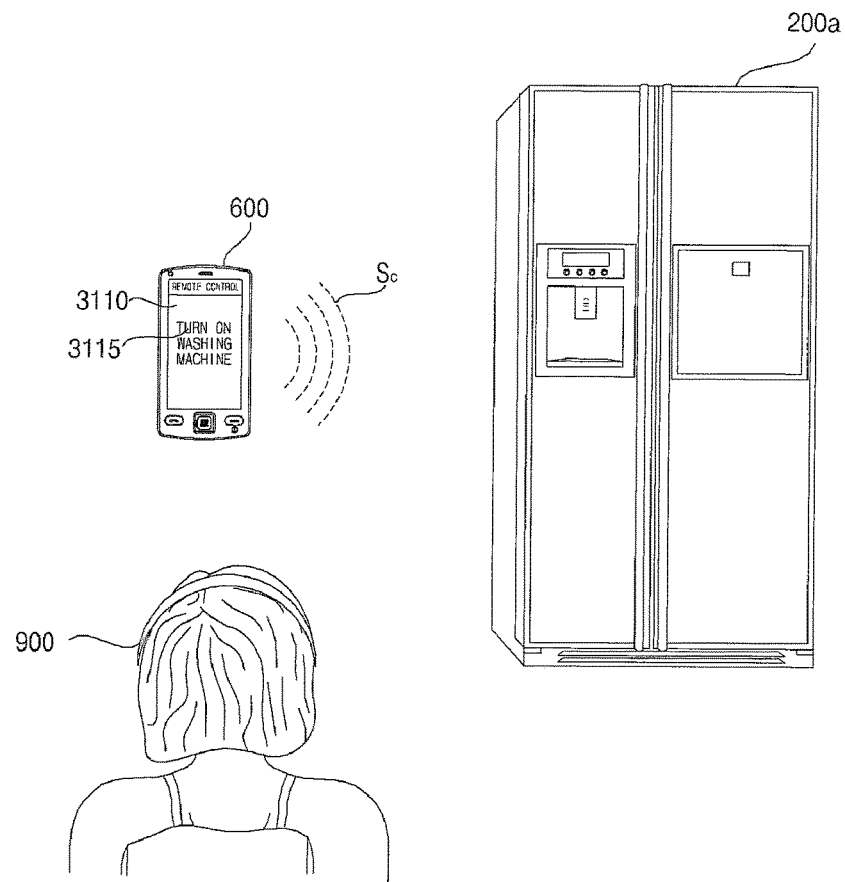
[Fig. 31b]
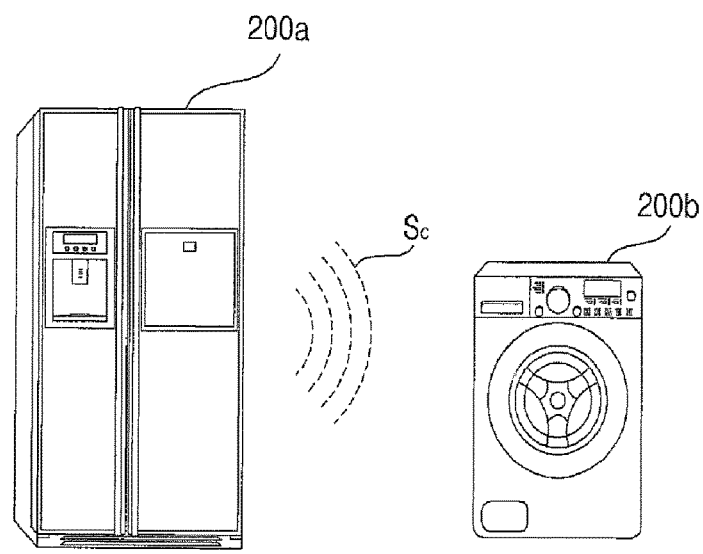

[Fig. 31c]
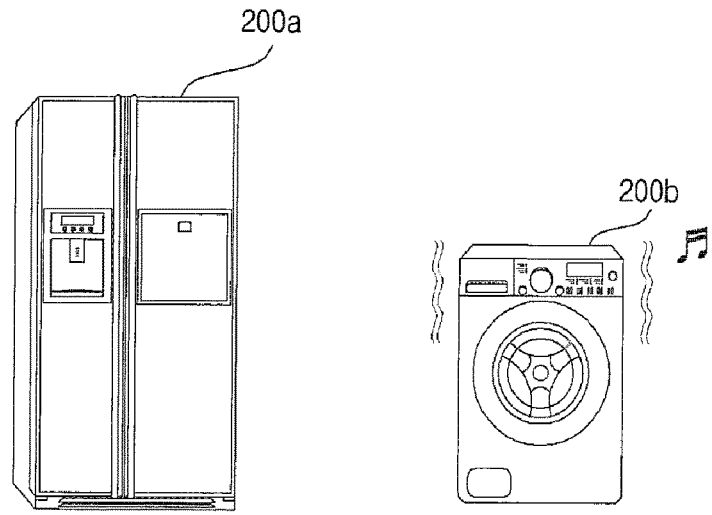
[Fig. 32a]
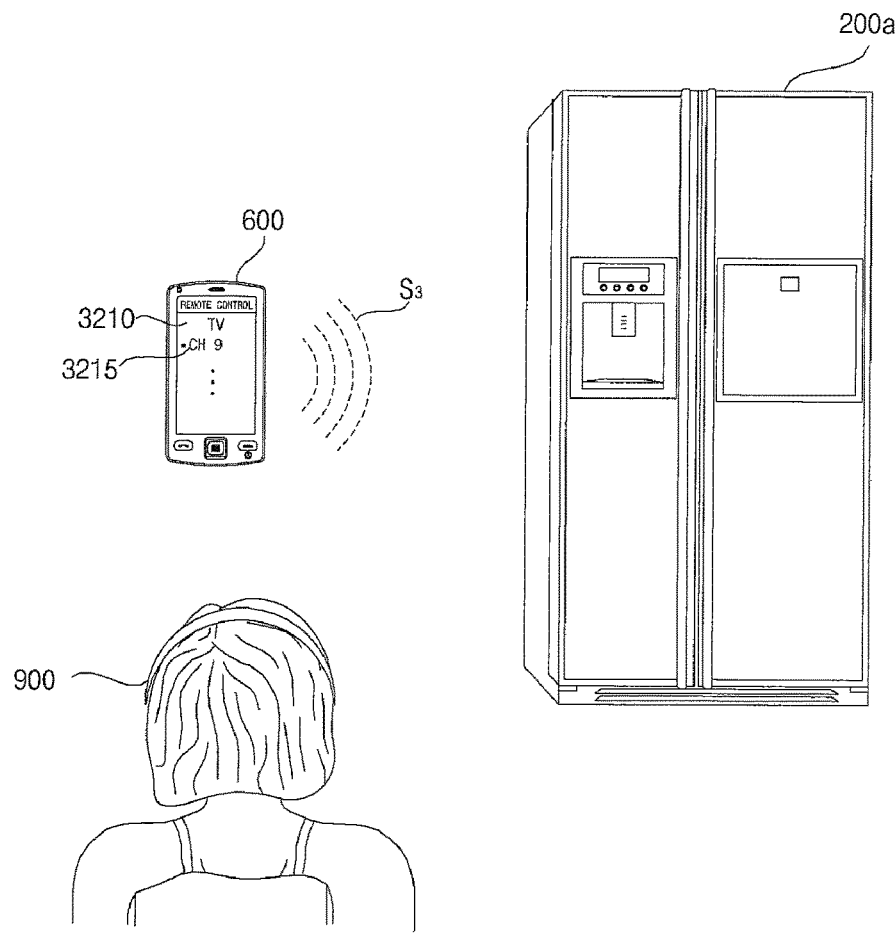

[Fig. 32b]
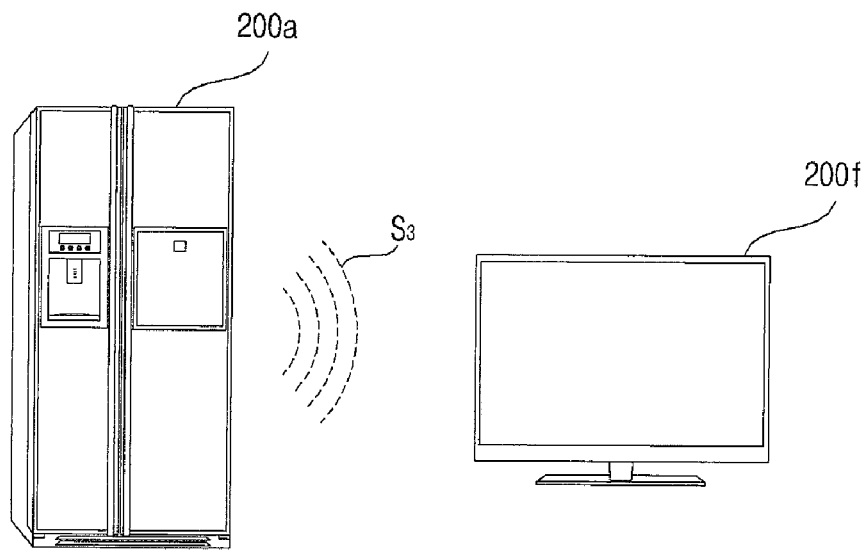
[Fig. 32c]
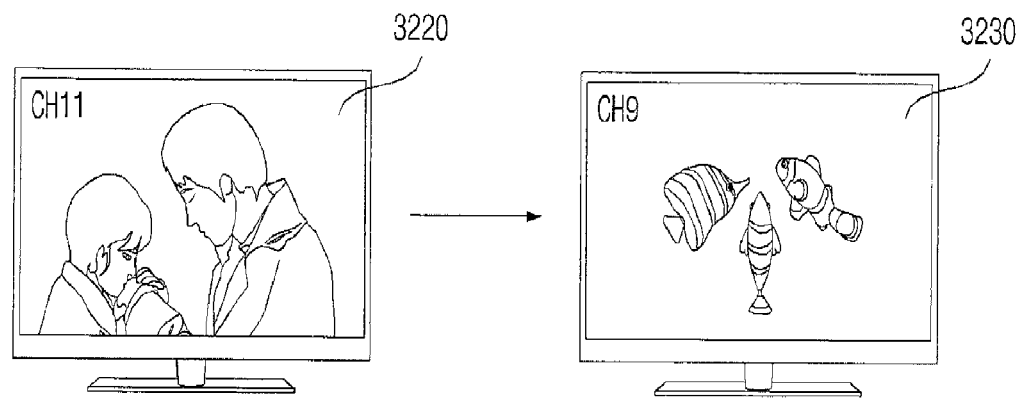

[Fig. 33a]
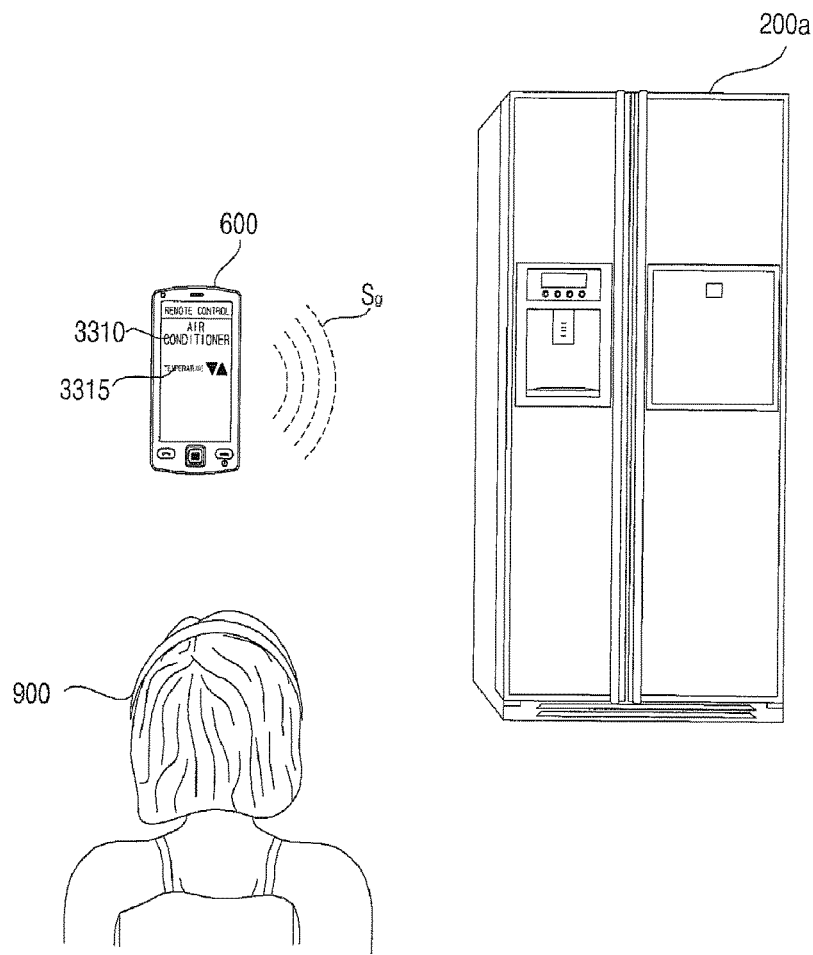
[Fig. 33b]
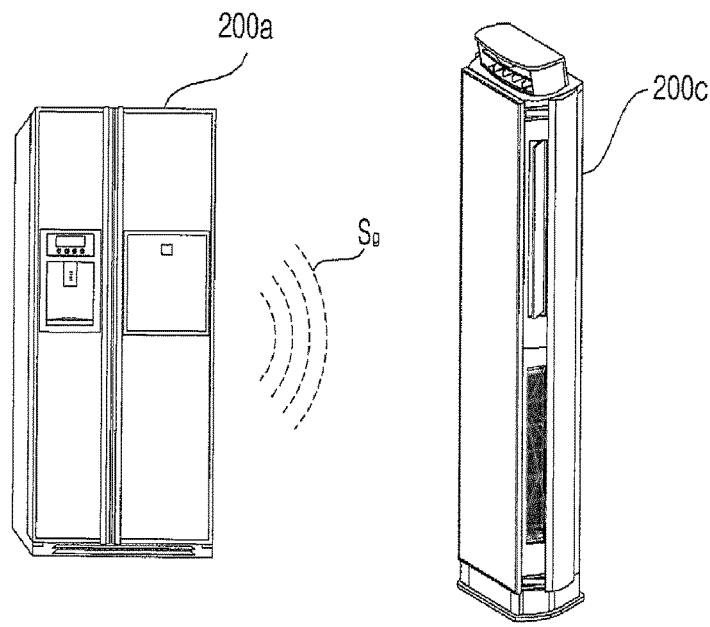

[Fig. 33c]
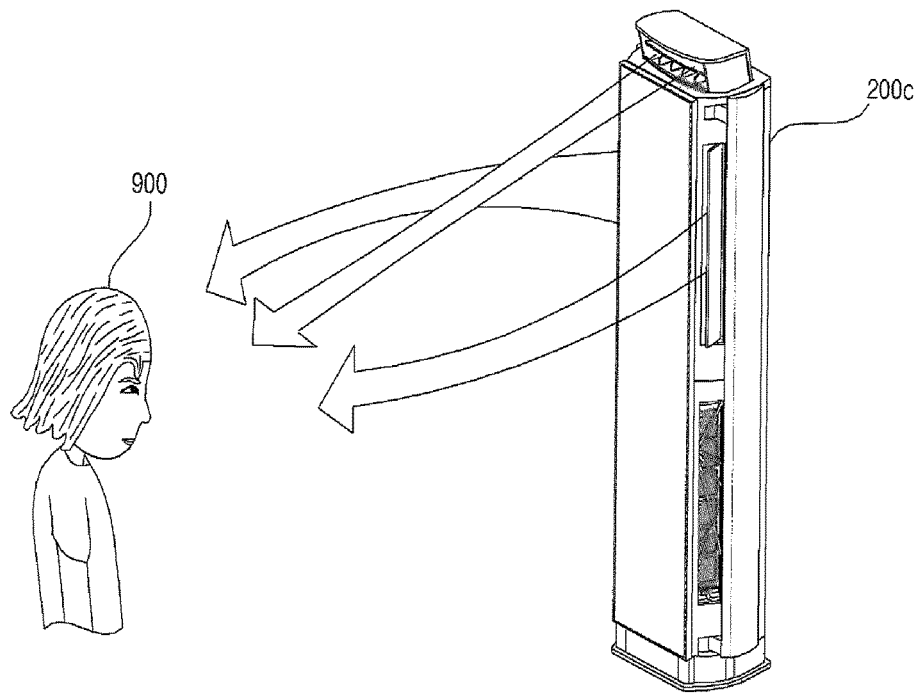
[Fig. 34a]
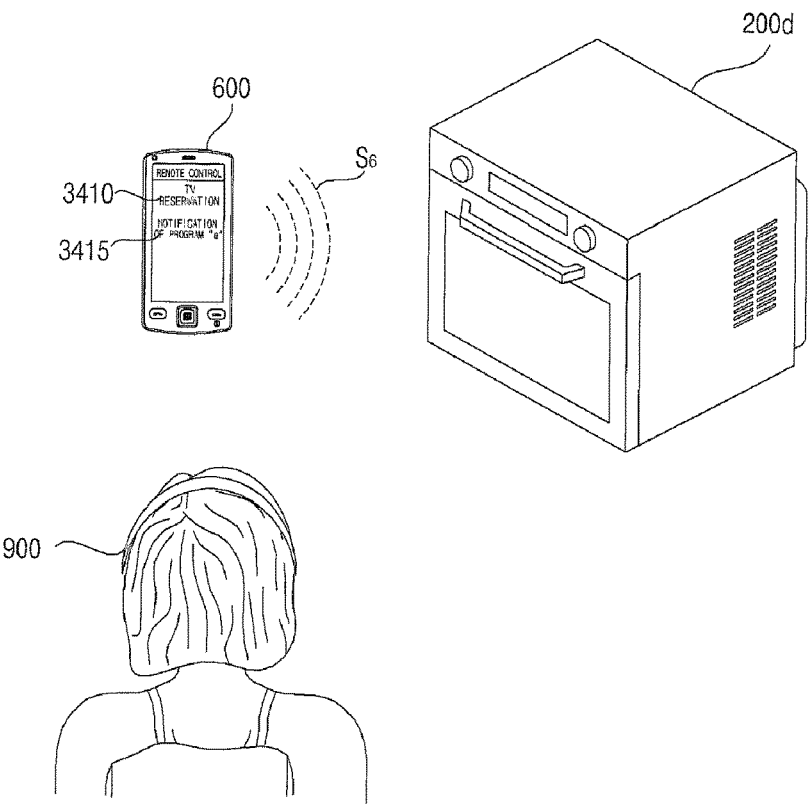

[Fig. 34b]
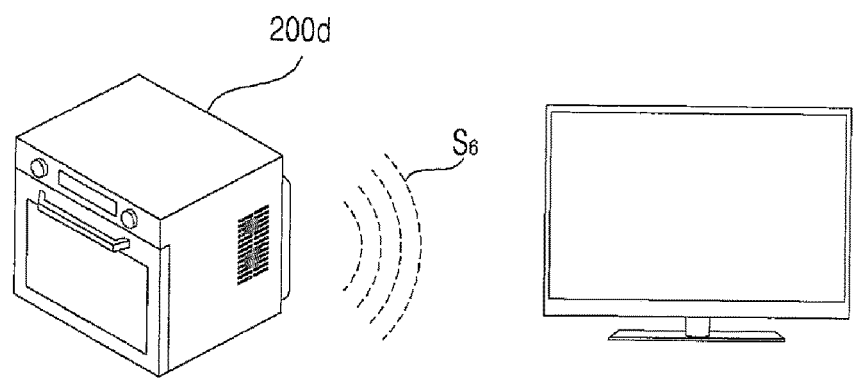
[Fig. 34c]
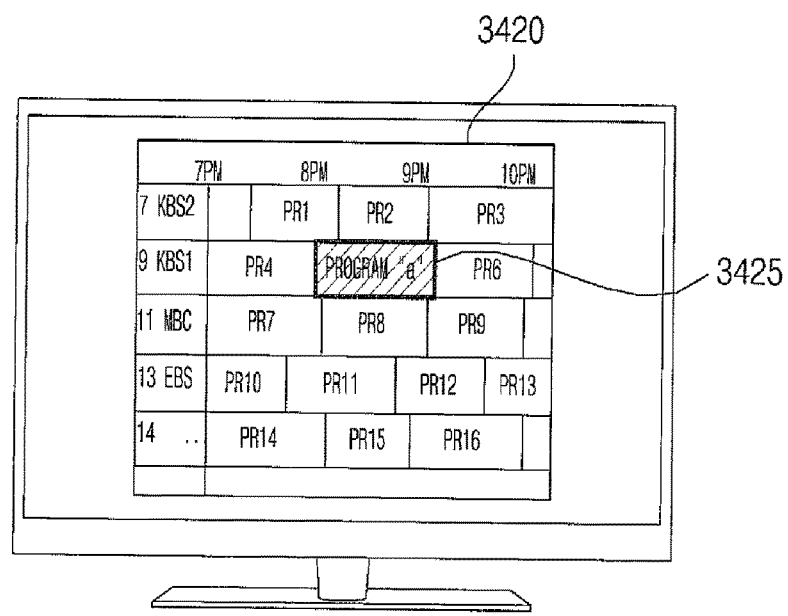

[Fig. 34d]
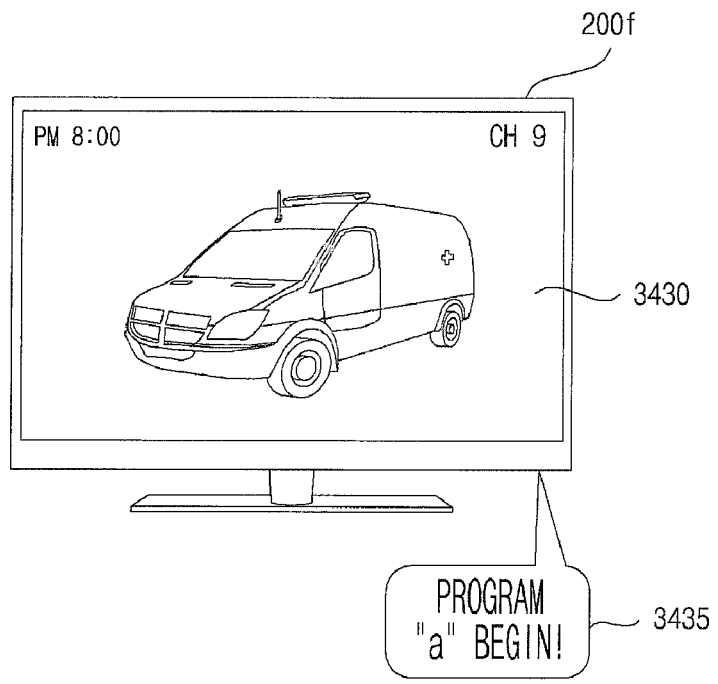
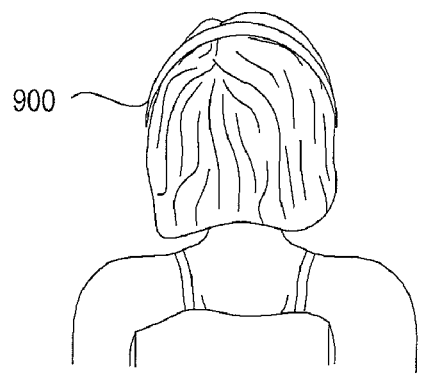

[Fig. 35a]
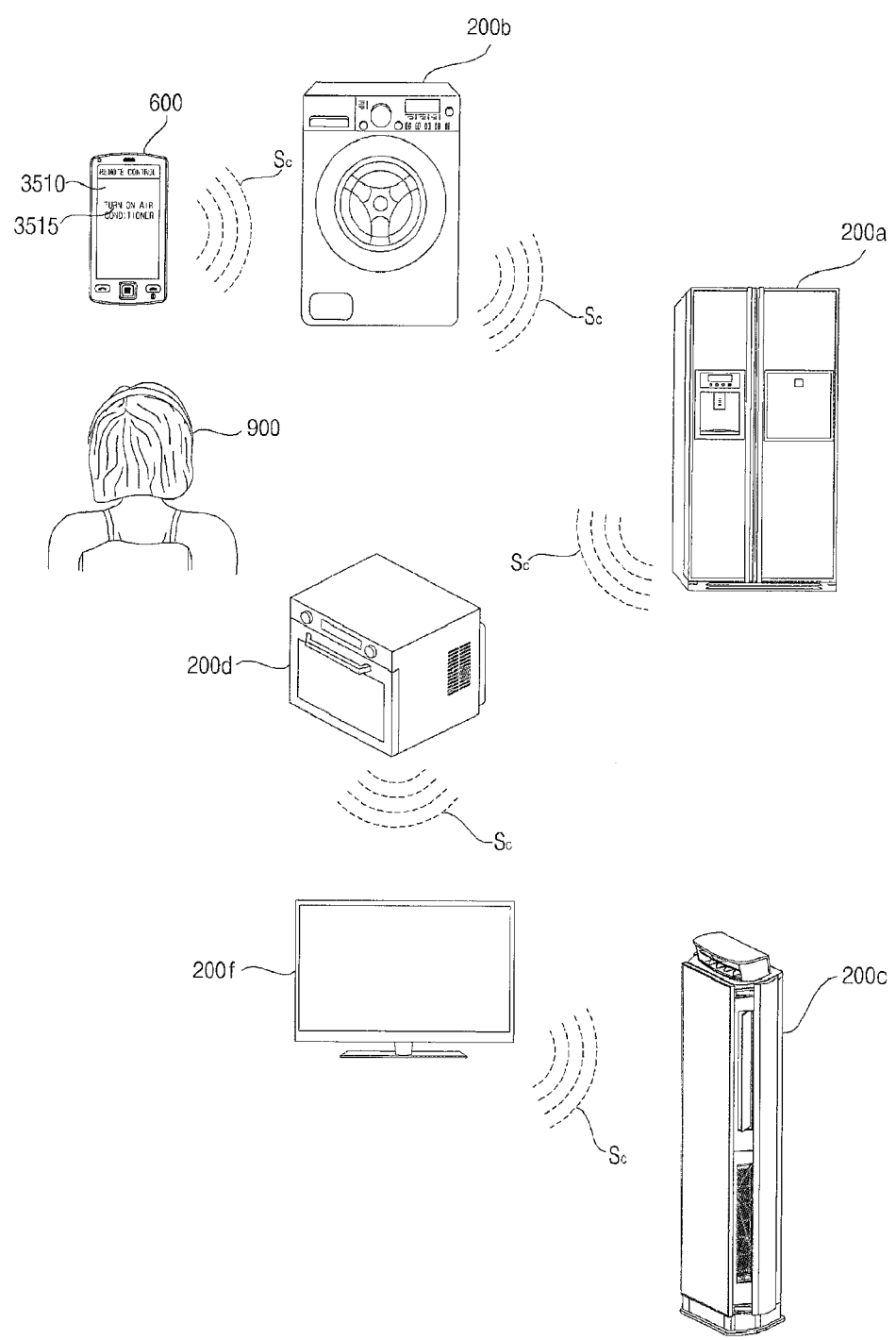

[Fig. 35b]
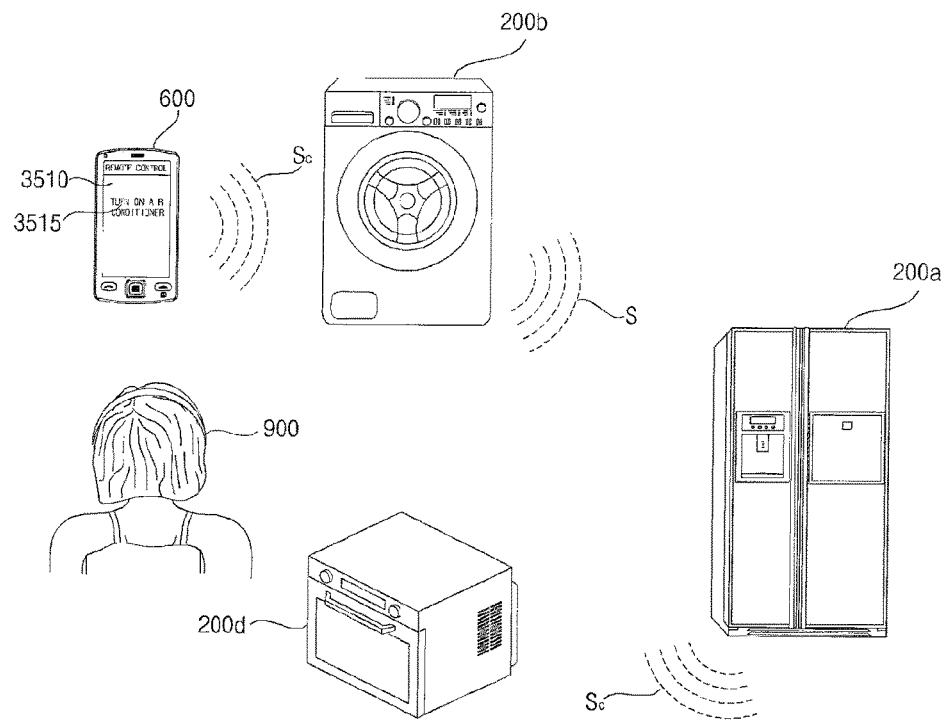
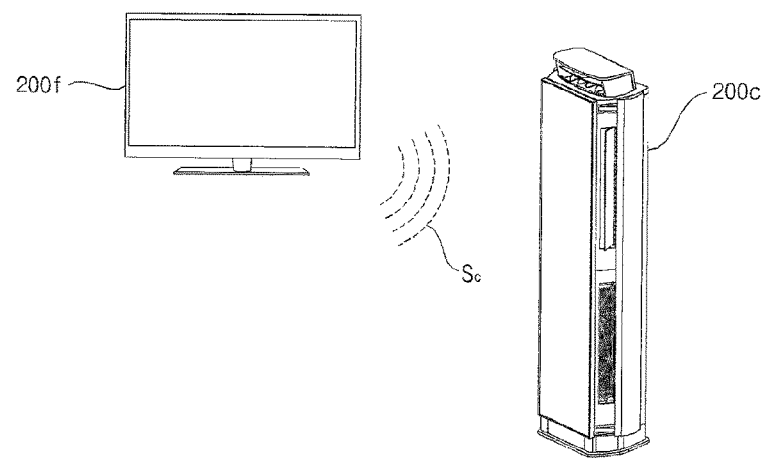

HOME APPLIANCE AND MOBILE TERMINAL

CROSS-REFERENCE TO RELATED PATENT APPLICATIONS

This application is a U.S. National Stage Application under 35 U.S.C. § 371 of PCT Application No. PCT/KR2014/008592, filed Sep. 16, 2014, which claims priority to Korean Patent Application Nos. 10-2013-0111222, filed Sep. 16, 2013; 10-2013-0111223, filed Sep. 16, 2013; and 10-2014-0060574, filed May 20, 2014, whose entire disclosures are hereby incorporated by reference.

TECHNICAL FIELD

The present invention relates to a home appliance and a mobile terminal and, more particularly, to a home appliance and a mobile terminal which enable transmission of information between the home appliance and the mobile terminal.

BACKGROUND ART

Among home appliances placed in buildings, for user convenience, refrigerators perform a food storage function, laundry treatment apparatuses perform a laundry treatment function, air conditioners perform an indoor temperature control function, and cooking appliances perform a food cooking function.

Meanwhile, with development of various communication technologies, various measures to increase user convenience via communication with home appliances have been studied.

DISCLOSURE OF INVENTION

Technical Problem

It is an object of the present invention to provide a home appliance and a mobile terminal which enable transmission of information between the home appliance and the mobile terminal via acoustic communication.

Solution to Problem

In accordance with one embodiment of the present invention, the above and other objects can be accomplished by the provision of a home appliance including a drive unit, an acoustic output module configured to output sound, a microphone configured to receive sound from an external source, a memory configured to store information related to the home appliance when the home appliance is being operated, an acoustic communication unit configured to output sound containing the information related to the home appliance to the acoustic output module or to extract prescribed information from the sound received via the microphone based on an acoustic communication mode and a controller configured to control the drive unit according to the information extracted by the acoustic communication unit.

In accordance with another embodiment of the present invention, there is provided a mobile terminal including a display configured to display a prescribed screen, an acoustic output module configured to output sound, a microphone configured to receive sound from an external source, an acoustic communication unit configured to output sound containing information related to the screen to the acoustic output module or to extract prescribed information from the sound received from the microphone based on an acoustic communication mode and a controller configured to control display of the information extracted by the acoustic communication unit on the display.

Advantageous Effects of Invention

As is apparent from the above description, according to an embodiment of the present invention, a home appliance may receive sound containing information related to a screen displayed on a mobile terminal via acoustic communication and perform operation corresponding to the received information. Thereby, the home appliance may be simply operated in a user-desired manner.

According to an alternative embodiment of the present invention, when the home appliance is being operated, a home appliance may store home appliance related information and output sound containing the stored information via acoustic communication. Thereby, the home appliance may simply transmit user-desired information.

According to an embodiment of the present invention, a mobile terminal may output sound containing information related to a screen displayed thereon via acoustic communication. Then, a home appliance may receive the sound and extract the information from the received sound. Thereby, the mobile terminal appliance may simply transmit user-desired information to the home appliance, which may increase user convenience.

According to an alternative embodiment of the present invention, a mobile terminal may receive sound containing information related to a screen displayed thereon from a home appliance via acoustic communication. Thereby, the mobile terminal may simply receive user-desired information from the home appliance, which may increase user convenience.

According to another embodiment of the present invention, a mobile terminal may receive sound containing a service set identifier from a home appliance and output network information of a prescribed access point device to the home appliance based on the service set identifier when the intensity of the received sound is a prescribed value or more or when a bit error rate of the extracted service set identifier is a prescribed value or less. Thereby, the home appliance may simply perform network setting of the home appliance based on the received network information. In addition, security upon information transmission may be enhanced.

In addition, the mobile terminal may output sound containing the network information, and the home appliance may simply perform network setting of the home appliance based on the network information when the intensity of the received sound is a prescribed value or more or when a bit error rate of the extracted service set identifier is a prescribed value or less.

In addition, the mobile terminal may store product information of the home appliance received from the home appliance. Thereafter, upon remote control, the mobile terminal may remotely access the home appliance based on the product information.

According to a further embodiment of the present invention, the home appliance may receive sound from an external source and extract information from the sound. When the extracted information includes information related to another home appliance, the home appliance may output sound containing the related information. As such, sharing of information contained in sound between home appliances is possible, which may increase user convenience.

More specifically, sound containing information may be output via at least one home appliance adjacent to a target home appliance and, finally, the target home appliance may receive the related information.

When information contained in sound received from another home appliance includes an operation control command, a target home appliance may perform corresponding operation. Moreover, when the information contained in the sound contains a voice memo, the home appliance may store the voice memo in a memory, thereby performing various operations. In this way, user convenience may be increased.

BRIEF DESCRIPTION OF DRAWINGS

The above and other objects, features and other advantages of the present invention will be more clearly understood from the following detailed description taken in conjunction with the accompanying drawings, in which:

FIG. 1 is a view showing one example of a configuration of a communication system according to one embodiment of the present invention;

FIGS. 2a to 2e are explanatory views of various examples of acoustic communication between a mobile terminal and a home appliance;

FIG. 3a is a brief block diagram showing one example of an inner configuration of a home appliance of FIG. 1;

FIG. 3b is a brief block diagram showing another example of an inner configuration of a home appliance of FIG. 1;

FIGS. 4a to 4d are reference views for explanation of acoustic communication of FIG. 1;

FIG. 5 is a block diagram showing an inner configuration of a server of FIG. 1;

FIG. 6 is a block diagram showing an inner configuration of a mobile terminal of FIG. 1;

FIG. 7 is a flowchart showing an operating method of a mobile terminal according to one embodiment of the present invention;

FIG. 8 is a flowchart showing an operating method of a home appliance according to one embodiment of the present invention;

FIGS. 9 to 13d are reference views for explanation of the operating method of FIG. 7 or FIG. 8;

FIG. 14 is a flowchart showing an operating method of a mobile terminal according to another embodiment of the present invention;

FIG. 15 is a flowchart showing an operating method of a home appliance according to another embodiment of the present invention;

FIGS. 16a to 22c are reference views for explanation of the operating method of FIG. 14 or FIG. 15;

FIG. 23 is a flowchart showing an operating method of a mobile terminal according to another embodiment of the present invention;

FIGS. 24a to 27d are reference views for explanation of the operating method of FIG. 23;

FIG. 28 is a flowchart showing an operating method of a home appliance according to a further embodiment of the present invention;

FIG. 29 is a flowchart showing an operating method of a home appliance according to a further embodiment of the present invention; and FIGS. 30 to 35b are reference views for explanation of the operating method of FIG. 28 or FIG. 29.

BEST MODE FOR CARRYING OUT THE INVENTION

Hereinafter, the present invention will be described in detail with reference to the accompanying drawings.

With respect to constituent elements used in the following description, suffixes "module" and "unit" are given or mingled with each other only in consideration of ease in the preparation of the specification, and do not have or serve as different meanings. Accordingly, the suffixes "module" and "unit" may be mingled with each other.

FIG. 1 is a view showing one example of a configuration of a communication system according to one embodiment of the present invention.

Referring to the drawing, the communication system according to one embodiment of the present invention, designated by reference numeral 10, may include a home appliance 200, a mobile terminal 600 and a server 500.

In particular, with regard to some embodiments of the present invention, the home appliance 200 and the mobile terminal 600 may perform acoustic communication (or sound communication).

In some embodiments of the present invention, acoustic communication means that sound of an audible frequency band is output and prescribed information data is added to the sound. Such addition of information data requires signal modulation. In some embodiments of the present invention, it is assumed that signal modulation is performed based on modulated complex lapped transform (MCLT).

More specifically, the mobile terminal 600 may output sound containing information related to a screen displayed on the mobile terminal 600 using a sound output module 653 via acoustic communication. Then, the home appliance 200 may receive the output sound using a microphone 223 and then extract the information contained in the sound to receive the corresponding information. As such, the mobile terminal 600 may simply transmit the related information to the home appliance 200, which may increase user convenience.

In one example, in the case in which a screen displayed on the mobile terminal 600 shows power information related to a home appliance, the mobile terminal 600 may output sound containing the power information related to the home appliance.

In another example, in the case in which a screen displayed on the mobile terminal 600 shows recipes related to a home appliance, the mobile terminal 600 may output sound containing recipe information.

In another example, in the case in which a screen displayed on the mobile terminal 600 shows driving courses or a driving course list related to a home appliance, the mobile terminal 600 may output sound containing driving course information related to the home appliance.

In another example, in the case in which a screen displayed on the mobile terminal 600 shows firmware related to a home appliance, the mobile terminal 600 may output sound containing firmware information related to the home appliance.

In a further example, in the case in which a screen displayed on the mobile terminal 600 shows an access point device list screen, the mobile terminal 600 may output sound containing network information related to access point devices.

Meanwhile, the mobile terminal 600 may receive sound containing information pre-stored in the home appliance 200 output from the microphone 223 via acoustic communication. Then, the mobile terminal 600 may extract the corresponding information from the received sound, thereby simply receiving the related information from the home appliance 200, which may increase user convenience.

To this end, the home appliance 200 may frequently store home appliance related information. For example, the home appliance 200 stores home appliance related information, such as operational state information, operation history information, product information, breakdown information, power consumption information, stored article information, recipe information or the like, in a memory 260.

Here, assuming that the home appliance is currently being operated, the operational state information may include an operation duration, an operation time up to now, a residual operation time, a current operation type and the like.

The operation history information may include an operation history of the home appliance for a specific duration.

For example, the operation history information may include a door opening/closing history of a refrigerator 200a, frequently used operation courses of a washing machine 200b, water usage during operation of the washing machine 200b, the number of times that an air conditioner 200c performs cooling operation, cooling temperature setting, the number of times that the interior of the air conditioner 200c is cleaned, frequently used courses and frequently selected cooling time of a cooking appliance 200d, the number of times that a cleaner 200e performs cleaning operation, cleaning time zone and cleaning courses of the cleaner 200e.

The product information may include the kind of a home appliance product (refrigerator, washing machine or the like), a product manufacture date, a product serial number, the kind/version of firmware installed in a product and the like.

When the home appliance breaks down, the breakdown information may include information regarding malfunctioning parts of the home appliance, a breakdown occurrence time, and information regarding operation that was being performed upon occurrence of breakdown.

The power consumption information may include the amount of power consumed, cost depending on the amount of power consumed and the like.

The stored article information may include, in the case of the refrigerator 200a, the kind of food stored in the refrigerator 200a, a position of stored food, the amount of food, an expiration date of food, a warehousing date of food and the like. The recipe information may include, in the case of the refrigerator 200a, possible cooking recipes corresponding to kinds of food stored in the refrigerator 200a. Alternatively, the recipe information may include recipes that can be cooked by the cooking appliance 200d.

Meanwhile, the mobile terminal 600 may display information received from the home appliance 200 on the mobile terminal 600. As such, a user can easily check the received information.

In addition, the mobile terminal 600 may transmit the information received from the home appliance 200 to the server 500 and receive transmission results. As such, the user may simply manage the home appliance 200 using the mobile terminal 600.

In one example, in the case in which the mobile terminal 600 receives breakdown information from the home appliance 200, the mobile terminal 600 may transmit the breakdown information to the server 500 and receive breakdown result information from the server 500.

In another example, in the case in which the mobile terminal 600 receives product information from the home appliance 200, the mobile terminal 600 may transmit the product information to the server 500 and receive product result information from the server 500.

In a further example, in the case in which the mobile terminal 600 receives power consumption information from the home appliance 200, the mobile terminal 600 may transmit the power consumption information to the server 500 and receive power saving operation information or power information from the server 500. Here, the power information may be information regarding power price, on-peak-time power, off-peak-time power and real-time power.

Through acoustic communication as described above, the mobile terminal 600 and the home appliance 200 may simply transmit and receive information using only an acoustic output module and a microphone respectively. In particular, the home appliance 200 does not require a separate wireless communication module, such as, for example, a WiFi module and thus manufacturing cost of the home appliance 200 may be reduced.

The home appliance 200 is an electronic device for personal use and, for example, may be the refrigerator 200a, the washing machine 200b, the air conditioner 200c, the cooking appliance 200d, or the cleaner 200e. In addition, the home appliance 200 may include a TV or the like.

The mobile terminal 600 may be a cellular phone, a smart-phone, a laptop computer, a tablet PC or the like.

FIGS. 2a to 2e are explanatory views of various examples of acoustic communication between the mobile terminal and the home appliance.

FIG. 2A exemplifies implementation of acoustic communication between the mobile terminal 600 and the refrigerator 200a, FIG. 2B exemplifies implementation of acoustic communication between the mobile terminal 600 and the washing machine 200b, FIG. 2C exemplifies implementation of acoustic communication between the mobile terminal 600 and the air conditioner 200c, FIG. 2D exemplifies implementation of acoustic communication between the mobile terminal 600 and the cooking appliance 200d, and FIG. 2E exemplifies implementation of acoustic communication between the mobile terminal 600 and the cleaner 200e.

As exemplarily shown in FIGS. 2a to 2e, acoustic communication by sound output from the mobile terminal, acoustic communication by sound output from the home appliance and combination thereof are possible.

FIG. 3a is a brief block diagram showing one example of an inner configuration of the home appliance of FIG. 1.

Referring to the drawing, the home appliance 200 may include an input unit 220 for user input, a display unit 230 to display, for example, an operational state of the home appliance 200, a communication unit 222 for communication with another external device, a drive unit 245 to drive the home appliance 200, a remote control signal receiver 257 for reception of a remote control signal, a memory 260, and a controller 270 for internal control.

The input unit 220 may include a variety of buttons to operate the home appliance 200. For example, the input unit 220 may include a power on/off button, a start/stop button and the like. A button operating signal from the input unit 220 may be transmitted to the controller 270.

In one example, in the case of the refrigerator 200a, the drive unit 245 may include a refrigerating compartment drive unit and a freezing compartment drive unit.

In another example, in the case of the washing machine 200b, the drive unit 245 may include a drive unit to drive a tub or a drum.

In another example, in the case of the air conditioner 200c, the drive unit 245 may include an outdoor unit compressor drive unit, an outdoor unit fan drive unit, and an indoor unit fan drive unit.

In another example, in the case of the cooking appliance 200*d*, the drive unit 245 may include a microwave drive unit to output microwaves into a cavity.

In a further example, in the case of the cleaner 200*e*, the drive unit 245 may include a fan motor drive unit.

The communication unit 222 may include an acoustic communication unit 217 to enable acoustic communication and a wireless communication unit 218. The acoustic communication unit 217 will be described below with reference to FIGS. 4*a* to 4*d*.

The wireless communication unit 218 enables wireless communication, such as ZigBee, WiFi or the like. In particular, the wireless communication unit 218 may be connected to an access point device via wireless communication, such as WiFi or the like, and may exchange data with the access point device.

The display unit 230 may display, for example, an operational state of the home appliance 200 under control of the controller 270. To this end, the display unit 230 may include a Light Emitting Diode (LED) display unit. Alternatively, the display unit 230 may include a Liquid Crystal Display (LCD) unit, for example, to display information.

The memory 260 may store data for general operations of the home appliance 200. Meanwhile, the memory 260 may include a voice recognition algorithm.

The microphone 223 may receive user voice and convert the user voice into electric signals to transmit the same to the controller 270.

The acoustic output module 253 converts the electric signals from the controller 270 into audio signals to output the same. To this end, the acoustic output module 253 may include a speaker, for example.

The remote control signal receiver 257 may receive remote control signals required to operate the home appliance 200. The remote control signals may be infrared (IR) signals from a remote control device or a mobile terminal. Alternatively, the remote control signals may be radio frequency (RF) signals.

The remote control signal receiver 257 may process the received remote control signals to transmit the same to the controller 270. For example, a power on/off signal, an operation start/stop signal or the like may be transmitted to the controller 270.

The controller 270 may control general operations of the home appliance 200. The controller 270 may control operations of the input unit 220, the display unit 230, the communication unit 222, the drive unit 245, the remote control signal receiver 257, the memory 260 and the like.

FIG. 3*b* is a brief block diagram showing another example of an inner configuration of the home appliance of FIG. 1.

Referring to the drawing, although the block diagram of FIG. 3B showing the inner configuration of the home appliance is similar to the block diagram of FIG. 3A showing the inner configuration of the home appliance, a difference therebetween is that a microcomputer 221 is additionally provided.

In the case in which the home appliance includes the display unit 230, the display microcomputer 221 may be included to control the display unit 230. In this case, the controller 270 serves as a main microcomputer and is mounted on a different circuit board from the display microcomputer 221.

In the case in which the home appliance includes the acoustic communication unit 217 to enable acoustic communication as in the present embodiment, the communication unit 222, more particularly, the acoustic communication unit 217 may be mounted on the same circuit board as the display microcomputer 221. As such, as exemplarily shown in FIG. 3*b*, the acoustic communication unit 217 is primarily controlled by the display microcomputer 221 and secondarily controlled by the controller 270, i.e. the main microcomputer 270.

FIGS. 4*a* to 4*d* are reference views for explanation of acoustic communication of FIG. 1.

First, FIG. 4*a* illustrates that the mobile terminal 600 outputs sound and the home appliance 200 receives the output sound via acoustic communication.

To this end, the mobile terminal 600 may include an acoustic communication unit 617 and an acoustic output module 653, and the home appliance 200 may include the microphone 223 and the acoustic communication unit 217.

The acoustic communication unit 617 of the mobile terminal 600 receives digital sound from a controller 680 and adds prescribed data to the digital sound to output modulated sound. Then, the acoustic output module 653 outputs the modulated sound via an acoustic channel of an audible frequency band.

The microphone 223 of the home appliance 200 receives the sound output from the mobile terminal 600. Then, the microphone 223 transmits the received sound to the acoustic communication unit 217. The acoustic communication unit 217 extracts the data from the sound.

As such, simplified information data exchange between the mobile terminal 600 and the home appliance 200 is possible.

Meanwhile, in the reverse order of FIG. 4*a*, the home appliance 200 may output sound and the mobile terminal 600 may receive the output sound via acoustic communication, and the home appliance 200 and the mobile terminal 600 may perform two-way acoustic communication.

*In this way, the mobile terminal 600 may include a microphone 623 in addition to the acoustic communication unit 617 and the acoustic output module 653, and the home appliance 200 may include the acoustic output module 253 in addition to the microphone 223 and the acoustic communication unit 217.

FIG. 4*b* is a block diagram showing inner configurations of the acoustic communication unit 617 of the mobile terminal 600 and the acoustic communication unit 217 of the home appliance 200.

To output sound, the acoustic communication unit 617 of the mobile terminal 600 may include a frequency converter 410, a data inserter 415, an inverse transformer 420 and a multiplexer 425.

The frequency converter 410 may receive time domain audio signals to be output and perform frequency conversion of the audio signals. Frequency conversion may be performed in frame units and, specifically, may be based on modulated complex lapped transform (MCLT).

MCLT may advantageously reduce blocking artifacts at a frame boundary according to overlapping per frame.

The data inserter 415 serves to add or insert prescribed data to the frequency-converted audio signals. That is, data is added to the audio signals via modulation. More specifically, data may be added by varying a phase coefficient among various coefficients (magnitude, phase and the like) on a per converted frequency basis. For example, the variable phase coefficient may have a value of 0 degrees or 180 degrees. As such, it is possible to differentiate data to be added.

The inverse transformer 420 performs inverse transform of the audio signals into which information data is inserted.

When the frequency converter 410 performs MCLT, the inverse transformer 420 performs inverse MCLT and outputs time domain sound signals.

The frequency converter 410, the data inserter 415, and the inverse transformer 420 may perform corresponding operations on a per frame basis.

The multiplexer 425 multiplexes and outputs the inverse-transformed audio signals. That is, the multiplexer 425 performs multiplexing of frames to successively output sound.

The acoustic output module 253 outputs the multiplexed sound. To this end, the acoustic output module 253 may include at least one speaker.

The home appliance 200 receives the sound via the microphone 223 and converts the sound into electric signals. Then, the acoustic communication unit 217 of the home appliance 200 may include a synchronizer 430, a frequency converter 435 and a data extractor 440.

The synchronizer 430 synchronizes the received audio signals. That is, the synchronizer 430 may synchronize the multiplexed audio signals and then separate the same in frame units.

The frequency converter 435 may receive the time domain audio signals to be output and perform frequency conversion of the audio signals. Frequency conversion may be performed in frame units and, specifically, may be based on modulated complex lapped transform (MCLT).

The data extractor 440 extracts the added data from the frequency-converted audio signals. As described above, the data extractor 440 may extract data from a phase coefficient because data is added by varying the phase coefficient among various coefficients on a per frequency basis. In particular, when the phase coefficient has a value of 0 degrees or 180 degree, data may be extracted based on the value of the phase coefficient.

The extracted data may be transmitted to the controller 270 of the home appliance 200.

MCLT based acoustic communication enables addition of data while maintaining sound similar to audio signals that are planned to be output originally. In addition, MCLT based acoustic communication may advantageously reduce blocking artifacts at a frame boundary according to overlapping per frame.

FIG. 4c is an explanatory view of operation of the acoustic communication unit 617 of FIG. 4b and audio waves.

Referring to the drawing showing audio signals 400 to be output, the audio signals 400 to be output may be sorted into a plurality of frames FR1 to FR4 based in the time domain. The drawing shows a first audio signal 400a in the first frame FR1, a second audio signal 400b in the second frame FR2, a third audio signal 400c in the third frame FR3 and a fourth audio signal 400d in the fourth frame FR4.

The frequency converter 410 performs frequency conversion of audio data on a per frame basis. Specifically, the frequency converter 410 performs MCLT based frequency conversion.

Then, the data inserter 415 adds prescribed data to the frequency-converted audio signal on a per frame basis. Specifically, the data inserter 415 adds data by varying a phase coefficient among various coefficients (magnitude, phase and the like) on a per converted frequency basis.

The inverse transformer 420 performs inverse transform of the audio signals into which information data is inserted on a per frame basis. As such, the inverse transformer 420 outputs time domain sound signals.

The drawing shows first to fourth sound signals 401a to 401d, similar to the first to fourth audio signals 400a to 400d, on a per frame basis. As will be appreciated from the drawing, the first to fourth sound signals 401a to 401d are similar to audio signals that are planned to be output originally.

*The multiplexer 425 may multiplex the sound signals to which data is added on a per frame basis to output one sound signal.

Meanwhile, although FIGS. 4a to 4c illustrate that the mobile terminal 600 outputs sound containing prescribed information and the home appliance 200 receives the corresponding sound and extracts the prescribed information from the sound, the reverse case is possible.

That is, the home appliance 200 may output sound containing prescribed information and the mobile terminal 600 may receive the corresponding sound and extract the prescribed information from the sound.

In this case, the acoustic communication unit 217 of the home appliance 200 may include the frequency converter 410, the data inserter 415, the inverse transformer 420 and the multiplexer 425, and the acoustic communication unit 617 of the mobile terminal 600 may include the synchronizer 430, the frequency converter 435 and the data extractor 440.

FIG. 4d illustrates that the mobile terminal 600 includes an acoustic generation unit 618 and the home appliance 200 includes an acoustic detection unit 218.

The acoustic generation unit 618 in the mobile terminal 600 of FIG. 4d is similar to the acoustic communication unit 617 in the mobile terminal 600 of FIG. 4b, but has a difference in that it generates audio data and adds input data to the generated audio data to output the same. That is, the acoustic generation unit 618 may generate audio data, rather than receiving the audio data from the controller 680 or the like. To this end, in addition to the frequency converter 410, the data inserter 415, the inverse transformer 420 and the multiplexer 425 of the acoustic communication unit 617, the acoustic generation unit 618 may include a separate audio generator (not shown).

For example, the acoustic generation unit 618 may generate approximately 168,000 sounds by organizing four chords using 36 musical tones. Then, the acoustic generation unit 618 may add data to the sounds.

Next, the acoustic detection unit 218 in the home appliance 200 is identical to the acoustic communication unit 217 in the home appliance 200 of FIG. 4b. That is, to extract data from the received sounds, the acoustic detection unit 218 may include the synchronizer 430, the frequency converter 435 and the data extractor 440.

FIG. 5 is a block diagram showing an inner configuration of the server of FIG. 1.

Referring to the drawing, the server 500 may include a communication module 530, a storage unit 540 and a processor 520.

The communication module 530 may receive home appliance related information from the mobile terminal 600. Then, the communication module 530 may transmit result information corresponding to the received home appliance related information to the mobile terminal 600.

To this end, the communication module 530 may include an Internet module or a mobile communication module.

A storage unit 540 may store the received home appliance related information and include data for generation of the result information corresponding to the home appliance related information.

In one example, in the case in which the home appliance related information is breakdown information of the home appliance, the storage unit 540 may store data for breakdown diagnosis of the home appliance.

In another example, in the case in which the home appliance related information is product information of the home appliance, the storage unit 540 may store received product information for product registration of the home appliance.

In a further example, in the case in which the home appliance related information is power consumption information of the home appliance, the storage unit 540 may store power price information, on-peak-time power information, off-peak-time power information, real-time power information and the like.

The processor 520 may control general operations of the server 500.

Specifically, the processor 520 may control generation of result information corresponding to home appliance related information upon reception of the home appliance related information from the mobile terminal 600. Then, the processor 520 may control transmission of the generated result information to the mobile terminal 600.

In one example, in the case in which the home appliance related information is breakdown information of the home appliance, the processor 520 may generate breakdown diagnosis result information of the home appliance using the breakdown diagnosis data stored in the storage unit 540.

In another example, in the case in which the home appliance related information is product information of the home appliance, the processor 520 may generate product registration result information of the home appliance.

In a further example, in the case in which the home appliance related information is power consumption information of the home appliance, the processor 520 may control transmission of the power price information, on-peak-time power information, off-peak-time power information, real-time power information and the like stored in the storage unit 540 to the mobile terminal 600.

Meanwhile, the server 500 may be a server managed by a manufacturer of the home appliance 200 or a server managed by a manager of a store that sells applications related to the home appliance 200.

FIG. 6 is a block diagram showing an inner configuration of the mobile terminal of FIG. 1.

Referring to FIG. 6, the mobile terminal 600 may include a wireless communication unit 610, an audio/video (A/V) input unit 620, a user input unit 630, a sensing unit 640, an output unit 650, a memory 660, an interface unit 670, a controller 680 and a power supply unit 690.

The wireless communication unit 610 may include a broadcast receiving module 611, a mobile communication module 613, a wireless Internet module 615, an acoustic communication unit 617 and a global positioning system (GPS) module 619, for example.

The broadcast receiving module 611 may receive at least one of broadcast signals and broadcast related information from an external broadcast management server through broadcast channels. In this case, the broadcast channels may include satellite channels, terrestrial channels and the like.

The broadcast signals and/or broadcast related information received via the broadcast receiving module 611 may be stored in the memory 660.

The mobile communication module 613 performs transmission and reception of radio signals with at least one of a base station, an external terminal and a server on a mobile communication network. Here, the radio signals may include voice call signals, image call signals, or various types of data based on text/multimedia message transmission and reception.

The wireless Internet module 615 is a module for wireless Internet connection. The wireless Internet module 615 may be internally or externally coupled to the mobile terminal 600. For example, the wireless Internet module 615 may perform WiFi based wireless communication or WiFi direct based wireless communication.

The acoustic communication unit 617 may perform acoustic communication. The acoustic communication unit 617 may add prescribed information data to audio data to be output in an acoustic communication mode to thereby output sound. In addition, the acoustic communication unit 617 may extract the prescribed information data from sound received from an external source in the acoustic communication mode. A detailed description thereof will be described below with reference to FIGS. 4*a* to 4*d*.

Examples of short range communication technologies may include Bluetooth, Radio Frequency IDentification (RFID), Infrared Data Association (IrDA), Ultra WideBand (UWB), ZigBee and the like.

The GPS module 619 may receive position information from a plurality of GPS satellites.

The A/V input unit 620 serves to input audio signals or video signals and may include a camera 621 and a microphone 623, for example.

The user input unit 630 serves to generate key input data that is input by the user to control operation of the terminal. To this end, the user input unit 630 may include a key pad, a dome switch, a touch pad (static pressure/electrostatic) or the like. In particular, in the case in which the touch pad is layered onto a display 651, this may be referred to as a touchscreen.

The sensing unit 640 may sense a current state of the mobile terminal 600, such as an opening/closing state of the mobile terminal 600, a position of the mobile terminal 600, the presence of user touch and the like, and generate sensing signals to control operation of the mobile terminal 600.

The sensing unit 640 may include a proximity sensor 641, a pressure sensor 643 and a motion sensor 645, for example. The motion sensor 645 may sense, for example, motion or position of the mobile terminal 600 using an accelerometer, a gyro sensor, a gravity sensor or the like. In particular, the gyro sensor serves to measure an angular velocity and may sense an orientation (angle) deviated from a reference direction.

The output unit 650 may include the display 651, an acoustic output module 653, an alarm 655 and a haptic module 657, for example.

The display 651 displays and outputs information processed in the mobile terminal 600.

As described above, in the case in which the display 651 and the touch pad are layered one above another to construct a touchscreen, the display 651 may be used not only an output device, but also as an input device to enable input of information via user touch.

The acoustic output module 653 outputs audio data stored in the memory 660 or received from the wireless communication unit 610. The acoustic output module 653 may include a speaker, a buzzer or the like.

The alarm 655 serves to output a signal to notify occurrence of an event of the mobile terminal 600. For example, the alarm 655 may output a vibration signal.

The haptic module 657 generates various tactile effects that the user can perceive. A representative example of tactile effects generated by the haptic module 657 is vibration.

The memory 660 may store programs for processing and control of the controller 680, and may function to temporarily store input or output data (for example, a phonebook, messages, still images and moving images).

*The interface unit 670 serves as an interface with respect to all external appliances connected to the mobile terminal 600. The interface unit 670 may receive data from these external appliances or transmit received power to respective inner components of the mobile terminal 600. The interface unit 670 may also perform transmission of internal data of the mobile terminal 600 to external appliances.

The controller 680 typically controls operations of the aforementioned units to control general operations of the mobile terminal 600. For example, the controller 680 may perform control and processing of operations related to voice calls, data communication, image calls and the like. In addition, the controller 680 may include a multimedia reproduction module 681 for multimedia reproduction. The multimedia reproduction module 681 may be hardware in the controller 680, or may be software separate from the controller 680.

The power supply unit 690 supplies power required to operate the respective components upon receiving external power or internal power under control of the controller 680.

Meanwhile, the block diagram of the mobile terminal 600 as exemplarily shown in FIG. 6 is based on one embodiment of the present invention. The respective components of the block diagram may be integrated, added or omitted according to the specifications of the mobile terminal 600 which is actually implemented. For example, two or more components may be combined into a single component or a single component may be divided into two or more components as needed. In addition, functions of the components are set forth herein only to explain the embodiments of the present invention and the specific operations and configurations of the components should not be construed as limiting the scope of the present invention.

FIG. 7 is a flowchart showing an operating method of a mobile terminal according to one embodiment of the present invention, FIG. 8 is a flowchart showing an operating method of a home appliance according to one embodiment of the present invention, and FIGS. 9 to 13*d* are reference views for explanation of the operating method of FIG. 7 or FIG. 8.

First, referring to FIG. 7, the mobile terminal 600 displays a prescribed screen on the display thereof (S710). Note that Step S910 of FIG. 9 corresponds to Step S710 of FIG. 7.

In particular, the controller 680 of the mobile terminal 600 controls display of a corresponding screen in response to user input.

For example, in the case in which the user input is input to view power information, a power information screen may be displayed. The power information screen may be displayed after execution of an application related to a home appliance without being limited thereto. The power information screen may be displayed in the case in which the user directly accesses a server of a power provision company to view power information.

FIG. 10*a* illustrates that a power information screen 610 is displayed on the mobile terminal 600. The drawing illustrates that the power information screen 610 shows peak time information and price information at a corresponding peak time. In addition, the power information screen 610 may further show off-peak-time power information, real-time power information and the like.

Next, the mobile terminal 600 judges whether or not the mobile terminal 600 is in an acoustic communication mode (S720). Upon judgment of the acoustic communication mode, the mobile terminal 600 outputs sound containing information related to the screen displayed thereon (S730). Note that Step S920 of FIG. 9 corresponds to Step S720 of FIG. 7 and Step S820 of FIG. 8 and Step S930 of FIG. 9 corresponds to Step S730 of FIG. 7 and Step S830 of FIG. 8.

FIG. 10*b* illustrates selection of a specific key 601 provided in the mobile terminal 600. This selection may allow the mobile terminal 600 to enter an acoustic communication mode. Alternatively, differently from the illustration, the mobile terminal 600 may enter an acoustic communication mode upon selection of an acoustic communication application in the mobile terminal 600.

Upon entry to the acoustic communication mode, the mobile terminal 600, as described above with reference to FIGS. 4*a* to 4*d*, may output sound that is acquired by adding information data to audio signals. In particular, the mobile terminal 600 may output sound to which information related to the screen displayed on the mobile terminal 600 is added.

FIG. 10*c* illustrates that the mobile terminal 600 transmits power information Spow related to the washing machine 200*b* to the washing machine 200*b*. As such, the washing machine 200*b* may simply acquire power information from the mobile terminal 600.

Next, the home appliance 200 extracts the information related to the screen displayed on the mobile terminal 600 from the received sound (S835). Then, the home appliance 200 executes corresponding operation based on the extracted information related to the screen displayed on the mobile terminal 600 (S840). Note that Step S935 and Step S940 of FIG. 9 respectively correspond to Step S835 and Step S840 of FIG. 8.

Upon entry to the acoustic communication mode, the home appliance 200, as described above with reference to FIGS. 4*a* to 4*d*, may extract the information related to the screen from the received sound. Then, the controller 270 of the home appliance 200 may control execution of corresponding operation based on the information related to the screen.

FIG. 10*d* illustrates implementation of power saving driving of the washing machine 200*b* based on the received power information Spow of FIG. 10*c*.

For example, the washing machine 200*b* may be driven at times except for a peak time from 13:00 to 15:00, or the washing machine 200*b* may be driven in such a way that, of the entire washing cycle, a less power consumptive washing or rinsing stroke partially overlaps the peak time and a greatly power consumptive dehydration or drying stroke does not absolutely overlap the peak time.

FIGS. 10*a* to 10*d* illustrate that, in the case in which the mobile terminal 600 enters an acoustic communication mode while displaying a power information screen, power information Spow is transmitted to the washing machine 200*b* and the washing machine 200*b* performs power saving operation corresponding to the received power information Spow.

It will be appreciated that, differently from the illustration of FIGS. 10*a* to 10*d*, various alterations of the embodiment of the present invention are possible.

FIGS. 11*a* to 11*e* illustrate that, in the case in which the mobile terminal 600 enters an acoustic communication mode while displaying a recipe related screen, the mobile terminal 600 may output sound containing recipe information Sreci, and the cooking appliance 200*d* may extract the recipe information Sreci from the received sound and perform operation corresponding to the extracted recipe information Sreci.

FIG. 11*a* illustrates that the mobile terminal 600 executes an application related to the cooking appliance 200*d*, and displays an application screen 1110 related to the cooking appliance 200*d*.

FIG. 11*b* illustrates that the mobile terminal 600 displays a recipe related screen 1120 of the application screen related to the cooking appliance 200*d*. In the drawing, a recipe screen related to "apple tart" is illustrated.

Next, FIG. 11*c* illustrates that the specific key 601 of the mobile terminal 600 is selected in a state in which the recipe related screen 1120 is displayed on the mobile terminal 600. As such, the mobile terminal 600 may enter an acoustic communication mode. Alternatively, differently from the illustration, the mobile terminal 600 may enter an acoustic communication mode upon selection of an acoustic communication application in the mobile terminal 600.

Thereby, as illustrated in FIG. 11*d*, the mobile terminal 600 may output sound containing recipe information Sreci related to "apple tart" in the acoustic communication mode. Here, the recipe information may include cooking time information, cooking course information, cooking type information and the like.

As illustrated in FIG. 11*e*, the cooking appliance 200*d* performs cooking operation related to "apple tart" based on the recipe information Sreci related to "apple tart" extracted from the received sound. As such, the user may simply cook desired food ("apple tart") by directly pushing or not pushing a cooking start button without additional setting.

FIGS. 12*a* to 12*e* illustrate that, in the case in which the mobile terminal 600 enters an acoustic communication mode while displaying a washing course screen, the mobile terminal 600 may output sound containing washing course information Scos, and the washing machine 200*b* may extract the washing course information Scos from the received sound and perform operation corresponding to the extracted washing course information Scos.

FIG. 12*a* illustrates that the mobile terminal 600 executes an application related to the washing machine 200*b*, and displays an application screen 1210 related to the washing machine 200*b*.

Although the drawing illustrates that the application screen 1210 related to the washing machine 200*b* includes a firmware item and a washing course item 1215, various alterations are possible.

When the washing course item 1215 is selected, as illustrated in FIG. 12*b*, the mobile terminal 600 may display a washing course screen 1220 of the application screen related to the washing machine 200*b*. The drawing illustrates the washing course screen 1220 related to "course a" that includes a washing stroke of 60 minutes, a rinsing stroke of 20 minutes and a dehydration stroke of 10 minutes.

Next, FIG. 12*c* illustrates that the specific key 601 of the mobile terminal 600 is selected in a state in which the washing course screen 1220 is displayed on the mobile terminal 600. As such, the mobile terminal 600 may enter an acoustic communication mode. Alternatively, differently from the illustration, the mobile terminal 600 may enter an acoustic communication mode upon selection of an acoustic communication application in the mobile terminal 600.

Thereby, as illustrated in FIG. 12*d*, the mobile terminal 600 may output sound containing washing course information Scos related to "course a" in the acoustic communication mode. Here, the washing course information related to "course a" may include time information, such as a washing stroke of 60 minutes, a rinsing stroke of 20 minutes and a dehydration stroke of 10 minutes.

FIG. 12*e* illustrates that the washing machine 200*b* performs washing course operation related to "course a" based on the washing course information Scos related to "course a" extracted from the received sound. As such, the user may simply perform washing related to a desired washing course ("course a") by directly pushing or not pushing a start button without additional setting.

FIGS. 13*a* to 13*d* illustrate that, in the case in which the mobile terminal 600 enters an acoustic communication mode while displaying a remote control screen, more particularly, a remote control screen with respect to the air conditioner 200*c*, the mobile terminal 600 may output air conditioner remote control information Son, and the air conditioner 200*c* may extract the air conditioner remote control information Son from the received sound and perform operation corresponding to the extracted air conditioner remote control information Son.

FIG. 13*a* illustrates that the mobile terminal 600 executes a remote control application with respect to the home appliance 200, and displays a remote control screen 1210 with respect to the home appliance 200.

In this case, the remote control screen 1210 may include a plurality of home appliance items to enable remote control of a plurality of home appliances. Although the drawing illustrates a robot cleaner item 1312 and an air conditioner item 1315 by way of example, various other examples are possible.

When the air conditioner item 1315 is selected, as illustrated in FIG. 13*b*, the mobile terminal 600 may display a remote control screen 1320 with respect to the air conditioner 200*c*. Although the drawing illustrates the remote control screen 1320 with respect to the air conditioner 200*c* that includes a power item 1325, a temperature regulation item and the like, various other items, such as an air direction regulation item, a dehumidification operation item, an operation time regulation item and the like, may also be displayed.

Meanwhile, FIG. 13*b* illustrates selection or focusing of the power item 1325.

Next, FIG. 13*c* illustrates that the specific key 601 of the mobile terminal 600 is selected in a state in which the remote control screen 1320 with respect to the air conditioner 200*c* is displayed on the mobile terminal 600 and the power item 1325 is selected or focused. As such, the mobile terminal 600 may enter an acoustic communication mode. Alternatively, differently from the illustration, the mobile terminal 600 may enter an acoustic communication mode upon selection of an acoustic communication application in the mobile terminal 600.

Thereby, as illustrated in FIG. 13*c*, the mobile terminal 600 may output sound containing power-on information Son in the acoustic communication mode.

FIG. 13*d* illustrates that the air conditioner 200*c* is turned on based on the power-on information Son extracted from the received sound. As such, the air conditioner 200*c* may be remotely controlled via the received sound without a separate wireless communication module. The remote control may be applied to all home appliances except for the air conditioner 200*c*.

Meanwhile, firmware upgrade with respect to the home appliance may be performed.

Although not shown in FIGS. 10*a* to 13*d*, in the case in which a screen displayed on the mobile terminal 600 is an access point device list screen, the mobile terminal 600 may output sound containing network information with respect to an access point device in an acoustic communication mode.

In this way, in the case in which the home appliance 200 includes a communication module, such as a WiFi module, the home appliance 200 may be simply wirelessly connected to an adjacent access point (AP) device using the received network information, which may increase user convenience.

FIG. 14 is a flowchart showing an operating method of a mobile terminal according to another embodiment of the present invention, FIG. 15 is a flowchart showing an operating method of a home appliance according to another embodiment of the present invention, and FIGS. 16*a* to 22*c* are reference views for explanation of the operating method of FIG. 14 or FIG. 15.

First, referring to FIG. 15, the home appliance 200 judges whether or not power of the home appliance 200 is in an on state (S1500). Upon judgment of the on state, the home appliance 200 stores home appliance related information in the memory thereof (S1501).

When power of the home appliance 200 is in the on state, the controller of the home appliance 200 may store home appliance related information, such as, for example, operational state information, operation history information, product information, breakdown information, power consumption information, stored article information, recipe information or the like. In particular, the home appliance related information may be stored in the memory 260 in the home appliance 200.

For example, in the case in which the washing machine 200*b* is performing washing operation, information regarding an operation time and an operation course of the washing machine, information regarding whether or not the washing machine breaks down and the like may be stored in the memory 260 in the washing machine 200*b*.

Meanwhile, the home appliance related information may be periodically stored in the memory 260 during operation of the home appliance 200.

Alternatively, the home appliance related information may be stored in the memory 260 at a first periodic interval at an initial operation stage of the home appliance 200 and, thereafter, stored in the memory at a second periodic interval that is shorter than the first periodic interval.

Next, referring to FIG. 14, the mobile terminal 600 displays a prescribed screen in response to user input (S1420). Here, there are various examples of the prescribed screen including a web screen or an application screen in response to user input and the like.

FIG. 16*a* illustrates that the mobile terminal 600 displays a monitoring screen 1620. The monitoring screen 1620 may be a screen displayed upon selection of a monitoring item from an execution screen of an application related to the home appliance.

Next, the mobile terminal 600 judges whether or not the home appliance is in an acoustic communication mode (S1440). Upon judgment of the acoustic communication mode, the mobile terminal 600 receives sound containing prescribed information from the home appliance (S1445). Then, the mobile terminal 600 extracts the prescribed information from the received sound and, more particularly, extracts information related to the screen displayed on the mobile terminal 600 (S1447). Then, the mobile terminal 600 displays the extracted information (S1450).

Here, Step S1540 of FIG. 15 corresponds to Step S1440 of FIG. 14, and Step S1545 of FIG. 15 corresponds to Step S1445 of FIG. 14.

Meanwhile, Step S1440 of FIG. 14 may be omitted. That is, when the sound receiving step S1445 is performed after the screen display step S1420, automated entry to the acoustic communication mode is possible.

FIG. 16*a* illustrates that the monitoring screen 1620 is displayed on the mobile terminal 600 during operation of the washing machine 200*b*. The washing machine 200*b* may periodically store operational state information in the memory during operation thereof.

As exemplarily shown in FIG. 16*a*, when a specific key 201*b* of the washing machine 200*b* is selected, the washing machine 200*b* may enter the acoustic communication mode.

Thereby, as exemplarily shown in FIG. 16*b*, the washing machine 200*b* may output sound containing prescribed information in the acoustic communication mode. In this case, the information contained in the sound may include product information, operational state information and the like of the washing machine 200*b*. In the drawing, for convenience, output of sound containing operational state information Sstp is illustrated.

The mobile terminal 600 may receive the sound from the washing machine 200*b* and extract the prescribed information from the received sound. In particular, operational state information related to the monitoring screen 1620 displayed on the mobile terminal 600 may be extracted. In this way, the mobile terminal 600 may simply acquire information related to the displayed screen from the washing machine 200*b*.

Then, the mobile terminal 600 may display information received from the home appliance.

FIG. 16*c* illustrates that operational state information Sstp of the washing machine 200*b* is displayed on the mobile terminal 600.

The drawing illustrates that information indicating that dehydration is being performed 1630, residual time information 1635 and total progress time information 1637 are displayed on the mobile terminal 600, but various alterations are possible.

FIGS. 17*a* to 17*d* illustrate that, in the case in which the washing machine 200*b* enters an acoustic communication mode in a state in which the mobile terminal 600 displays a diagnosis screen, the washing machine 200*b* outputs sound containing breakdown information Sdia thereof, and the mobile terminal 600 extracts the breakdown information Sdia of the washing machine 200*b* from the received sound and accesses the server 500 using the extracted breakdown information Sdia to receive breakdown diagnosis result information.

FIG. 17*a* illustrates that a diagnosis screen 1720 is displayed on the mobile terminal 600.

As illustrated in FIG. 17*a*, the washing machine 200*b* may enter an acoustic communication mode upon selection of the specific key 201*b* of the washing machine 200*b*.

Thereby, as illustrated in FIG. 17*b*, the washing machine 200*b* may output sound containing prescribed information in the acoustic communication mode. In this case, the information contained in the sound may include product information, operational state information, breakdown diagnosis result information and the like of the washing machine 200*b*. In the drawing, for convenience, output of sound containing breakdown diagnosis result information Sres is illustrated.

The mobile terminal 600 may receive the sound from the washing machine 200*b* and extract the prescribed information from the received sound. In particular, the mobile terminal 600 may extract breakdown diagnosis result information Sres related to the diagnosis screen 1720 displayed on the mobile terminal 600. In this way, the mobile terminal 600 may simply acquire information related to the displayed screen from the washing machine 200b.

FIG. 17c illustrates that breakdown result information 1730 based on the extracted breakdown diagnosis result information Sres of the washing machine is displayed on the display.

The drawing illustrates that a phrase "The water discharge hole is frozen" is displayed as the breakdown result information 1730 of the washing machine. In this way, the user may simply check a breakdown reason of the washing machine, which may increase user convenience.

The mobile terminal 600 may further display an after service (AS) request item 1735 except for the breakdown result information 1730 of the washing machine.

When the AS request item 1735 is selected by user input in FIG. 17c, as exemplarily shown in FIG. 17d, an AS request screen 1740 may be displayed. Thereby, the user may request AS immediately after checking the break result information, which may increase user convenience.

FIGS. 18a to 18c illustrate that, in the case in which the refrigerator 200a enters an acoustic communication mode in a state in which the mobile terminal 600 displays a monitoring screen, the refrigerator 200a outputs sound containing operational state information Sst of the refrigerator 200a, and the mobile terminal 600 extracts the operational state information Sst of the refrigerator 200a from the received sound and displays the extracted operational state information Sst.

FIG. 18a illustrates that a monitoring screen 1820 related to the refrigerator 200a is displayed.

As illustrated in FIG. 18a, the refrigerator 200a may enter an acoustic communication mode upon selection of a specific key 201a of the refrigerator 200a.

Thereby, as illustrated in FIG. 18b, the refrigerator 200a may output sound containing prescribed information in the acoustic communication mode. In this case, the information contained in the sound may include product information, operational state information and the like of the refrigerator 200a. In the drawing, for convenience, output of sound containing operational state information Sst is illustrated.

The mobile terminal 600 may receive the sound from the refrigerator 200a and extract the prescribed information from the received sound. In particular, the mobile terminal 600 may extract operational state information Sst related to the monitoring screen 1820 displayed on the mobile terminal 600. In this way, the mobile terminal 600 may simply acquire information related to the displayed screen from the refrigerator 200a.

FIG. 18c illustrates an operational state information screen 1830 of the refrigerator 200a based on the extracted operational state information Sst. Here, the operational state information screen 1830 of the refrigerator 200a includes freezing compartment temperature information, refrigerating compartment temperature information, turbo freezing operation information, smart power saving operation information, information regarding the number of times that a door is opened or closed, and power usage information, but various alterations are possible. The user may simply check an operational state of the refrigerator 200a via the operational state information screen 1830 of the refrigerator 200a.

FIGS. 19a to 19c illustrate that, in the case in which the refrigerator 200a enters an acoustic communication mode in a state in which the mobile terminal 600 displays a magic space screen related to food management, the refrigerator 200a outputs sound containing food storage information Sfood regarding food stored in the refrigerator 200a, and the mobile terminal 600 extracts the food storage information Sfood from the received sound and displays the extracted food storage information Sfood.

FIG. 19a illustrates that a magic space screen 1920 related to the refrigerator 200a is displayed.

As illustrated in FIG. 19a, the refrigerator 200a may enter an acoustic communication mode upon selection of the specific key 201a of the refrigerator 200a.

Thereby, as illustrated in FIG. 19b, the refrigerator 200a may output sound containing prescribed information in the acoustic communication mode. In this case, the information contained in the sound may include product information and operational state information of the refrigerator 200a, food storage information Sfood regarding food stored in the refrigerator 200a and the like. In the drawing, for convenience, output of sound containing the food storage information Sfood regarding food stored in the refrigerator 200a is illustrated.

The mobile terminal 600 may receive the sound from the refrigerator 200a and extract the prescribed information from the received sound. In particular, the mobile terminal 600 may extract the food storage information Sfood regarding food stored in the refrigerator 200a that is related to the magic space screen 1920 displayed on the mobile terminal 600. In this way, the mobile terminal 600 may simply acquire information related to the displayed screen from the refrigerator 200a.

FIG. 19c illustrates that the magic space screen 1930 of the refrigerator 200a based on the extracted food storage information Sfood is displayed. Here, the magic space screen 1930 is a screen that simulates the case in which a refrigerator's door is opened. The magic space screen 1930 may be displayed using information regarding kinds and positions of food stored in the refrigerator 200a and the like. In addition, the magic space screen 1930 may further display information regarding an expiration date of food, a warehousing date of food and the like. The user may simply check information regarding food stored in the refrigerator 200a via the magic space screen 1930 that shows the food storage information Sfood regarding food stored in the refrigerator 200a.

FIGS. 20a to 20c illustrate that, in the case in which the refrigerator 200a enters an acoustic communication mode in a state in which the mobile terminal 600 displays a recipe related screen, the refrigerator 200a outputs sound containing recipe information Sreci based on food stored therein, and the mobile terminal 600 extracts the recipe information Sreci from the received sound and transmits the extracted recipe information Sreci to the server 500 to thereby receive content Svod related to a corresponding recipe from the server 500.

FIG. 20a illustrates that a recipe related screen 2020 related to the refrigerator 200a is displayed.

As illustrated in FIG. 20a, the refrigerator 200a may enter an acoustic communication mode upon selection of the specific key 201a of the refrigerator 200a.

Thereby, as illustrated in FIG. 20b, the refrigerator 200a may output sound containing prescribed information in the acoustic communication mode. In this case, the information contained in the sound may include product information, operational state information, recipe information Sreci and the like of the refrigerator 200a. In the drawing, for convenience, output of sound containing the recipe information Sreci is illustrated.

Here, the recipe information Sreci may be recipe information generated by the refrigerator 200a based on information regarding food stored in the refrigerator 200a.

The mobile terminal 600 may receive the sound from the refrigerator 200a and extract the prescribed information from the received sound. In particular, the mobile terminal 600 may extract the recipe information Sreci related to the recipe related screen 2020 displayed on the mobile terminal 600. In this way, the mobile terminal 600 may simply acquire information related to the displayed screen from the refrigerator 200a.

Then, as illustrated in FIG. 20c, the mobile terminal 600 may transmit the extracted recipe information Sreci to the server 500 and receive content Svod related to a corresponding recipe from the server 500. Here, the received content Svod may be a video.

The mobile terminal 600 may reproduce and display the received content Svod. This may allow the user to simply watch the content Svod related to a corresponding recipe when attempting to cook food based on information regarding food stored in the refrigerator 200a. In this way, the user may directly refer to the recipe while cooking food in the kitchen, which may increase user convenience.

FIGS. 21a to 21c illustrate that, in the case in which the cleaner 200e enters an acoustic communication mode in a state in which the mobile terminal 600 displays a monitoring screen thereon, the cleaner 200e outputs sound containing operational state information Sst of the cleaner 200e, and the mobile terminal 600 extracts the operational state information Sst of the cleaner 200e from the received sound and displays the extracted operational state information Sst.

FIG. 21a illustrates that a monitoring screen 2120 related to the cleaner 200e is displayed on the mobile terminal 600.

As illustrated in FIG. 21a, the cleaner 200e may enter an acoustic communication mode upon selection of a specific key 201e of the cleaner 200e.

Thereby, as illustrated in FIG. 21b, the cleaner 200e may output sound containing prescribed information in the acoustic communication mode. In this case, the information contained in the sound may include product information, operational state information, breakdown diagnosis result information and the like of the cleaner 200e. In the drawing, for convenience, output of sound containing the operational state information Sst is illustrated.

The mobile terminal 600 may receive the sound from the cleaner 200e and extract the prescribed information from the received sound. In particular, the mobile terminal 600 may extract the operational state information Sst related to the monitoring screen 2120 displayed on the mobile terminal 600. In this way, the mobile terminal 600 may simply acquire information related to the displayed screen from the cleaner 200e.

FIG. 21c illustrates an operational state information screen 2130 of the cleaner 200e based on the extracted operational state information Sst. Here, the operational state information screen 2130 of the cleaner 200e includes cleaner movement path information, a cleaner patrol stop item, a charging item, a cleaning item, a patrol item and the like, but various alterations are possible. The user may simply check an operational state of the cleaner 200e via the operational state information screen 2130 of the cleaner 200e.

FIGS. 22a to 22c illustrate that, in the case in which the air conditioner 200c enters an acoustic communication mode in a state in which the mobile terminal 600 displays a monitoring screen, the air conditioner 200c outputs sound containing operational state information Sst of the air conditioner 200c, and the mobile terminal 600 extracts the operational state information Sst of the air conditioner 200c from the received sound and displays the extracted operational state information Sst.

FIG. 22a illustrates that the air conditioner 200c receives a remote control signal Sre from a remote control device 210c that is used to remotely control the air conditioner 200c.

To this end, the air conditioner 200c may include a remote control signal receiver (not shown). The remote control signal receiver (not shown) may be provided in the communication unit 222 of FIG. 3a or FIG. 3b.

The air conditioner 200c may perform corresponding operation upon reception of the remote control signal Sre. For example, the air conditioner 200c may be turned on in response to a power-on signal or may perform temperature setting in response to a temperature setting signal. As such, the air conditioner 200c may perform various operations, such as indoor cooling, dehumidification and the like.

As illustrated in FIG. 22a, the air conditioner 200c may enter an acoustic communication mode upon selection of a specific key 201c of the remote control device 210c for remote control of the air conditioner 200c.

Thereby, as illustrated in FIG. 22b, the air conditioner 200c may output sound containing prescribed information in the acoustic communication mode. In this case, the information contained in the sound may include product information, operational state information, breakdown diagnosis result information and the like of the air conditioner 200c. In the drawing, for convenience, output of sound containing the operational state information Sst is illustrated.

The mobile terminal 600 may receive the sound from the air conditioner 200c and extract the prescribed information from the received sound. In this case, when the mobile terminal 600 displays a monitoring screen 2220, the mobile terminal 600 may extract operational state information Sst related to the monitoring screen 2220 displayed on the mobile terminal 600 among received information. In this way, the mobile terminal 600 may simply acquire information related to the displayed screen from the air conditioner 200c.

FIG. 22c illustrates an operational state information screen 2230 of the air conditioner 200c based on the extracted operational state information Sst. Here, the operational state information screen 2230 of the air conditioner 200c illustrates indoor temperature information, target temperature information, operation time information, smart power-saving operation information, information regarding the number of times that the robot cleaner performs cleaning operation, and power usage information, but various alterations are possible. The user may simply check an operational state of the air conditioner 200c via the operational state information screen 2230 of the air conditioner 200c.

In particular, through provision of the remote control device 210c, it is possible to simply check an operational state of the remotely controlled air conditioner 200c using the mobile terminal 600.

Note that remote control of the air conditioner 200c by the remote control device 210c and checking of a remote control result by the mobile terminal 600 may be applied to other home appliances except for the air conditioner 200c.

FIG. 23 is a flowchart showing an operating method of a mobile terminal according to another embodiment of the present invention, and FIGS. 24a to 27d are reference views for explanation of the operating method of FIG. 23.

First, referring to FIG. 23, the mobile terminal 600 outputs a service set identifier (SSID) request signal for registration of a home appliance (S2310).

For example, the mobile terminal 600 may output the SSID request signal via infrared (IR) communication or the above-described acoustic communication.

The home appliance 200 may output an SSID upon reception of the SSID request signal. In particular, the home appliance 200 may output sound containing the SSID from the acoustic output module 253 via acoustic communication.

Note that Step S2310 may be selectively performed. For example, in the case in which the home appliance 200 includes a wireless communication switch, the home appliance 200 may output an SSID when the corresponding switch is operated. In particular, the sound containing the SSID may be output from the acoustic output module 253 via acoustic communication.

Alternatively, prior to Step S2310, the mobile terminal 600 may execute an application for product registration or network registration of the home appliance in response to user operation. After execution of the corresponding application, the mobile terminal 600 may output an access point (AP) mode entry signal in response to user operation.

FIG. 24*a* illustrates that a screen 810 for refrigerator registration is displayed on the mobile terminal 600. For example, the mobile terminal 600 may output an SSID request signal upon selection of a WiFi registration item (not shown) in the screen 810.

FIG. 24*b* illustrates output of the SSID request signal via acoustic communication.

That is, the mobile terminal 600 may output sound Soa containing an SSID request from the acoustic output module 653.

In this case, the home appliance 200 may receive the sound Soa containing the SSID request via the microphone 223 and perform signal processing on the received sound Soa.

In particular, the controller 270 of the home appliance 200 may judge that the received sound is valid sound or contains valid information when the intensity of the sound Soa (e.g., in decibel) containing the SSID request is a prescribed value or more (e.g., in decibel) or when a bit error rate (BER) of the extracted SSID request is a prescribed value or less.

The drawing illustrates that the home appliance 200 and the mobile terminal 600 are at a short distance within a range Area 1. In this case, the range Area 1 may correspond to a range in which the intensity of sound is a prescribed value or more or the bit error rate is a prescribed value or less. That the home appliance 200 and the mobile terminal 600 are at a short distance is judged as the received information being valid and that the home appliance 200 and the mobile terminal 600 are at a remote distance is judged as the received information being invalid. Based on this judgment, it is possible to select only a valid mobile terminal 600 among a plurality of mobile terminals 600. Likewise, it is possible to select only a valid home appliance among a plurality of home appliances is possible. In this way, security upon information transmission between the home appliance 200 and the mobile terminal 600 may be enhanced.

Meanwhile, the controller 270 of the home appliance 200 may control the acoustic output module 253 so as to output the sound containing the SSID in response to the SSID request signal.

Next, the mobile terminal 600 receives the sound containing the SSID from the home appliance (S2315). Then, the mobile terminal 600 extracts the SSID from the sound (S2320), and judges whether or not the intensity of the received sound is a prescribed value or more or the bit error rate (BER) of the extracted SSID is a prescribed value or less (S2325). When the received sound is valid, the mobile terminal 600 accesses the home appliance 200 based on the SSID (S2328).

FIG. 24*c* illustrates output of the sound Sob containing the SSID in response to the SSID request signal.

In this case, the mobile terminal 600 may receive the sound Sob containing the SSID via the microphone 623 and perform signal processing on the receive sound Sob.

More specifically, the acoustic communication unit 617 of the mobile terminal 600 may extract the SSID from the received sound using the synchronizer, the frequency converter and the data extractor.

Meanwhile, the controller 680 of the mobile terminal 600 may judge that the received sound Sob containing the SSID of the home appliance is valid sound or contains valid information when the intensity of the received sound Sob (e.g., in decibel) is a prescribed value or more or the bit error rate (BER) of the extracted SSID of the home appliance is a prescribed value or less.

Then, the controller 680 of the mobile terminal 600 may control the wireless communication module 615 so as to access the home appliance 200 based on the SSID. In this way, the mobile terminal 600 and the home appliance 200 may enter a two-way data exchange possible state. In particular, the mobile terminal 600 and the home appliance 200 may maintain a WiFi access state to enable wireless communication.

Next, the mobile terminal 600 outputs network information of a prescribed access point device to the home appliance (S2330).

For example, the controller 680 of the mobile terminal 600 may control the acoustic output module 253 so as to output sound containing network information of the access point device corresponding to the SSID.

The network information of the access point device may be information regarding a network selected by the user, the last used access point device, the most frequently used access point device, or a currently used access point device.

*Meanwhile, the network information of the access point device may be information regarding a wireless network.

FIG. 24*d* illustrates output of sound Soc containing the network information of the access point device.

In this case, the controller 270 of the home appliance 200 may judge that the received sound Soc containing the network information of the access point device is valid sound or contains valid information when the intensity of the received sound Sob (e.g., in decibel) is a prescribed value or more or the bit error rate (BER) of the extracted SSID of the home appliance is a prescribed value or less.

Then, the controller 270 of the home appliance 200 may access the corresponding access point device in response to the valid network information. In particular, the controller 270 of the home appliance 200 may control the wireless communication unit 218 so as to access the corresponding access point device via wireless communication, such as WiFi or the like.

FIG. 24*e* illustrates that the home appliance 200 accesses an access point device 300.

In another example of network information output, the controller 680 of the mobile terminal 600 may control the wireless communication module 615 so as to transmit network information of an access point device in radio signals based on an SSID.

As such, the home appliance 200 may receive the network information of the access point device via the wireless communication unit 218 and transmit the same to the controller 270. Thereafter, the controller 270 may control access to the corresponding access point device based on the network information of the access point device.

Meanwhile, while connection between the mobile terminal 600 and the home appliance 200 is maintained, the mobile terminal 600 may transmit a product information request signal to the home appliance 200. As such, the home appliance 200 may transmit product information of the home appliance 200 (a product name, a model name and the like) to the mobile terminal 600. In this case, the product information may be transmitted via wireless communication or acoustic communication.

Next, the mobile terminal 600 may receive the product information of the home appliance 200 (S2335), and store the product information in the memory 660 (S2340).

In particular, as exemplarily shown in FIG. 24a, during execution of an application for refrigerator registration, storage of the product information in connection with the application is possible.

FIG. 25a illustrates that the stored product information, such as a product name and a model name, is displayed in the refrigerator registration screen 905.

In this case, the mobile terminal 600 may further receive name information related to a refrigerator by user input. The drawing illustrates input of a name "coo" to an input window 906.

As such, the name information related to the refrigerator, such as "coo", and the product information may be stored together in connection with the application.

Thereafter, as exemplarily shown in FIG. 25b, when an item 912, represented by "coo", in a remote control screen 910 is selected upon execution of a refrigerator remote control application, a remote control signal Srem or the like is transmitted to the refrigerator 200a placed in a house through an access point device 300. As such, remote control may be simply performed.

The mobile terminal 600 may transmit the received product information (a product name, a model name and the like) of the home appliance 200 to the server 500 to enable implementation of product registration.

FIG. 26a illustrates that product information Spr, such as, for example, a product name or a model name, is transmitted from the mobile terminal 600 to the server 500 through the access point device 300. As such, remote control may be simply performed.

The mobile terminal 600 may receive name information related to the home appliance 200 via the user input unit 630, and transmit the name information and the product information (a product name, a model name and the like) of the home appliance 200 to the server 500 to enable implementation of product registration.

FIG. 26b illustrates that product information Spr, such as a product name or a model name, and name information Sna are transmitted from the mobile terminal 600 to the server 500 through the access point device 300. As such, remote control may be simply performed.

The mobile terminal 600 may vary, by user selection, a prescribed value with respect to the intensity of sound or a prescribed value with respect to the bit error rate, which is utilized upon judgment of validity of the home appliance.

In addition, the home appliance 200 may vary, by user selection, a prescribed value with respect to the intensity of sound or a prescribed value with respect to the bit error rate, which is utilized upon judgment of validity of the mobile terminal.

Next, FIGS. 27a to 27d illustrate that the mobile terminal 600 outputs sound containing network information regarding a pre-stored access point device, in particular, for the home appliance 200 having the wireless communication unit 218, more particularly, a WiFi module.

First, FIG. 27a illustrates that an access point device list screen 2700 is displayed on the mobile terminal 600. The access point device list screen 2700 may include items of pre-stored access point devices or items of currently accessible access point devices.

In the case in which a specific access point device item 2705 is selected by the user, as exemplarily shown in FIG. 27b, an object 2715, which indicates output of network information regarding the selected access point device in an acoustic communication mode, may be displayed. Meanwhile, entry to the acoustic communication module may be accomplished via selection of a specific key or a specific item.

Then, as exemplarily shown in FIG. 27c, the mobile terminal 600 may output sound containing network information Snet regarding the selected access point device via the acoustic output module 653.

As such, the home appliance 200 may receive sound via the microphone 223 and extract the network information Snet regarding a specific access point device from the received sound.

Then, the home appliance 200, as exemplarily shown in FIG. 27d, may access the corresponding access point device 300 using the extracted network information Snet regarding the specific access point device and also access the prescribed server 500.

FIG. 28 is a flowchart showing an operating method of a home appliance according to a further embodiment of the present invention, FIG. 29 is a flowchart showing an operating method of a home appliance according to a further embodiment of the present invention and FIGS. 30 to 35b are reference views for explanation of the operating method of FIG. 28 or FIG. 29.

First, referring to FIG. 28, a first home appliance 200a may enter an acoustic communication mode (S2810). Note that Step S3010 of FIG. 30 corresponds to Step S2810 of FIG. 28.

Here, the acoustic communication mode may refer to a mode in which the first home appliance 200a receives sound via the microphone 223. The controller 270 of the first home appliance 200a may control the microphone 223 such that the microphone 223 is activated upon selection of a specific key of the first home appliance 200a.

Next, the first home appliance 200a may receive sound via the microphone 223 (S2812). Note that Step S3012 of FIG. 30 corresponds to Step S2812 of FIG. 28.

When sound is output from another home appliance or a mobile terminal in an activated state of the microphone 223 of the first home appliance 200a, the microphone 223 may receive the output sound.

Next, the home appliance extracts information from the received sound (S2815). Note that Step S3015 of FIG. 30 corresponds to Step S2815 of FIG. 28.

The acoustic communication unit 217, as described above, may include the synchronizer 430, the frequency converter 435 and the data extractor 440 for extraction of data from the received sound. Data may be extracted after implementation of synchronization and frequency conversion.

Next, the first home appliance 200a judges whether or not the extracted information data contains information regarding another home appliance adjacent thereto (S2816). When the extracted information data contains the information regarding another home appliance, sound containing the extracted information is output from the first home appliance 200a or the adjacent home appliance (S2820). Note that Step S3016 and Step S3020 of FIG. 30 may correspond to Step S2816 and S2820 of FIG. 28 respectively.

The controller 270 or the acoustic communication unit 217 judges whether or not the extracted information data contains information regarding another home appliance. For example, in the case in which the extracted information data contains a name of another adjacent home appliance (e.g., a cooking appliance or a TV), or contains a term related to a main operation of another home appliance (e.g., broadcast watching, broadcast program or temperature), the controller 270 or the acoustic communication unit 217 may determine output of sound containing the related information to the related home appliance.

After the controller 270 or the acoustic communication unit 217 determines transmission of the extracted information data to another home appliance, the acoustic communication unit 217 may generate sound containing the extracted information data in the acoustic communication mode.

To this end, the acoustic communication unit 217, as described above, may include the frequency converter 410, the data inserter 415, the inverse transformer 420 and the multiplexer 425. In this way, the acoustic communication unit 217 outputs sound acquired by adding the extracted information data to audio data to be output. The output sound contains information related to another home appliance.

Next, referring to FIG. 29, a second home appliance 200b receives the sound from the first home appliance 200a (S2920). Note that Step S3020 of FIG. 30 may correspond to Step S2920 of FIG. 29.

The microphone 223 of the second home appliance 200b may receive the sound from the first home appliance 200a.

Next, the second home appliance 200b extracts information from the received sound (S2923). Note that Step S3023 of FIG. 30 may correspond to Step S2923 of FIG. 29.

The acoustic communication unit 217 in the second home appliance 200b, as described above, may include the synchronizer 430, the frequency converter 435 and the data extractor 440 for extraction of data from the received sound. Data may be extracted after implementation of synchronization and frequency conversion.

Next, the second home appliance 200b may judge whether or not the extracted information data is an operation control command (S2925). When the extracted information data is the operation control command, the second home appliance 200b is controlled to perform operation depending on the operation control command (S2930). Note that Step S3025 and Step S3030 of FIG. 30 may correspond to Step S2925 and S2930 of FIG. 29 respectively.

For example, in the case in which the extracted information data is "Turn on washing machine", a washing machine, i.e. the second home appliance 200b may be turned on. More specifically, when the washing machine is turned on in a standby power mode, a display unit, an input unit and the like of the washing machine may be activated.

Next, upon judgment in Step S2925 that the extracted information data is not the operation control command, Step S2935 and following step(s) thereof may be performed.

The second home appliance 200b may judge whether or not the extracted information data is a voice memo (S2935). When the extracted information data is a voice memo, the second home appliance 200b may store the voice memo in the memory 260 (S2940). Then, upon input of a reproduction command, the stored voice memo is reproduced and output. Note that Step S3035 and Step S3040 of FIG. 30 may correspond to Step S2935 and Step S2940 of FIG. 29.

In this way, when the extracted information data is a voice memo "I'm having a get-together today, please wash laundry placed in the washing machine", the controller of the second home appliance 200b may control storage of the voice memo in the memory 260.

The controller of the second home appliance 200b may control output of a message indicating reception of the voice memo. This assists the user in intuitively recognizing reception of the voice memo.

Then, when the user pushes a specific button on the input unit 220 of the second home appliance 200b, reproduction and output of a voice memo 1030 stored in the memory are possible. In this way, the user may simply check the stored memo.

FIGS. 31a to 31c illustrate data sharing between the refrigerator 200a and the washing machine 200b.

FIG. 31a illustrates that a user 900 performs remote control using the mobile terminal 600. In particular, FIG. 31a illustrates that the user drives a remote control application to select an item represented by "Turn on washing machine". As such, the mobile terminal 600 may output sound Sc containing information data, such as "Turn on washing machine", in an acoustic communication mode. Thereby, the refrigerator 200a may receive the sound Sc containing the information data, such as "Turn on washing machine". Then, the refrigerator 200a may extract the information data from the received sound Sc.

In the case in which information regarding another home appliance, rather than information regarding the refrigerator 200a, is contained in the extracted information data, the refrigerator 200a may output sound containing the extracted information data.

FIG. 31b illustrates that the refrigerator 200a outputs the sound Sc containing the information data, such as "Turn on washing machine", based on the received sound. In particular, FIG. 31b illustrates that the refrigerator 200a outputs the sound Sc to the adjacent washing machine 200b.

Next, FIG. 31c illustrates that the washing machine 200b is turned on based on the related information data contained in the received sound Sc. In this case, a voice message or a text message indicating that the washing machine 200b is turned on may be output.

FIGS. 32a to 32c illustrate data sharing between the refrigerator 200a and a TV 200f.

FIG. 32a illustrates that the user 900 performs remote control using the mobile terminal 600. In particular, FIG. 32a illustrates that the user drives a remote control application to select a remote control item represented by "TV channel 9".

As such, the mobile terminal 600 may output sound S3 containing the information data, such as "TV channel 9", in an acoustic communication mode. In this way, the refrigerator 200a may receive the sound S3 containing the information data, such as "TV channel 9". Then, the refrigerator 200a may extract the information data from the received sound S3.

In the case in which information regarding another home appliance, rather than information regarding the refrigerator 200a, is contained in the extracted information data, the refrigerator 200a may output sound containing the extracted information data.

FIG. 32b illustrates that the refrigerator 200a outputs the sound S3 containing the information data, such as "TV channel 9", based on the received sound. In particular, FIG. 32b illustrates that the refrigerator 200a outputs the sound S3 to the adjacent TV 200f.

Next, FIG. 32c illustrates that the TV 200f, which has displayed a broadcast image 3220 of the channel 11, begins to display a broadcast image 3230 of the channel 9 based on the information data contained in the received sound S3. As such, the user who stands in front of the refrigerator 200a may simply switch TV channels.

FIGS. 33a to 33c illustrate data sharing between the refrigerator 200a and the air conditioner 200c.

FIG. 33a illustrates that the user 900 performs remote control using the mobile terminal 600. In particular, FIG. 33a illustrates that the user drives a remote control application to select a remote control item represented by "Temperature drop". As such, the mobile terminal 600 may output sound Sg containing information data, such as "temperature drop", in an acoustic communication mode. Thereby, the refrigerator 200a may receive the sound Sg containing the information data, such as "temperature drop", and extract the information data from the received sound Sg.

In the case in which information regarding another home appliance, rather than information regarding the refrigerator 200a, is contained in the extracted information data, the refrigerator 200a may output sound containing the extracted information data.

FIG. 33b illustrates that the refrigerator 200a outputs the sound Sg containing the information data, such as "Temperature Drop", based on the received sound. In particular, FIG. 33b illustrates that the refrigerator 200a outputs the sound Sg to the adjacent air conditioner 200c.

Next, FIG. 33c illustrates that the air conditioner 200c begins cooling operation to lower an indoor temperature based on the related information data contained in the received sound Sg and discharges cooled air toward the user 900. In this way, the user who stands in front of the refrigerator 200a may simply lower a temperature of a living room.

FIGS. 34a to 34c illustrate data sharing between the cooking appliance 200d and the TV 200f.

FIG. 34a illustrates that the user 900 performs remote control using the mobile terminal 600. In particular, FIG. 34a illustrates that the user drives a remote control application to select an item represented by "Notification of program "a"". As such, the mobile terminal 600 may output sound S6 containing information data, such as "Notification of program "a"" in an acoustic communication mode. Thereby, the cooking appliance 200d may receive the sound S6 containing the information data, such as "Notification of program "a"", and extract the information data from the received sound S6.

In the case in which information regarding another home appliance, rather than information regarding the cooking appliance 200d is contained in the extracted information data, the cooking appliance 200d may output sound containing the extracted information data.

FIG. 34b illustrates that the cooking appliance 200d outputs the sound S6 containing the information data, such as "Notification of program "a"", based on the received sound. In particular, FIG. 34b illustrates output of the sound S28 to an adjacent IV 200f.

Next, FIG. 34c illustrates that the TV 200f displays a program guide image 3420 based on the information data included in the received sound S6 and an item 3425 represented by "program "a"" is highlighted. That is, the controller in the TV 200f may recognize a beginning time of the program "a" based on the information data contained in the received sound S6.

In addition, the controller in the TV 200f may turn on the TV 200f or switch TV channels at the beginning time of the program "a".

*FIG. 34d illustrates that a corresponding broadcast image 3430 is displayed and a voice message 3435 to indicate the beginning of the corresponding program is output at the beginning time of the program "a". In this way, the user who stands in front of the cooking appliance 200d may simply watch a desired TV program.

FIGS. 35a and 35b illustrate data sharing between a plurality of home appliances.

FIG. 35a shows one example of arrangement of a plurality of home appliances in a house. In the house, the washing machine 200b may be located at an outermost position, the refrigerator 200a and the cooking appliance 200d may be located in a kitchen adjacent to the washing machine 200b, the TV 200f may be located in a living room adjacent to the kitchen, and the air conditioner 200c may be located near the TV 200f.

Under the arrangement of the home appliances in the house, when the user 900 who stands in front of the washing machine 200b selects a remote control item represented by "Turn on air conditioner" using the mobile terminal 600, the mobile terminal 600 may output sound Sc containing information data, such as "Turn on air conditioner", in an acoustic communication mode.

As such, the washing machine 200b adjacent to the mobile terminal 600 may receive the sound Sc containing the information data, such as "Turn on air conditioner" and then extract the information data from the received sound Sc.

In the case in which the extracted information data contains information regarding another home appliance rather than information regarding the washing machine 200b, the washing machine 200b may output the sound Sc containing the information data, such as "Turn on air conditioner".

As such, the refrigerator 200a adjacent to the washing machine 200b may receive the sound Sc containing the information data, such as "Turn on air conditioner" and then extract the information data from the received sound Sc.

In the case in which the extracted information data contains information regarding another home appliance rather than information regarding the refrigerator 200a, the refrigerator 200a may output the sound Sc containing the information data, such as "Turn on air conditioner".

As such, the cooking appliance 200d adjacent to the refrigerator 200a may receive the sound Sc containing the information data, such as "Turn on air conditioner" and then extract the information data from the received sound Sc.

In the case in which the extracted information data contains information regarding another home appliance rather than information regarding the cooking appliance 200d, the cooking appliance 200d may output the sound Sc containing the information data, such as "Turn on air conditioner".

As such, the TV 200f adjacent to the cooking appliance 200d may receive the sound Sc containing the information data, such as "Turn on air conditioner" and then extract the information data from the received sound Sc.

In the case in which the extracted information data contains information regarding another home appliance rather than information related to the TV 200f, the TV 200f may output the sound Sc containing the information data, such as "Turn on air conditioner".

As such, the air conditioner 200c adjacent to the TV 200f may receive the sound Sc containing the information data, such as "Turn on air conditioner" and then extract the information data from the received sound Sc.

In the case in which the extracted information data contains information regarding the air conditioner 200c, the air conditioner 200c may perform operation corresponding to the information data, such as "Turn on air conditioner". That is, the air conditioner 200c may be turned on. In this way, all of the aforementioned appliances may share related information using only the microphones and the acoustic output modules thereof without using separate communication modules.

FIG. 35b is similar to FIG. 35a, but there is a difference in that the sound Sc containing the information data, such as "Turn on air conditioner", output from the refrigerator 200a, is received by the TV 200f rather than the cooking appliance 200d, and the TV 200f outputs the sound Sc containing the information data, such as "Turn on air conditioner".

For example, in the case in which the cooking appliance 200d is not turned on, the refrigerator 200a may raise the volume of sound to be output to allow the corresponding sound to travel a greater distance. As such, the TV 200f may receive the sound Sc containing the information data, such as "Turn on air conditioner".

Meanwhile, in the case in which there is no output of sound containing related data from another home appliance, a corresponding home appliance may output sound indicating the absence of output sound. This may activate an ACK function for data exchange between adjacent home appliances.

A home appliance and a mobile terminal according to the present invention should not be limited to configurations and methods of the above-described embodiments, and all or some of the embodiments may be selectively combined with one another to achieve various alterations.

In addition, a method of operating a mobile terminal or a home appliance according to the present invention may be implemented as code that may be written on a processor readable recording medium and thus read by a processor provided in the mobile terminal or the home appliance. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

INDUSTRIAL APPLICABILITY

The present invention may be applied to a home appliance and a mobile terminal and, more particularly, to a home appliance and a mobile terminal which enable transmission of information between the home appliance and the mobile terminal.

The invention claimed is:

1. A home appliance comprising:
a drive unit;
an acoustic output module configured to output sound;
a microphone configured to receive sound from an external source;
a memory configured to store information related to the home appliance when the home appliance is being operated;
an acoustic communication unit configured to output sound containing the information related to the home appliance to the acoustic output module or to extract prescribed information from the sound received via the microphone based on an acoustic communication mode; and
a controller configured to control the drive unit according to the information extracted by the acoustic communication unit,
wherein the controller is configured to control extraction of information from the sound received by the microphone and to control output of sound containing information related to another home appliance via the acoustic output module when the extracted information includes the information related to another home appliance.

2. The home appliance according to claim 1, wherein the acoustic communication unit includes:
a synchronizer configured to synchronize received sound signals;
a frequency converter configured to perform frequency conversion of the synchronized sound signals; and
a data extractor configured to extract information related to a screen from the frequency-converted sound signals.

3. The home appliance according to claim 2, wherein the frequency converter is configured to perform frequency conversion of the sound signals based on modulated complex lapped transform (MCLT).

4. The home appliance according to claim 1, wherein the stored information includes operational state information, operation history information, product information, breakdown information, power consumption information, stored article information, or recipe information related to the home appliance.

5. The home appliance according to claim 1, further comprising a remote control signal receiving unit configured to receive a remote control signal from a remote control device,
wherein the controller is configured to control implementation of operation corresponding to the remote control signal and, upon output of the sound, the controller is configured to output sound containing stored operational state information depending on implementation of the operation in the acoustic communication mode.

6. The home appliance according to claim 1, wherein the controller is configured to:
control implementation of power saving operation with respect to the home appliance based on power information related to the home appliance when information related to a screen is the power information related to the home appliance;
control operation of the home appliance based on operation course information when the information related to the screen is the operation course information related to the home appliance;

control installation of firmware of the home appliance based on firmware information when the information related to the screen is the firmware information related to the home appliance;

operate the home appliance based on remote control information when the information related to the screen is the remote control information related to the home appliance; and control the home appliance so as to access an access point device using network information when the information related to the screen is the network information related to the access point device.

7. A home appliance comprising:
a drive unit;
an acoustic output module configured to output sound;
a microphone configured to receive sound from an external source;
a memory configured to store information related to the home appliance when the home appliance is being operated;
an acoustic communication unit configured to output sound containing the information related to the home appliance to the acoustic output module or to extract prescribed information from the sound received via the microphone based on an acoustic communication mode;
a controller configured to control the drive unit according to the information extracted by the acoustic communication unit; and
a wireless communication unit,
wherein the controller is configured to control the wireless communication unit so as to access an access point device based on extracted network information when an intensity of the received sound is a prescribed value or more or when a bit error rate of the network information is a prescribed value or less.

8. The home appliance according to claim 7, wherein the controller is configured to control output of sound containing a service set identifier of the home appliance via the acoustic output module in response to a request from the mobile terminal.

9. The home appliance according to claim 1, wherein the controller is configured to control storage of a voice memo in the memory when the extracted information includes the voice memo.

10. The home appliance according to claim 9, wherein the controller is configured to control reproduction and output of the stored voice memo from the acoustic output module in response to an input for reproduction of the voice memo.

11. A mobile terminal comprising:
a display configured to display a prescribed screen;
an acoustic output module configured to output sound;
a microphone configured to receive sound from an external source;
an acoustic communication unit configured to output sound containing information related to the screen to the acoustic output module or to extract prescribed information from the sound received from the microphone based on an acoustic communication mode; and
a controller configured to control display of the information extracted by the acoustic communication unit on the display,
wherein the acoustic communication unit is configured to extract a service set identifier of a home appliance from the sound when the sound contains the service set identifier of the home appliance, and
wherein the controller is configured to control output of extracted network information of a prescribed access point device to the home appliance based on the service set identifier when an intensity of the received sound is a prescribed value or more or when a bit error rate of the network information is a prescribed value or less.

12. The mobile terminal according to claim 11, wherein the acoustic communication unit includes:
a frequency converter configured to perform frequency conversion of an audio signal to be output;
a data inserter configured to insert information data related to the screen into the frequency-converted audio signal;
an inverse transformer configured to perform inverse transform of the audio signal into which the information data has been inserted; and
a multiplexer configured to multiplex the inverse-transformed audio signal.

13. The mobile terminal according to claim 12, wherein the frequency converter is configured to perform frequency conversion of the audio signal based on modulated complex lapped transform (MCLT).

14. The mobile terminal according to claim 11, wherein the microphone is configured to receive sound containing operational state information of a home appliance from the home appliance while the home appliance being operated by a remote control device.

15. The mobile terminal according to claim 11, wherein the acoustic output module outputs sound containing access point mode entry information for registration of the home appliance prior to reception of the sound.

16. The mobile terminal according to claim 11, further comprising:
a memory configured to store product information of the home appliance received from the home appliance; and
an input unit configured to receive input name information regarding the home appliance,
wherein the memory is configured to store the name information simultaneously with storage of the product information.

17. The mobile terminal according to claim 11, further comprising a wireless communication module configured to transmit product information of the home appliance received from the home appliance to a server.

18. The mobile terminal according to claim 11, wherein the acoustic output module is configured to output sound containing the network information of the access point device.

* * * * *